(12) United States Patent
Ramasubramonian et al.

(10) Patent No.: US 11,197,025 B2
(45) Date of Patent: Dec. 7, 2021

(54) SIGNALING OF MATRIX INTRA PREDICTION PARAMETERS IN VIDEO CODING

(71) Applicant: QUALCOMM Incorporated, San Diego, CA (US)

(72) Inventors: Adarsh Krishnan Ramasubramonian, Irvine, CA (US); Geert Van der Auwera, Del Mar, CA (US); Cheng-Teh Hsieh, Del Mar, CA (US); Thibaud Laurent Biatek, Versailles (FR); Luong Pham Van, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/905,182

(22) Filed: Jun. 18, 2020

(65) Prior Publication Data

US 2020/0404325 A1    Dec. 24, 2020

Related U.S. Application Data

(60) Provisional application No. 62/865,077, filed on Jun. 21, 2019, provisional application No. 62/868,754, filed on Jun. 28, 2019, provisional application No. 62/872,070, filed on Jul. 9, 2019.

(51) Int. Cl.
*H04N 19/593* (2014.01)
*H04N 19/176* (2014.01)
*H04N 19/44* (2014.01)

(52) U.S. Cl.
CPC ......... *H04N 19/593* (2014.11); *H04N 19/176* (2014.11); *H04N 19/44* (2014.11)

(58) Field of Classification Search
None
See application file for complete search history.

(56) References Cited

U.S. PATENT DOCUMENTS

| 9,894,353 B2 * | 2/2018 | Li | H04N 19/157 |
| 2017/0359578 A1 * | 12/2017 | Yoshikawa | H04N 19/159 |
| 2019/0037232 A1 * | 1/2019 | Ehmann | H04N 19/13 |

(Continued)

OTHER PUBLICATIONS

Bossen, F. et al., "Non-CE3: A Unified Luma Intra Mode List Construction Process", JVET-M0528, Joint Video Experts Team (JVET) of ITU-T SG 16 WP 3 and ISO/IEC JTC 1/SC 29/WG 11, 13th Meeting, Marrakech, MA, Jan. 9-18, 2019, pp. 1-3.

(Continued)

*Primary Examiner* — Chikaodili E Anyikire
(74) *Attorney, Agent, or Firm* — Shumaker & Sieffert, P.A.

(57) ABSTRACT

A video coder determines a plurality of available Matrix Intra Prediction (MIP) parameter sets (MPS's) for a picture of video data. The plurality of available MPS's is a union of (i) a subset of all default MPS's and (ii) a set of additional MPS's that are signaled in the bitstream. Each of the default MPS's is associated with a predefined MIP mode in a codec. Each of the set of additional MPS's is associated with a new MIP mode in a set of new MIP modes. The video decoder uses a MIP mode associated with an MPS in the plurality of available MPS's to generate a prediction block for a current block of the picture.

43 Claims, 21 Drawing Sheets

(56) References Cited

U.S. PATENT DOCUMENTS

| | | | | |
|---|---|---|---|---|
| 2019/0149822 | A1* | 5/2019 | Kim | H04N 19/176 |
| | | | | 375/240.02 |
| 2019/0306513 | A1 | 10/2019 | Van Der Auwera et al. | |
| 2020/0304794 | A1* | 9/2020 | Lai | H04N 19/30 |
| 2020/0322620 | A1* | 10/2020 | Zhao | H04N 19/176 |
| 2020/0322623 | A1* | 10/2020 | Chiang | H04N 19/105 |
| 2020/0396455 | A1* | 12/2020 | Liu | H04N 19/61 |
| 2020/0396459 | A1* | 12/2020 | Lin | H04N 19/11 |
| 2020/0404324 | A1* | 12/2020 | Pham Van | H04N 19/91 |
| 2020/0404325 | A1* | 12/2020 | Ramasubramonian | |
| | | | | H04N 19/176 |

OTHER PUBLICATIONS

Bross B., et al., "Versatile Video Coding (Draft 3)", Joint Video Experts Team (JVET) of ITU-T SG 16 WP 3 and ISO/IEC JTC 1/SC 29/WG 11, 12th Meeting: Macao, CN, JVET-L1001-v9, Oct. 3-12, 2018, 235 pp.

Bross B., et al., "Versatile Video Coding (Draft 4)", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-V7, 299 Pages, Retrieved from the Internet: URL: http://phenix.int-evry.fr/jvet/doc_end_user/documents/13_Marrakech/wg11/JVET-M1001-v7.zip JVET-M1001-v7.docx. [retrieved on Mar. 17, 2019] the whole document.

Bross et al., "Versatile Video Coding (Draft 5)", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1001-v8, 399 Pages, XP030212626, Retrieved from the Internet: URL: http://phenix.int-evry.fr/mpeg/doc_end_user/documents/126_Geneva/wg11/m48053JVET-N1001-v8-JVET-N1001-v8.zip. JVET-N1001-v8.docx. [retrieved on Jun. 11, 2019] Section 8.4.5.2.11 Specification of Intra DC intra prediction mode.

Chen J., et al., "Algorithm description for Versatile Video Coding and Test Model 2 (VTM 2)", Joint Video Experts Team (JVET) of ITU-T SG 16 WP 3 and ISO/IEC JTC 1/SC 29/WG 11, JVET-K1002-v2, 11th Meeting: Ljubljana, SI, Jul. 10-18, 2018, pp. 1-21.

Chen J., et al., "Algorithm Description for Versatile Video Coding and Test Model 3 (VTM 3)," 12, JVET Meeting, Oct. 3, 2018-Oct. 12, 2018, MACAO, (The Joint Video Exploration Team of ISO/IEC JTC1/SC29/WG11 and ITU-T SG.16), No. JVET-L1002-v1, Dec. 24, 2018 (Dec. 24, 2018), XP030200768, Retrieved from the Internet: URL: http://phenix.int-evry.fr/jvet/doc_end_user/documents/12_Macao/wg11/JVET-L1002-v2.zip JVET-L1002-v2.docx [retrieved on Dec. 24, 2018], 48 pages.

Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16 ); URL: http://phenix.int-evry.fr/jvet/ ,, No. JVET-A1001 Feb. 24, 2016 (Feb. 24, 2016), XP030150000, 27 pages.

Hernandez S., et al., "CE3: Intra Sub-Partitions Coding Mode (Tests 1.1.1 and 1.1.2)", Joint Video Experts Team (JVET) of ITU-T SG 16 WP 3 and ISO/IEC JTC 1/SC 29/WG 11, Document: JVET-M0102-V5, 13th Meeting: Marrakech, MA, Jan. 9-18, 2019, pp. 1-9.

International Search Report and Written Opinion—PCT/US2020/038650—ISA/EPO—dated Sep. 18, 2020 11 Pages.

ITU-T H.265, "Series H: Audiovisual and Multimedia Systems, Infrastructure of Audiovisual Services—Coding of Moving Video, High efficiency Video Coding," The International Telecommunication Union, Dec. 2016, 664 Pages.

Pfaff J., et al., "CE3: Affine Linear Weighted Intra Prediction (CE3-4.1, CE3-4.2)," The Joint Video Exploration Team of ISO/IEC JTC1/SC29/WG11 14. JVET Meeting; Mar. 19, 2019-Mar. 27, 2019, Geneva, No. JVET-N0217, Mar. 12, 2019 (Mar. 12, 2019), XP030255495, 17 pages, Retrieved from the Internet: URL: http://phenix.int-evry.fr/jvet/doc_end_user/documents/14_Geneva/wg11/JVET-N0217-v1.zip JVET-N0217_v1.docx [retrieved on Mar. 12, 2019].

Pfaff J., et al., "8-bit Implementation and Simplification of MIP", 15. JVET Meeting, Jul. 3, 2019-Jul. 12, 2019, Gothenburg, (The Joint Video Exploration Team of ISO/IEC JTC1/SC29/WG11 and ITU-T SG.16 ), No. JVET-00084, Jun. 18, 2019 (Jun. 18, 2019), XP030205620, 7 pages, Retrieved from the Internet: URL: http://phenix.int-evry.fr/jvet/doc_end_user/documents/15_Gothenburg/wg11/JVET-00084-v1.Zip. JVET-00084-v1.docx. [Retrieved on Jun. 18, 2019] the whole document.

Ramasubramonian A.K., et al., "Non-CE3: On Signalling of MIP Parameters", 15.JVET Meeting, Jul. 3, 2019-Jul. 12, 2019, Gothenburg, (The Joint Video Exploration Team of ISO/IEC JTC1/SC29/WG11 and ITU-T SG.16), No. JVET-00755, Jun. 29, 2019 (Jun. 29, 2019), XP030220324, 6 pages, Retrieved from the Internet: URL: http://phenix.int-evry.fr/jvet/doc_end_user/documents/15_Gothenburg/wg11/JVET-00755-v1.zip JVET-00755-v1.docx. [retrieved on Jun. 29, 2019] the whole document.

Ramasubramonian, A.K. et al., "Non-CE3: On Signalling of MIP Parameters", JVET-O0755-v3, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-10.

Salehifar, M. et al., "CE3 Related: Low Memory and Computational Complexity Matrix Based Intra Prediction (MIP)", JVET-O0139-V2, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-8.

Yao, J. et al., "Non-CE3: Intra Prediction Information Coding", JVET-M0210_v1, Joint Video Experts Team (JVET) of ITU-T SG 16 WP 3 and ISO/IEC JTC 1/SC 29/WG 11, 13th Meeting, Marrakech, MA, Jan. 9-18, 2019, pp. 1-7.

Zhao L., et al., "CE3-related: Unification of Angular Intra Prediction for Square and Non-square Blocks," 12, JVET Meeting, Oct. 3, 2018-Oct. 12, 2018, Macao, (The Joint Video Exploration Team of ISO/IEC JTC1/SC29/WG11 and ITU-T SG.16 ), No. JVET-L0279, Oct. 6, 2018 (Oct. 6, 2018), XP030195082, pp. 1-10, Retrieved from the Internet: URL: http://phenix.int-evry.fr/jvet/doc_end_user/documents/12_Macao/wg11/JVET-L0279-v3.zip JVET-L0279-v1.docx [retrieved on Oct. 6, 2018].

* cited by examiner

| predModeIntra   | -14 | -13 | -12 | -11 | -10 | -9  | -8 | -7 | -6 | -5 | -4 | -3 | -2 | -1 |
|-----------------|-----|-----|-----|-----|-----|-----|----|----|----|----|----|----|----|----|
| intraPredAngle  | 512 | 341 | 256 | 171 | 128 | 102 | 86 | 73 | 64 | 57 | 51 | 45 | 39 | 35 |

| predModeIntra   | 2  | 3  | 4  | 5  | 6  | 7  | 8  | 9  | 10 | 11 | 12 | 13 | 14 | 15 | 16 | 17 | 18 |
|-----------------|----|----|----|----|----|----|----|----|----|----|----|----|----|----|----|----|----|
| intraPredAngle  | 32 | 29 | 26 | 23 | 20 | 18 | 16 | 14 | 12 | 10 | 8  | 6  | 4  | 3  | 2  | 1  | 0  |

| predModeIntra   | 19 | 20 | 21 | 22 | 23 | 24 | 25  | 26  | 27  | 28  | 29  | 30  | 31  | 32  | 33  | 34  |
|-----------------|----|----|----|----|----|----|-----|-----|-----|-----|-----|-----|-----|-----|-----|-----|
| intraPredAngle  | -1 | -2 | -3 | -4 | -6 | -8 | -10 | -12 | -14 | -16 | -18 | -20 | -23 | -26 | -29 | -32 |

| predModeIntra   | 35  | 36  | 37  | 38  | 39  | 40  | 41  | 42  | 43  | 44 | 45 | 46 | 47 | 48 | 49 | 50 |
|-----------------|-----|-----|-----|-----|-----|-----|-----|-----|-----|----|----|----|----|----|----|----|
| intraPredAngle  | -29 | -26 | -23 | -20 | -18 | -16 | -14 | -12 | -10 | -8 | -6 | -4 | -3 | -2 | -1 | 0  |

| predModeIntra   | 51 | 52 | 53 | 54 | 55 | 56 | 57 | 58 | 59 | 60 | 61 | 62 | 63 | 64 | 65 | 66 |
|-----------------|----|----|----|----|----|----|----|----|----|----|----|----|----|----|----|----|
| intraPredAngle  | 1  | 2  | 3  | 4  | 6  | 8  | 10 | 12 | 14 | 16 | 18 | 20 | 23 | 26 | 29 | 32 |

| predModeIntra   | 67 | 68 | 69 | 70 | 71 | 72 | 73 | 74 | 75  | 76  | 77  | 78  | 79  | 80  |
|-----------------|----|----|----|----|----|----|----|----|-----|-----|-----|-----|-----|-----|
| intraPredAngle  | 35 | 39 | 45 | 51 | 57 | 64 | 73 | 86 | 102 | 128 | 171 | 256 | 341 | 512 |

FIG. 9

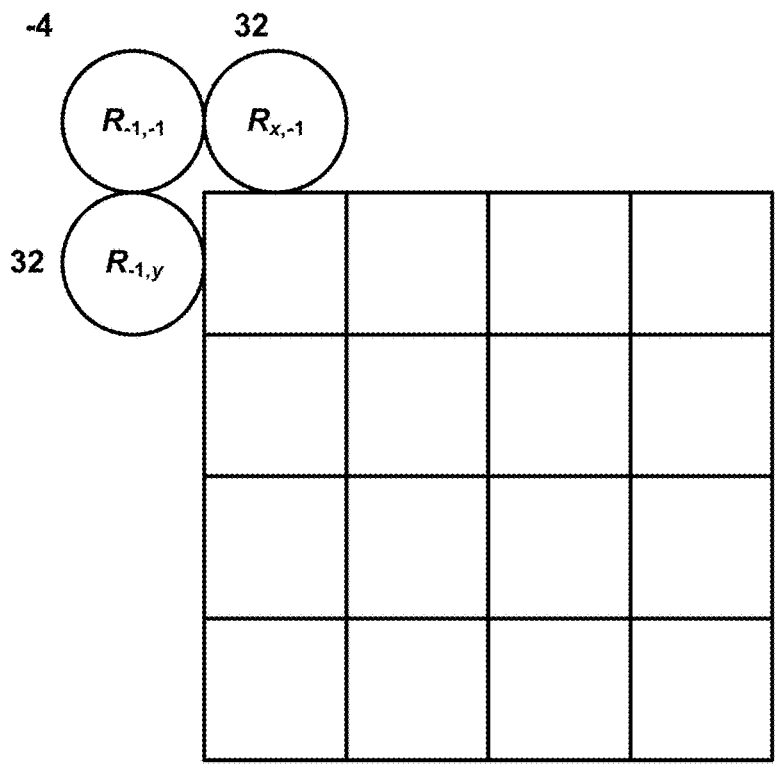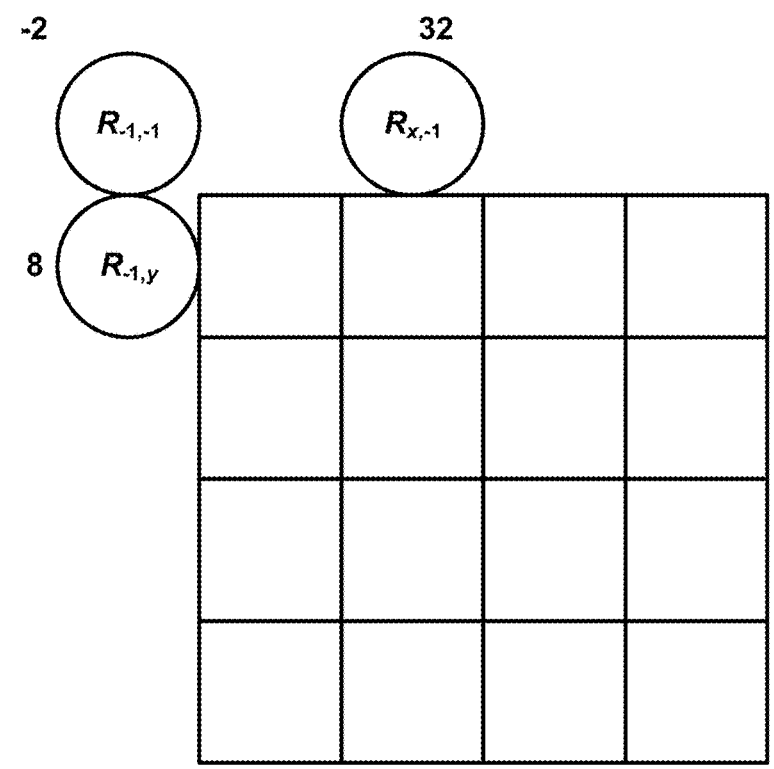
FIG. 13

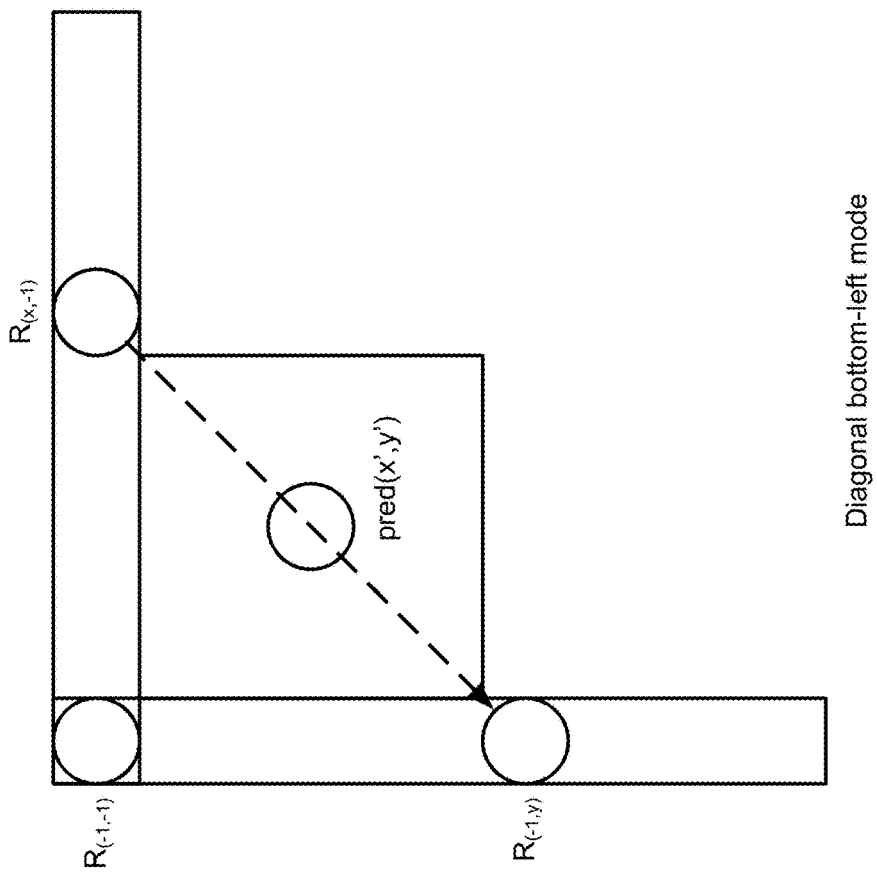
FIG. 16 Diagonal bottom-left mode
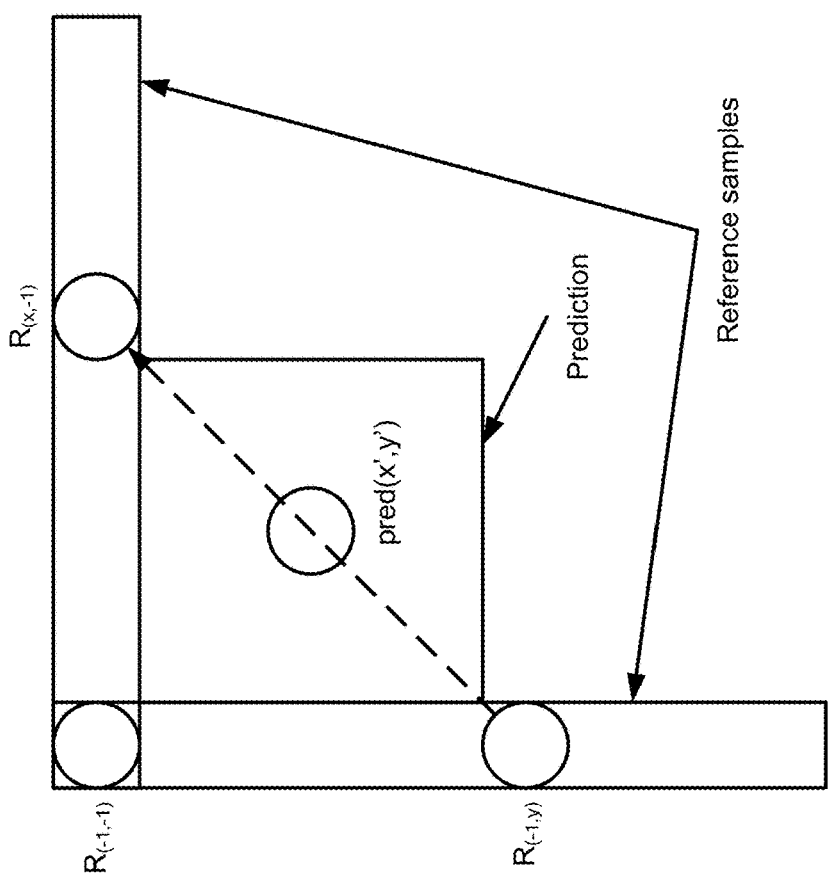
FIG. 15 Diagonal top-right mode Adjacent diagonal bottom-left mode Adjacent diagonal top-right mode

SIGNALING OF MATRIX INTRA PREDICTION PARAMETERS IN VIDEO CODING

This application claims the benefit of U.S. Provisional Patent Application 62/865,077, filed Jun. 21, 2019, U.S. Provisional Patent Application 62/868,754, filed Jun. 28, 2019, and U.S. Provisional Patent Application 62/872,070, filed Jul. 9, 2019, the entire content of each of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for intra prediction, including the derivation and signaling of modes for affine linear weighted intra prediction (ALWIP), which is also referred to as Matrix Intra Prediction (MIP). Conventionally, a set of MIP modes is used to perform MIP. Each of the MIP modes corresponds to a different predefined MIP parameter set. However, the predefined MIP parameter sets may not be optimal for all types of blocks. For instance, MIP parameter sets outside the set of predefined MIP parameter sets may result in greater coding efficiency for particular blocks. As described in this disclosure, the available MIP parameters sets for a picture may include predefined MIP parameter sets and may also include additional MIP parameter sets that are associated with new MIP modes. The use of such additional MIP parameter sets may increase coding efficiency.

In one example, this disclosure describes a method of decoding video data, the method comprising: obtaining a bitstream that includes an encoded representation of the video data that is encoded using a codec; determining a plurality of available Matrix Intra Prediction (MIP) parameter sets (MPS's) for a picture of the video data, wherein: the plurality of available MPS's is a union of (i) a subset of all default MPS's and (ii) a set of additional MPS's that are signaled in the bitstream, each of the default MPS's is associated with a predefined MIP mode in the codec, and each of the set of additional MPS's is associated with a new MIP mode in a set of new MIP modes; using a MIP mode associated with an MPS in the plurality of available MPS's to generate a prediction block for a current block of the picture; and reconstructing the current block based on the prediction block for the current block and residual data for the current block.

In another example, this disclosure describes a method of encoding video data using a codec, the method comprising: determining a plurality of available Matrix Intra Prediction (MIP) parameter sets (MPS's) for a picture of the video data, wherein: the plurality of available MPS's is a union of (i) a subset of all default MPS's and (ii) a set of additional MPS's that are signaled in the bitstream, each of the default MPS's is associated with a predefined MIP mode in the codec, and each of the set of additional MPS's is associated with a new MIP mode; signaling the set of additional MPS's in a bitstream that comprises an encoded representation of the video data; using a MIP mode associated with an MPS in the plurality of available MPS's to generate a prediction block for a current block of the picture; and generating residual data for the current block based on the prediction block for the current block and samples of the current block.

In another example, this disclosure describes a device for decoding video data, the device comprising: a memory to store the video data; and one or more processors implemented in circuitry, the one or more processors configured to: obtain a bitstream that includes an encoded representation of the video data that is encoded using a codec; determine a plurality of available Matrix Intra Prediction (MIP) parameter sets (MPS's) for a picture of the video data, wherein: the plurality of available MPS's is a union of (i) a subset of all default MPS's and (ii) a set of additional MPS's that are signaled in the bitstream, each of the default MPS's is associated with a predefined MIP mode in the codec, and each of the set of additional MPS's is associated with a new MIP mode in a set of new MIP modes; use a MIP mode associated with an MPS in the plurality of available MPS's to generate a prediction block for a current block of the picture; and reconstruct the current block based on the prediction block for the current block and residual data for the current block.

In another example, this disclosure describes a device for encoding video data using a codec, the device comprising: a memory to store the video data; and one or more processors implemented in circuitry, the one or more processors configured to: determine a plurality of available Matrix Intra Prediction (MIP) parameter sets (MPS's) for a picture of the video data, wherein: the plurality of available MPS's is a union of (i) a subset of all default MPS's and (ii) a set of additional MPS's that are signaled in the bitstream, each of the default MPS's is associated with a predefined MIP mode in the codec, and each of the set of additional MPS's is associated with a new MIP mode; signaling the set of additional MPS's in a bitstream that comprises an encoded representation of the video data; use a MIP mode associated with an MPS in the plurality of available MPS's to generate a prediction block for a current block of the picture; and generate residual data for the current block based on the prediction block for the current block and samples of the current block.

In another example, this disclosure describes a device for decoding video data, the device comprising: means for obtaining a bitstream that includes an encoded representation of the video data that is encoded using a codec; means for determining a plurality of available Matrix Intra Prediction (MIP) parameter sets (MPS's) for a picture of the video data, wherein: the plurality of available MPS's is a union of (i) a subset of all default MPS's and (ii) a set of additional MPS's that are signaled in the bitstream, each of the default MPS's is associated with a predefined MIP mode in the codec, and each of the set of additional MPS's is associated with a new MIP mode in a set of new MIP modes; means for using a MIP mode associated with an MPS in the plurality of available MPS's to generate a prediction block for a current block of the picture; and means for reconstructing the current block based on the prediction block for the current block and residual data for the current block.

In another example, this disclosure describes a device for encoding video data using a codec, the device comprising: means for determining a plurality of available Matrix Intra Prediction (MIP) parameter sets (MPS's) for a picture of the video data, wherein: the plurality of available MPS's is a union of (i) a subset of all default MPS's and (ii) a set of additional MPS's that are signaled in the bitstream, each of the default MPS's is associated with a predefined MIP mode in the codec, and each of the set of additional MPS's is associated with a new MIP mode; means for signaling the set of additional MPS's in a bitstream that comprises an encoded representation of the video data; means for using a MIP mode associated with an MPS in the plurality of available MPS's to generate a prediction block for a current block of the picture; and means for generating residual data for the current block based on the prediction block for the current block and samples of the current block.

In another example, this disclosure describes a computer-readable storage medium having stored thereon instructions that, when executed, cause one or more processors to: obtain a bitstream that includes an encoded representation of video data that is encoded using a codec; determine a plurality of available Matrix Intra Prediction (MIP) parameter sets (MPS's) for a picture of the video data, wherein: the plurality of available MPS's is a union of (i) a subset of all default MPS's and (ii) a set of additional MPS's that are signaled in the bitstream, each of the default MPS's is associated with a predefined MIP mode in the codec, and each of the set of additional MPS's is associated with a new MIP mode in a set of new MIP modes; use a MIP mode associated with an MPS in the plurality of available MPS's to generate a prediction block for a current block of the picture; and reconstruct the current block based on the prediction block for the current block and residual data for the current block.

In another example, this disclosure describes a computer-readable storage medium having stored thereon instructions that, when executed, cause one or more processors to: determine a plurality of available Matrix Intra Prediction (MIP) parameter sets (MPS's) for a picture of the video data, wherein: the plurality of available MPS's is a union of (i) a subset of all default MPS's and (ii) a set of additional MPS's that are signaled in the bitstream, each of the default MPS's is associated with a predefined MIP mode in the codec, and each of the set of additional MPS's is associated with a new MIP mode; signal the set of additional MPS's in a bitstream that comprises an encoded representation of the video data; use a MIP mode associated with an MPS in the plurality of available MPS's to generate a prediction block for a current block of the picture; and generate residual data for the current block based on the prediction block for the current block and samples of the current block.

The details of one or more examples are set forth in the accompanying drawings and the description below. Other features, objects, and advantages will be apparent from the description, drawings, and claims.

BRIEF DESCRIPTION OF DRAWINGS

FIG. 9 is a table providing a specification of intra prediction angles.

FIG. 13 illustrates examples of DC mode PDPC weights for sample positions (0,0) and (1,0) inside a 4×4 block.

FIG. 15 is a conceptual diagram illustrating a diagonal top-right mode.

FIG. 16 is a conceptual diagram illustrating a diagonal bottom-left mode.

DETAILED DESCRIPTION

Figure 1:
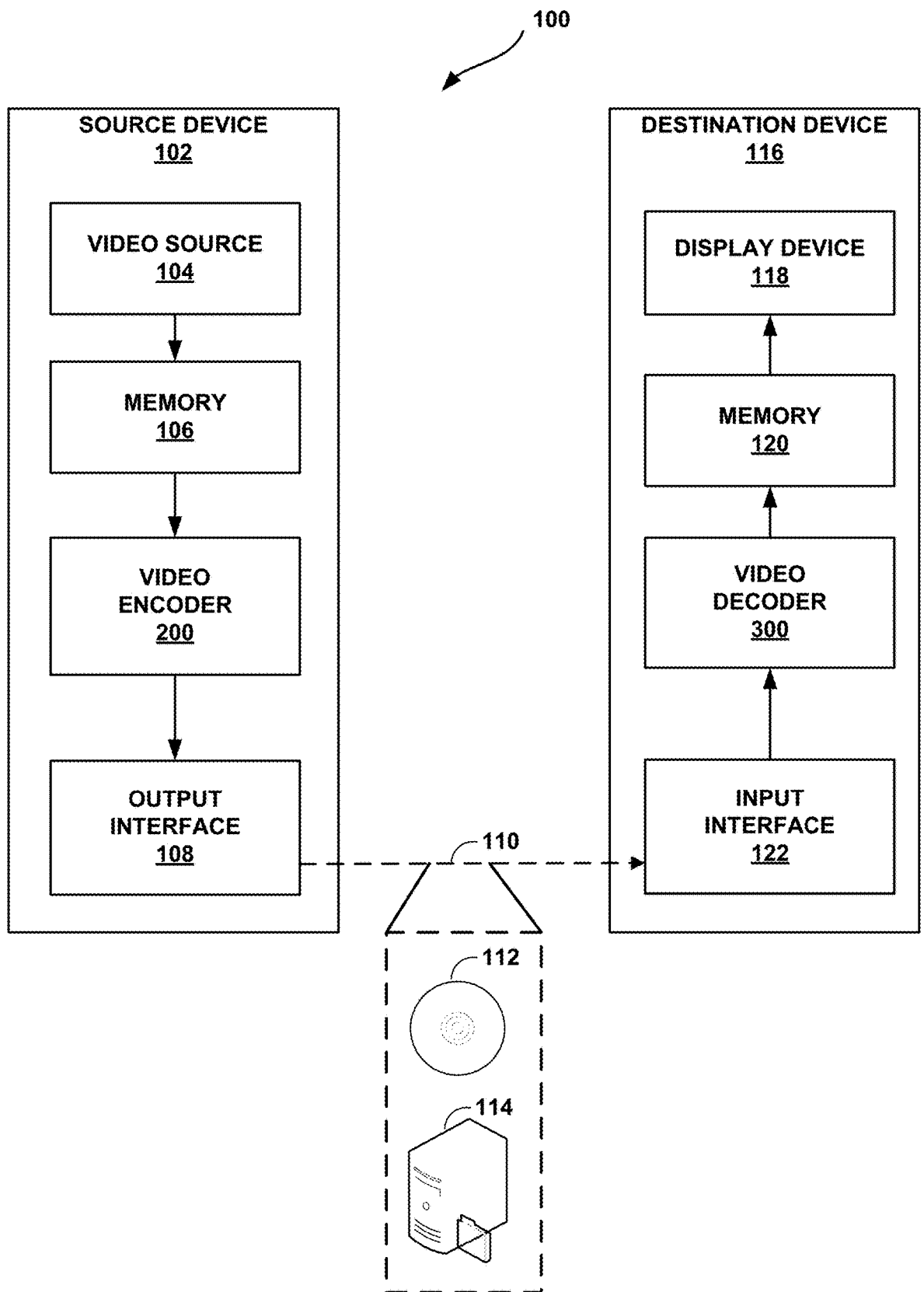
FIG. 1 is a block diagram illustrating an example video encoding and decoding system that may perform the techniques of this disclosure.

Matrix intra prediction (MIP) is a technique adopted into Versatile Video Coding (VVC). MIP may also be referred to as "affine linear weighted intra prediction" (ALWIP). MIP is a form of intra prediction in which a prediction block is generated by multiplying a vector of reference samples by a matrix and adding a bias vector, mapping the resulting sample values into predetermined positions within the prediction block, and, in some examples, performing linear interpolation on the sample values in the prediction block to determine sample values for the remaining positions within the prediction block. The vector of reference samples may be a down-sampled set of reference samples. The use of MIP may lead to better coding efficiencies for some types of blocks, but regular intra prediction techniques may lead to better coding efficiencies than MIP for other types of blocks. Thus, some blocks within a picture may be coded using MIP and some blocks within a picture may be coded using regular intra prediction techniques, such as a planar intra prediction mode, a DC intra prediction mode, or a directional intra prediction mode.

Bross, et al. "Versatile Video Coding (Draft 5)," Joint Video Experts Team (JVET) of ITU-T SG 16 WP 3 and ISO/IEC JTC 1/SC 29/WG 11, 14$^{th}$ Meeting: Geneva, CH, 19-27 Mar. 2019, JVET-N1001-v8 (hereinafter "VVC Draft 5") is a recent draft of VVC. VVC Draft 5 uses several predefined matrices to generate a prediction block when using MIP. A video encoder may signal an index that indicates which one of the predefined matrices is to be used to generate a prediction block for a block encoded using MIP. Because different blocks have different characteristics, different matrices may generate more accurate prediction blocks for different blocks. Thus, coding efficiency may increase when there are more matrices to choose from in MIP. However, storing more predefined matrices may increase the cost and complexity of a video decoder and may increase the cost of signaling the index.

This disclosure describes techniques that may address one or more of these issues. For example, a video encoder may determine a plurality of available MIP parameter sets (MPS's) for a picture of the video data. The plurality of available MPS's is a union of (i) a subset of all default MPS's and (ii) a set of additional MPS's. Each of the default MPS's is associated with a predefined MIP mode in a codec. Each of the set of additional MPS's is associated with a new MIP mode. This disclosure refers to MIP modes other than predefined MIP modes as new MIP modes. The video encoder may signal the set of additional MPS's in a bitstream that includes an encoded representation of the video data. Additionally, the video encoder may use a MIP mode associated with an MPS in the plurality of available MPS's to generate a prediction block for a current block of the picture. The video encoder may generate residual data for the current block based on the prediction block for the current block and samples of the current block.

Likewise, a video decoder may obtain a bitstream that includes an encoded representation of the video data that is encoded using a codec. The video decoder may determine a plurality of available MPS's for a picture of the video data. The plurality of available MPS's is a union of (i) a subset of all default MPS's and (ii) a set of additional MPS's that are signaled in the bitstream. Each of the default MPS's is associated with a predefined MIP mode in the codec. Each of the set of additional MPS's is associated with a new MIP mode in a set of new MIP modes. In this example, the video decoder may use a MIP mode associated with an MPS in the plurality of available MPS's to generate a prediction block for a current block of the picture. The video decoder may reconstruct the current block based on the prediction block for the current block and residual data for the current block.

Thus, the techniques of this disclosure may allow for flexibility in selecting between MIP modes corresponding to default MPS's or MIP modes corresponding to additional MPS's, which may increase coding efficiency because the video encoder may be able to select a MIP mode with a matrix that results in better coding efficiency than when the video encoder is limited to a predefined set of MIP modes. Furthermore, in some examples, the video encoder may be able to train or tune the MPS's corresponding to new MIP modes specifically for the content that the video encoder is encoding.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may include any of a wide range of devices, including desktop computers, notebook (i.e., laptop) computers, tablet computers, mobile devices (e.g., notebook (i.e., laptop) computers, tablet computers, telephone handsets such smartphones, cameras, or other types of devices configured to support wireless communication), set-top boxes, televisions, broadcast receiver devices, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for for intra prediction, including the derivation and signaling of modes for linear weighted intra prediction. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for intra prediction, including the derivation and signaling of modes for linear weighted intra prediction. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may include an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A primary objective of VVC is to provide a significant improvement in compression performance over the existing HEVC standard, aiding in deployment of higher-quality video services and emerging applications such as 360° omnidirectional immersive multimedia and high-dynamic-range (HDR) video. A recent draft of the VVC standard is described in Bross, et al. "Versatile Video Coding (Draft 5)," Joint Video Experts Team (JVET) of ITU-T SG 16 WP 3 and ISO/IEC JTC 1/SC 29/WG 11, 14th Meeting: Geneva, CH, 19-27 Mar. 2019, JVET-N1001-v8 (hereinafter "VVC Draft 5"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

Video encoder 200 and video decoder 300 may implement any of the technique of this disclosure. For example, video encoder 200 may determine a plurality of available MIP parameter sets (MPS's) for a picture of the video data. The plurality of available MPS's is a union of (i) a subset of all default MPS's and (ii) a set of additional MPS's that are signaled in the bitstream. Each of the default MPS's is associated with a predefined MIP mode in a codec. Each of the set of additional MPS's is associated with a new MIP mode. The available MPS's do not need to include all of the default MPS's or each additional MPS signaled in the bitstream. Additionally, video encoder 200 may use a MIP mode associated with an MPS in the plurality of available MPS's to generate a prediction block for a current block of the picture. The video encoder may generate residual data for the current block based on the prediction block for the current block and samples of the current block.

Likewise, video decoder 300 may obtain a bitstream that includes an encoded representation of the video data that is encoded using a codec. Video decoder 300 may determine a plurality of available MPS's for a picture of the video data. The plurality of available MPS's is a union of (i) a subset of all default MPS's and (ii) a set of additional MPS's that are signaled in the bitstream. Each of the default MPS's is associated with a predefined MIP mode in the codec. Each of the set of additional MPS's is associated with a new MIP mode in a set of new MIP modes. The available MPS's do not need to include all of the default MPS's or each additional MPS signaled in the bitstream. In this example, video decoder 300 may use a MIP mode associated with an MPS in the plurality of available MPS's to generate a prediction block for a current block of the picture. Video decoder 300 may reconstruct the current block based on the prediction block for the current block and residual data for the current block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2:
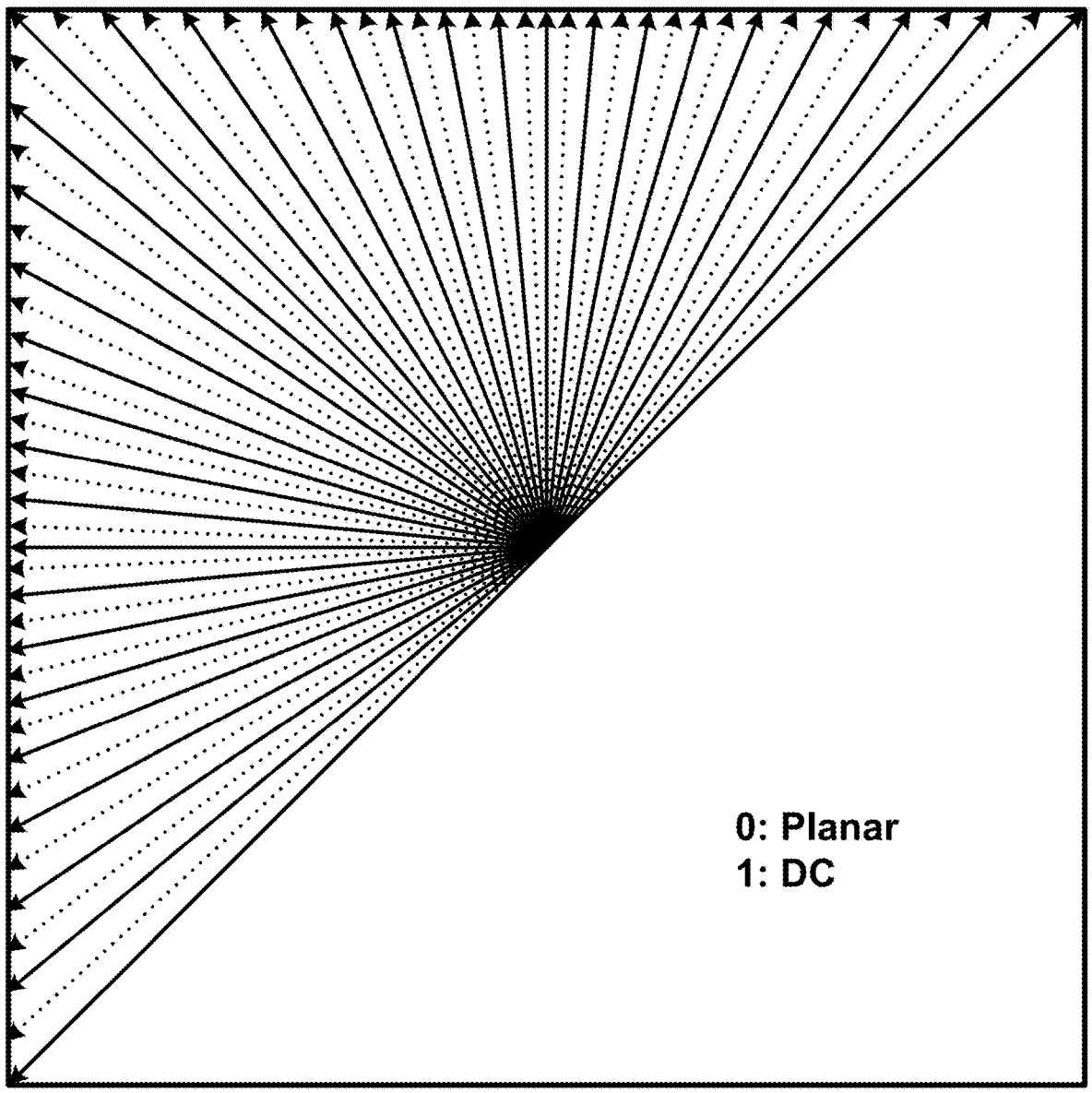
FIG. 2 is a conceptual diagram illustrating directions of intra prediction in which arrows points towards the reference samples.

As mentioned above, video encoder 200 and video decoder 300 may perform intra prediction to generate prediction blocks for blocks of video data. Several different intra prediction modes may be used by video encoder 200 and video decoder 300 to generate a prediction block. For instance, the intra prediction modes may include a DC prediction mode, a planar prediction mode, and directional (or angular) prediction modes. In VVC test model 2 (VTM2) (J. Chen, Y. Ye, S. Kim, "Algorithm description for Versatile Video Coding and Test Model 2 (VTM2)," 11$^{th}$ JVET Meeting, Ljubljana, SI, July 2018, JVET-K1002), the directional prediction modes for square blocks correspond to directions between −135 degrees to 45 degrees of the current block, as illustrated in FIG. 2.

Figure 3:
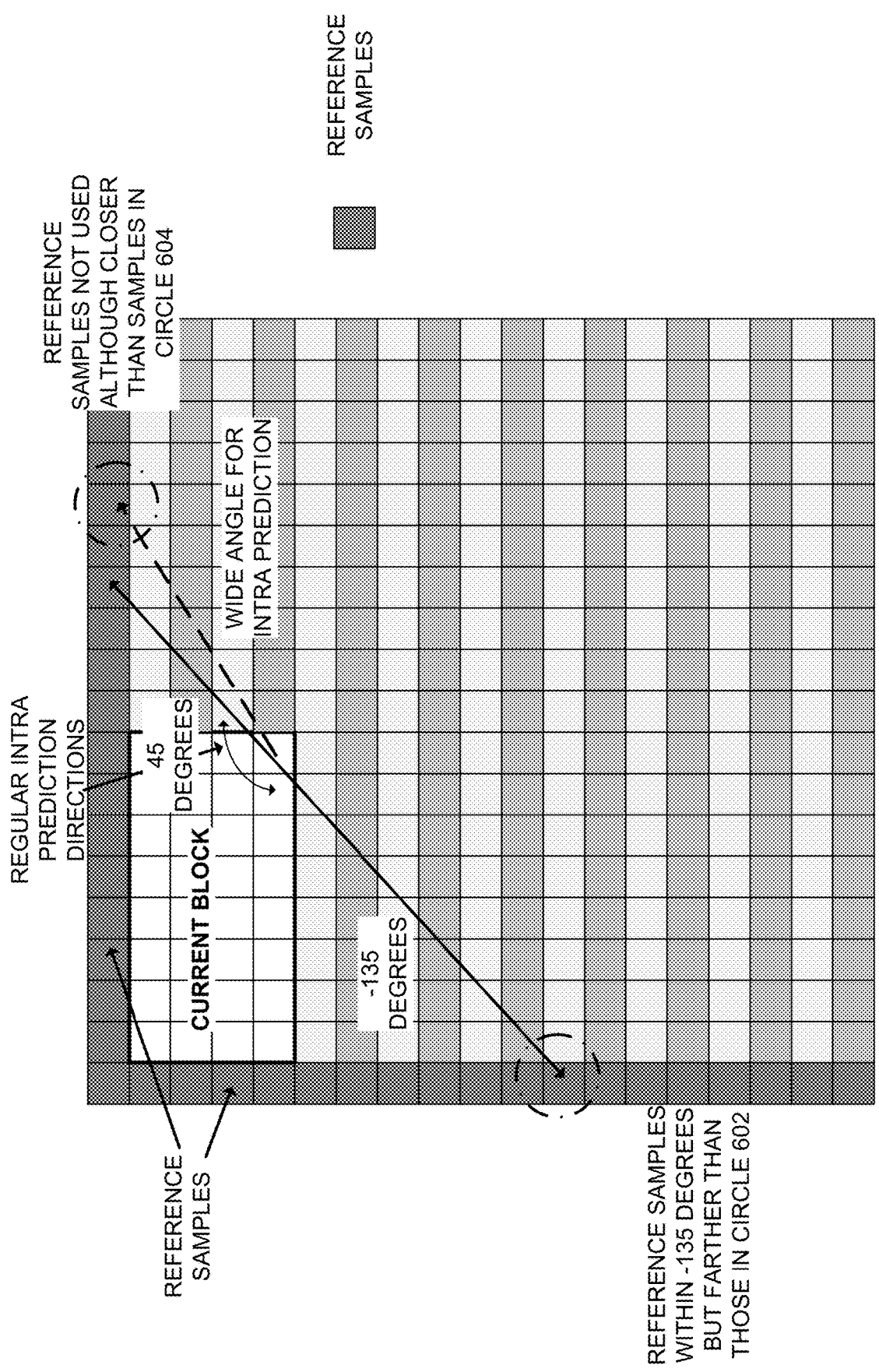
FIG. 3 is a conceptual diagram of an example 8×4 rectangular block where "closer" reference samples are not used but farther reference samples may be used.

In VTM2, the block structure used for specifying a prediction block for intra prediction is not restricted to be square (i.e., where width w=height h). Rather, rectangular or non-square prediction blocks (w>h or w<h) can be used increase the coding efficiency based on the characteristics of the content. In such rectangular blocks, restricting the direction of intra prediction to be within −135 degrees to 45 degrees can result in situations where farther reference samples are used rather than closer reference samples for intra prediction. Such a design is likely to have an impact on the coding efficiency. For instance, it is more beneficial to have the range of restrictions relaxed so that closer reference samples (beyond the −135 to 45-degree angle) can be used for prediction. An example of such a case is given in FIG. 3. In other words, FIG. 3 is a conceptual diagram of an example 8×4 rectangular block where "closer" reference samples (upper-right dashed circle) are not used, but farther reference samples (lower-left dashed circle) may be used, due to restriction of intra prediction direction to be in the range −135 degrees to 45 degrees.

Figure 4:
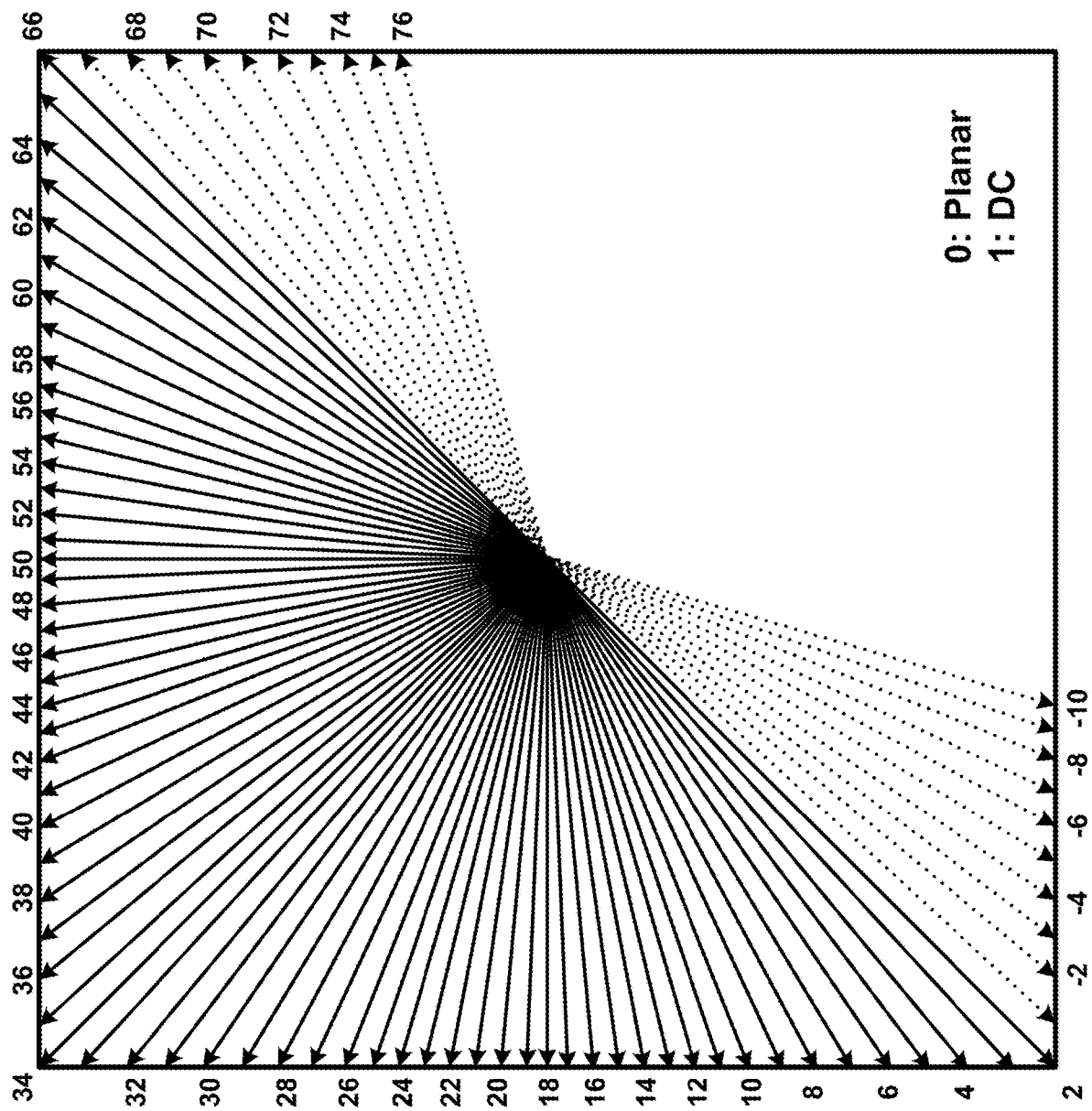
FIG. 4 is a conceptual diagram illustrating wide angle intra prediction modes.

FIG. 4 is an illustration of wide angle intra prediction modes. In FIG. 4, wide angles (−1 to −10, and 67 to 76) depicted in addition to the 65 angular modes. In other words, FIG. 4 is a conceptual diagram illustrating wide angles (−1 to −14, and 67 to 80) beyond modes 2 and 66 for a total of 93 angular modes.

Figure 5:
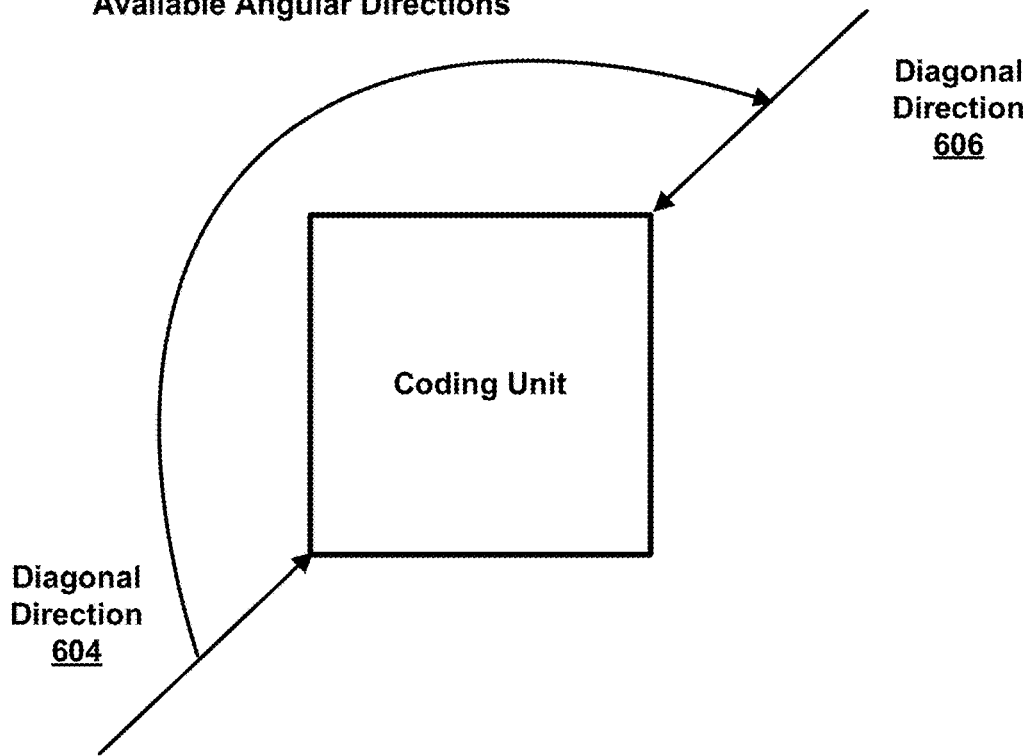
FIGS. 5, 6, and 7 are conceptual diagrams illustrating mode mapping processes for intra prediction modes outside a diagonal direction range.
Figure 6:
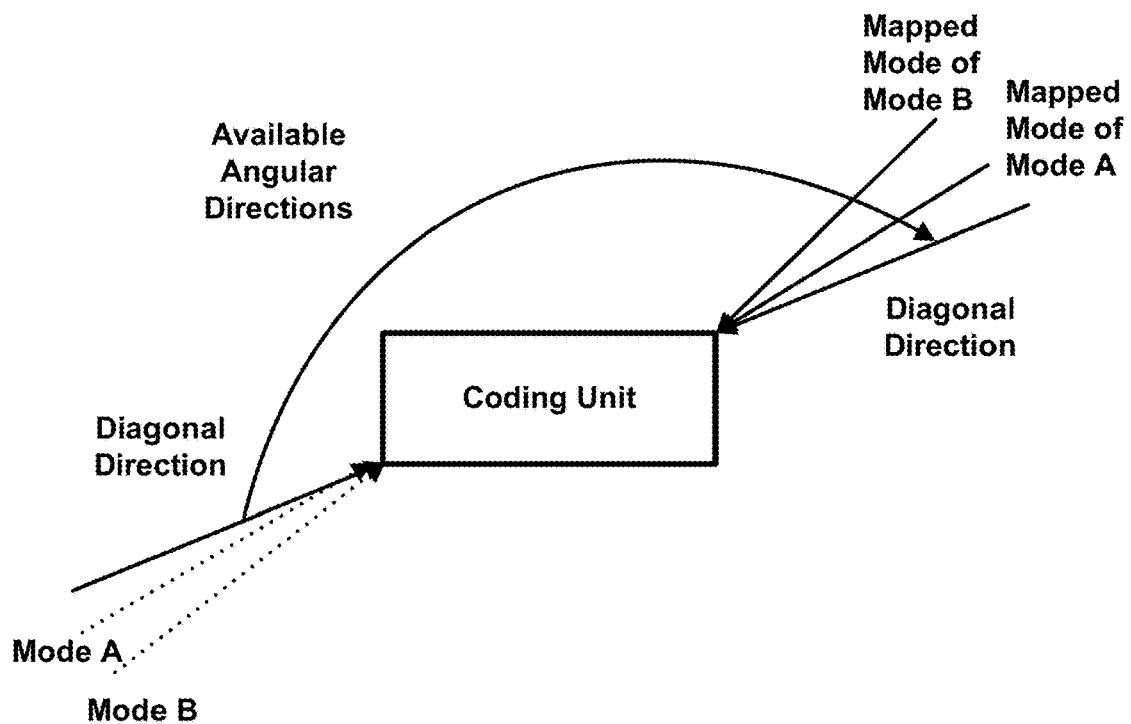
Figure 7:
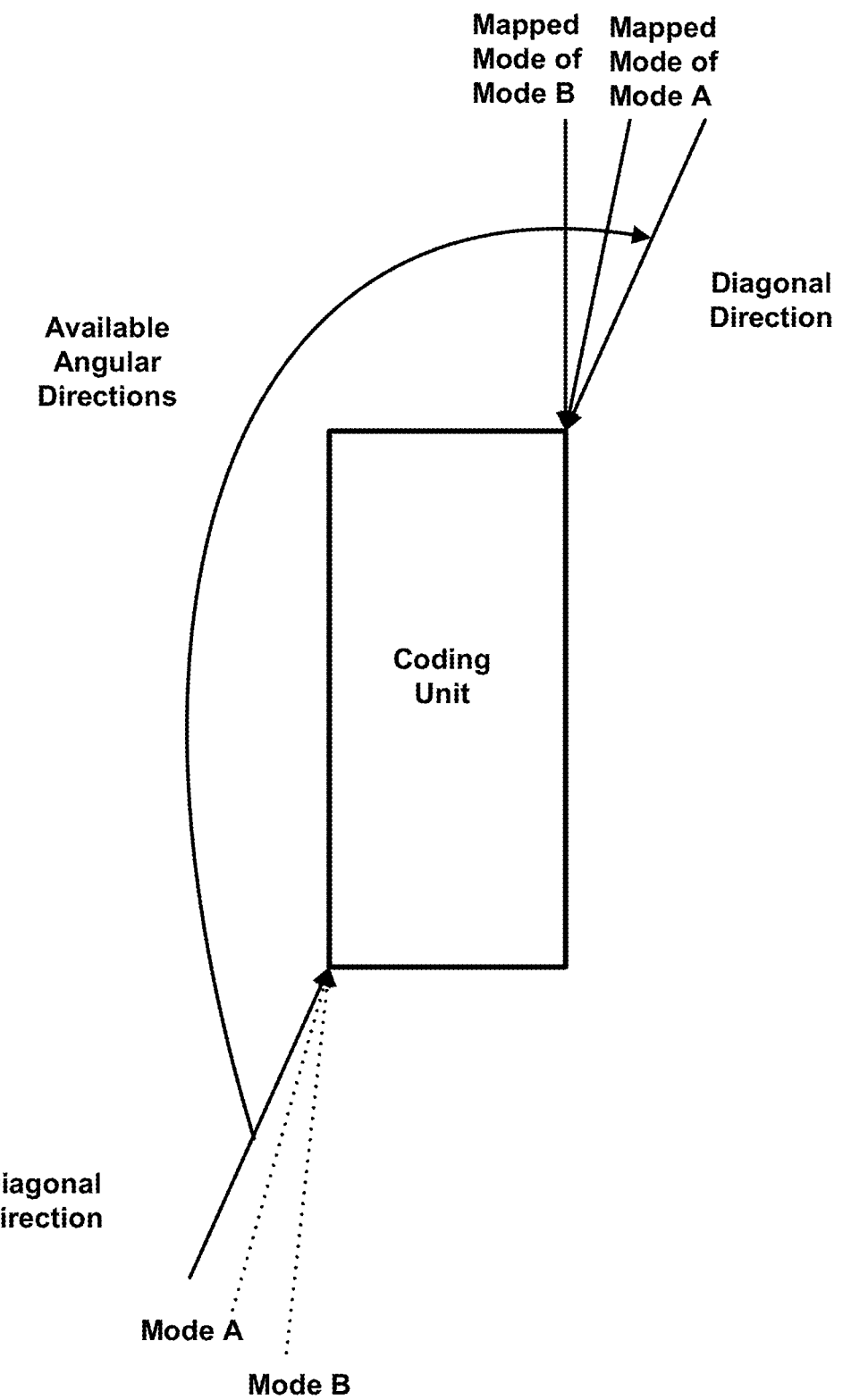

During the 12$^{th}$ JVET meeting, a modification of wide-angle intra prediction was adopted into VVC Test Model 3 (VTM3) (see L. Zhao, X. Zhao, S. Liu, X. Li, "CE3-related: Unification of angular intra prediction for square and non-square blocks," 12$^{th}$ JVET Meeting, Macau SAR, Conn., October 2018, JVET-L0279; J. Chen, Y. Ye, S. Kim, "Algorithm description for Versatile Video Coding and Test Model 3 (VTM3)," 12$^{th}$ JVET Meeting, Macau SAR, Conn., October 2018, JVET-L1002; and B. Bross, J. Chen, S. Liu, "Versatile Video Coding (Draft 3)," 12$^{th}$ JVET Meeting, Macau SAR, Conn., October 2018, JVET-L1001). This adoption includes two modifications to unify the angular intra prediction for square and non-square blocks. Firstly, angular prediction directions are modified to cover diagonal directions of all block shapes. Secondly, all angular directions are kept within the range between the bottom-left diagonal direction and the top-right diagonal direction for all block aspect ratios (square and non-square) as illustrated in FIGS. 5, 6, and 7. FIGS. 5, 6, and 7 are conceptual diagrams illustrating mode mapping processes for intra prediction modes outside the diagonal direction range. Particularly, in FIG. 5, a square block does not require angular mode remapping; FIG. 6 illustrates angular mode remapping for horizontal non-square block; and FIG. 7 illustrates angular mode remapping for a vertical non-square block. In addition, the number of reference samples in the top reference row and left reference column are restricted to 2*width+1 and 2*height+1 for all block shapes.

Figure 8:
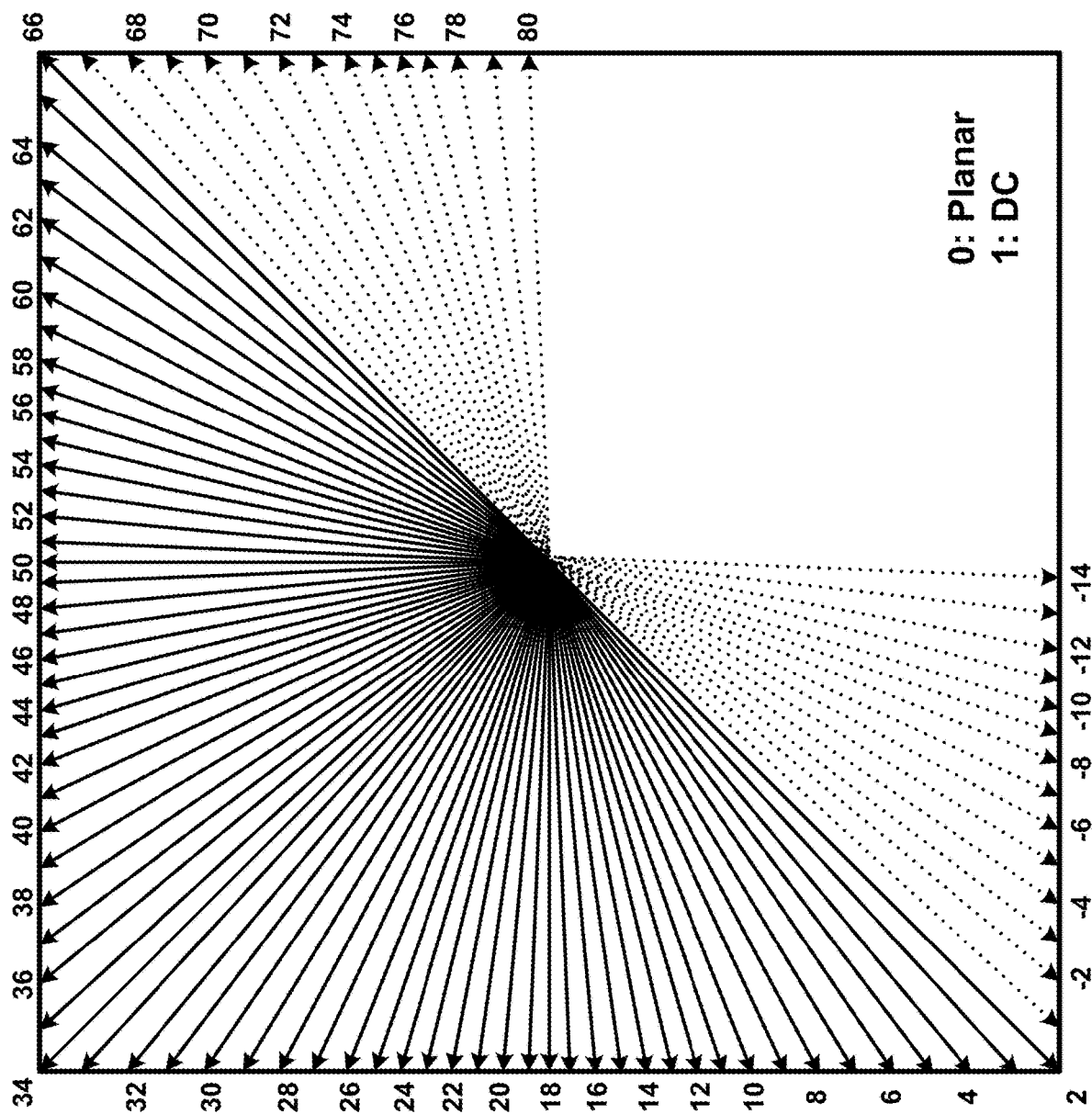
FIG. 8 is a conceptual diagram illustrating wide angles (−1 to −14, and 67 to 80) beyond modes 2 and 66 for a total of 93 angular modes.

An illustration of wider angles that are adopted in VTM3 is provided in FIG. 8. Specifically, FIG. 8 is a conceptual diagram illustrating wide angles (−1 to −14, and 67 to 80) beyond intra prediction modes 2 and 66 for a total of 93 angular modes. Although VTM3 defines 95 intra prediction modes, for any block size only 67 intra prediction modes are allowed. The exact intra prediction modes that are allowed depend on the ratio of block width to height. This is done by restricting the mode range for certain blocks sizes.

FIG. 9 is a table providing a specification of intra prediction angles (intraPredAngle). Specifically, FIG. 9 shows a mapping table between predModeIntra and the angle parameter intraPredAngle in VTM3 (JVET-L1001). In FIG. 9, angular intra modes corresponding with non-square block diagonals are denoted with underlining. In FIG. 9, the vertical and horizontal modes are denoted with italics. Square block diagonal modes are denoted in FIG. 9 with underlining and italics. In this disclosure, angular modes with a positive intraPredAngle value are referred to as "positive angular modes" (intra prediction mode index <18 or >50) while angular modes with a negative intraPredAngle value are referred to as "negative angular modes" (intra prediction mode index >18 and <50).

The inverse angle parameter invAngle is derived based on intraPredAngle as follows:

$$invAngle = \text{Round}\left(\frac{256 * 32}{intraPredAngle}\right) \quad (2\text{-}1)$$

Note that intraPredAngle values that are multiples of 32 (0, 32, 64, 128, 256, 512) always correspond with prediction from non-fractional reference array samples, as is the case in the VTM3 specification.

TABLE 1

Diagonal modes corresponding with various block aspect ratios.

| Block aspect ratio (width/height) | Diagonal modes |
|---|---|
| 1 (square) | 2, 34, 66 |
| 2 | 8, 28, 72 |
| 4 | 12, 24, 76 |
| 8 | 14, 22, 78 |
| 16 | 16, 20, 80 |
| ½ | −6, 40, 60 |
| ¼ | −10, 44, 56 |
| ⅛ | −12, 46, 54 |
| 1/16 | −14, 48, 52 |

Figure 10:
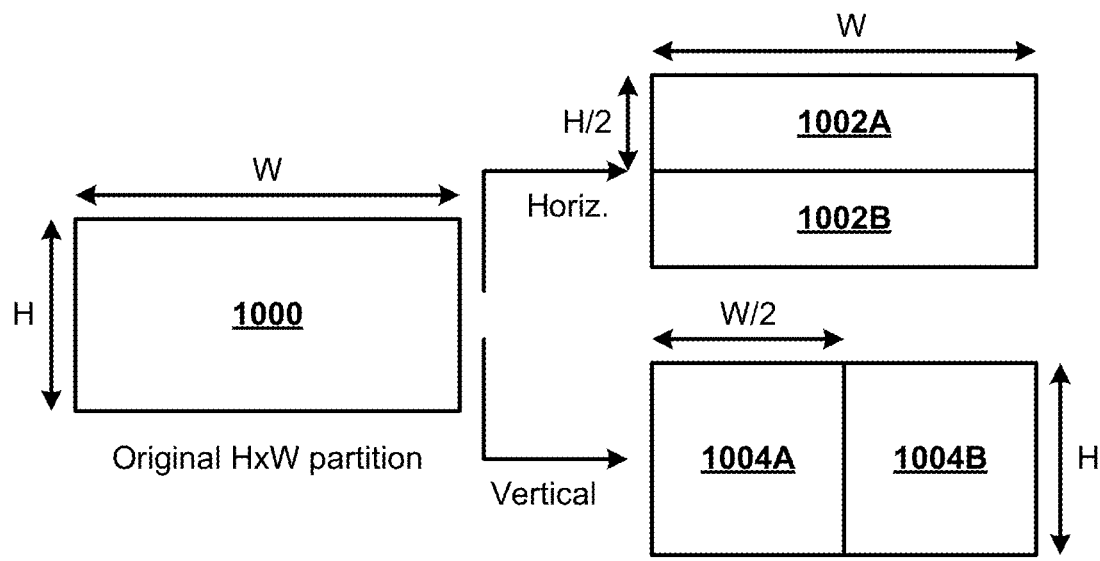
FIG. 10 is a conceptual diagram of an example division of a 4×8 block and an 8×4 block.
Figure 11:
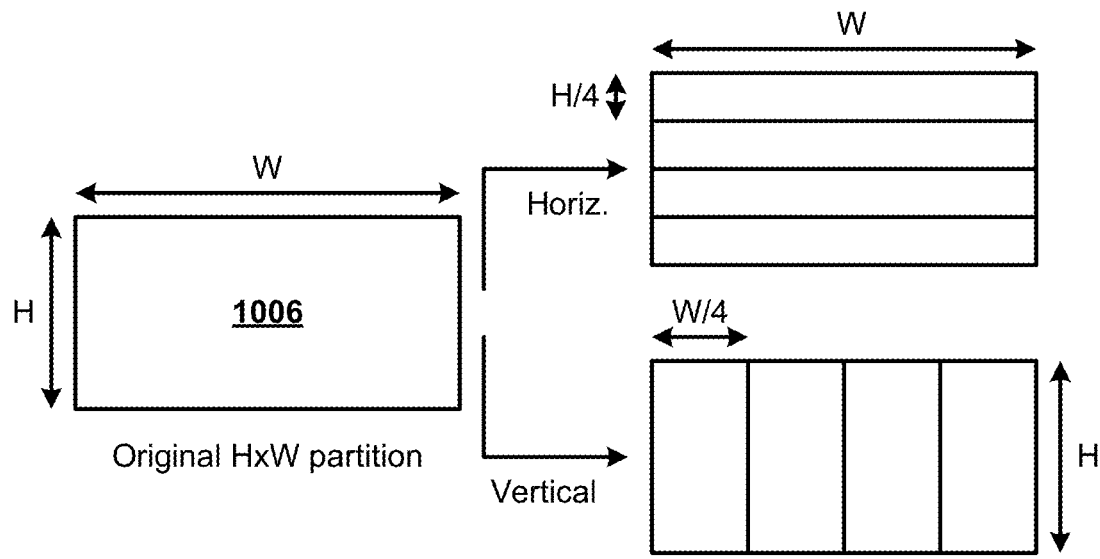
FIG. 11 is a conceptual diagram of an example division of all blocks except blocks of sizes 4×8, 8×4 and 4×4.

Intra sub-partition coding (ISP) (see S. De Luxán Hernández, V. George, J. Ma, T. Nguyen, H. Schwarz, D. Marpe, T. Wiegand (HHI), "CE3: Intra Sub-Partitions Coding Mode," JVET-M0102) is a method by which a coding block is split into two or four subblocks. Each subblock within a block is reconstructed in decoding order before the reconstruction of the subsequent subblock in decoding order. FIG. 10 is a conceptual diagram of an example division of a block 1000 into 4×8 blocks 1002A, 1002B or 8×4 blocks 1004A, 1004B. FIG. 11 is a conceptual diagram of an example division of blocks, such as block 1006, except blocks of sizes 4×8, 8×4 and 4×4. In Bross et al., "Versatile Video Coding (Draft 4)," Joint Video Experts Team (JVET) of ITU-T ST 16 WP 3 and ISO/IEC JTC 1/SC 29/WG 11, 13th Meeting, Marrakech, Mass., 9-18, Jan. 2019, document JVET-M1001 (hereinafter, "VVC Draft 4"), ISP is only applied to luma coding blocks. The reference samples for these ISP-coded blocks are restricted to be from the reference line that is closest to the coding block (see e.g., MRLIdx=0 as described below with respect to FIG. 12).

One bit is used to signal whether a coding block is split into ISPs, and a second bit is used to indicate a split type: horizontal or vertical. Based on the intra mode and the split type used, two different classes of processing orders may be used. The two classes of processing order are referred to as "normal order" and "reversed order." In the normal order, the first sub-partition to be processed is the sub-partition containing the top-left sample of the CU and then continuing downwards (horizontal split) or rightwards (vertical split).

On the other hand, the reverse processing order either starts with the sub-partition containing the bottom-left sample of the CU (horizontal split) and continues upwards or starts with a sub-partition containing the top-right sample of the CU and continues leftwards (vertical split).

A variation of ISP that uses only the normal processing order is used in VVC Draft 4. The terms "subblock" and "sub-partition" are used interchangeably in this document, and both refer to the blocks obtained by partitioning a coding block using ISP. Some syntax and semantics associated with ISP in VVC Draft 4 are shown in Syntax Table 1 and Syntax Table 2, below, with relevant syntax denoted with <!> . . . </!> tags.

SYNTAX TABLE 1

|  | Descriptor |
|---|---|
| coding_unit( x0, y0, cbWidth, cbHeight, treeType ) { | |
| ... | |
|     } else { | |
|       if( treeType = = SINGLE_TREE \|\| treeType = = DUAL_TREE_LUMA ) { | |
|         if( ( y0 % CtbSizeY ) > 0 ) | |
|           intra_luma_ref_idx[ x0 ][ y0 ] | ae(v) |
| <!>         if (intra_luma_ref_idx[ x0 ][ y0 ] = = 0 && | |
|         ( cbWidth <= MaxTbSizeY \|\| cbHeight <= MaxTbSizeY ) && | |
|         ( cbWidth * cbHeight > MinTbSizeY * MinTbSizeY )) | |
|           intra_subpartitions_mode_flag[ x0 ][ y0 ] | ae(v) |
|         if( intra_subpartitions_mode_flag[ x0 ][ y0 ] = = 1 && | |
|         cbWidth <= MaxTbSizeY && cbHeight <= MaxTbSizeY ) | |
|           intra_subpartitions_split_flag[ x0 ][ y0 ] | ae(v)</!> |
|         if( intra_luma_ref_idx[ x0 ][ y0 ] = = 0 && | |
|         intra_subpartitions_mode_flag[ x0 ][ y0 ] = = 0 ) | |
|           intra_luma_mpm_flag[ x0 ][ y0 ] | ae(v) |
|         if( intra_luma_mpm_flag[ x0 ][ y0 ] ) | |
|           intra_luma_mpm_idx[ x0 ][ y0 ] | ae(v) |
| ... | |

SYNTAX TABLE 2

|  | Descriptor |
|---|---|
| transform_tree( x0, y0, tbWidth, tbHeight, treeType) { | |
| <!> InferTuCbfLuma = 1 | |
|   if( IntraSubPartSplitType = = NO_ISP_SPLIT ) { </!> | |
|     if( tbWidth > MaxTbSizeY \|\| tbHeight > MaxTbSizeY ) { | |
|       trafoWidth = ( tbWidth > MaxTbSizeY ) ? (tbWidth / 2) : tbWidth | |
|       trafoHeight = ( tbHeight > MaxTbSizeY ) ? (tbHeight / 2) : tbHeight | |
|       transform_tree( x0, y0, trafoWidth, trafoHeight ) | |
|       if( tbWidth > MaxTbSizeY ) | |
|       transform_tree( x0 + trafoWidth, y0, trafoWidth, trafoHeight, treeType ) | |
|       if( tbHeight > MaxTbSizeY ) | |
|       transform_tree( x0, y0 + trafoHeight, trafoWidth, trafoHeight, treeType ) | |
|       if( tbWidth > MaxTbSizeY && tbHeight > MaxTbSizeY ) | |
|       transform_tree( x0 + trafoWidth, y0 + trafoHeight, trafoWidth, trafoHeight, treeType ) | |
|     } else { | |
|       transform_unit( x0, y0, tbWidth, tbHeight, treeType, 0 ) | |
|     } | |
| <!>   } else if( IntraSubPartitionsSplitType = = ISP_HOR_SPLIT ) { | |
|     trafoHeight = tbHeight / NumIntraSubPartitions | |
|     for( partIdx = 0; partIdx < NumIntraSubPartitions; partIdx++ ) | |
|     transform_unit( x0, y0 + trafoHeight * partIdx, tbWidth, trafoHeight, treeType, partIdx ) | |
|   } else if( IntraSubPartitionsSplitType = = ISP_VER_SPLIT ) { | |
|     trafoWidth = tbWidth / NumIntraSubPartitions | |
|     for( partIdx = 0; partIdx < NumIntraSubPartitions; partIdx++ ) | |

SYNTAX TABLE 2-continued

| | Descriptor |
|---|---|
| transform_unit( x0 + trafoWidth * partIdx, y0, trafoWidth, tbHeight, treeType, partIdx )<br>}</!><br>} | |

Semantics of Coding Unit
<!>intra_subpartitions_mode_flag[x0][y0] equal to 1 specifies that the current intra coding unit is partitioned into NumIntraSubPartitions[x0][y0] rectangular transform block subpartitions. intra_subpartitions_mode_flag[x0][y0] equal to 0 specifies that the current intra coding unit is not partitioned into rectangular transform block subpartitions. When intra_subpartitions_mode_flag[x0][y0] is not present, it is inferred to be equal to 0.
intra_subpartitions_split_flag[x0][y0] specifies whether the intra subpartitions split type is horizontal or vertical. When intra_subpartitions_mode_flag[x0][y0] is not present, it is inferred to be equal to 0.
The variable IntraSubPartitionsSplitType specifies the type of split used for the current luma coding block as illustrated in Table 2-3. IntraSubPartitionsSplitType is derived as follows:
    If intra_subpartitions_mode_flag[x0][y0] is equal to 0, IntraSubPartitionsSplitType is set equal to 0.
    Otherwise, the IntraSubPartitionsSplitType is set equal to 1+intra_subpartitions_split_flag[x0][y0].

TABLE 2-3

Name association to IntraSubPartitionsSplitType

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

Figure 12:
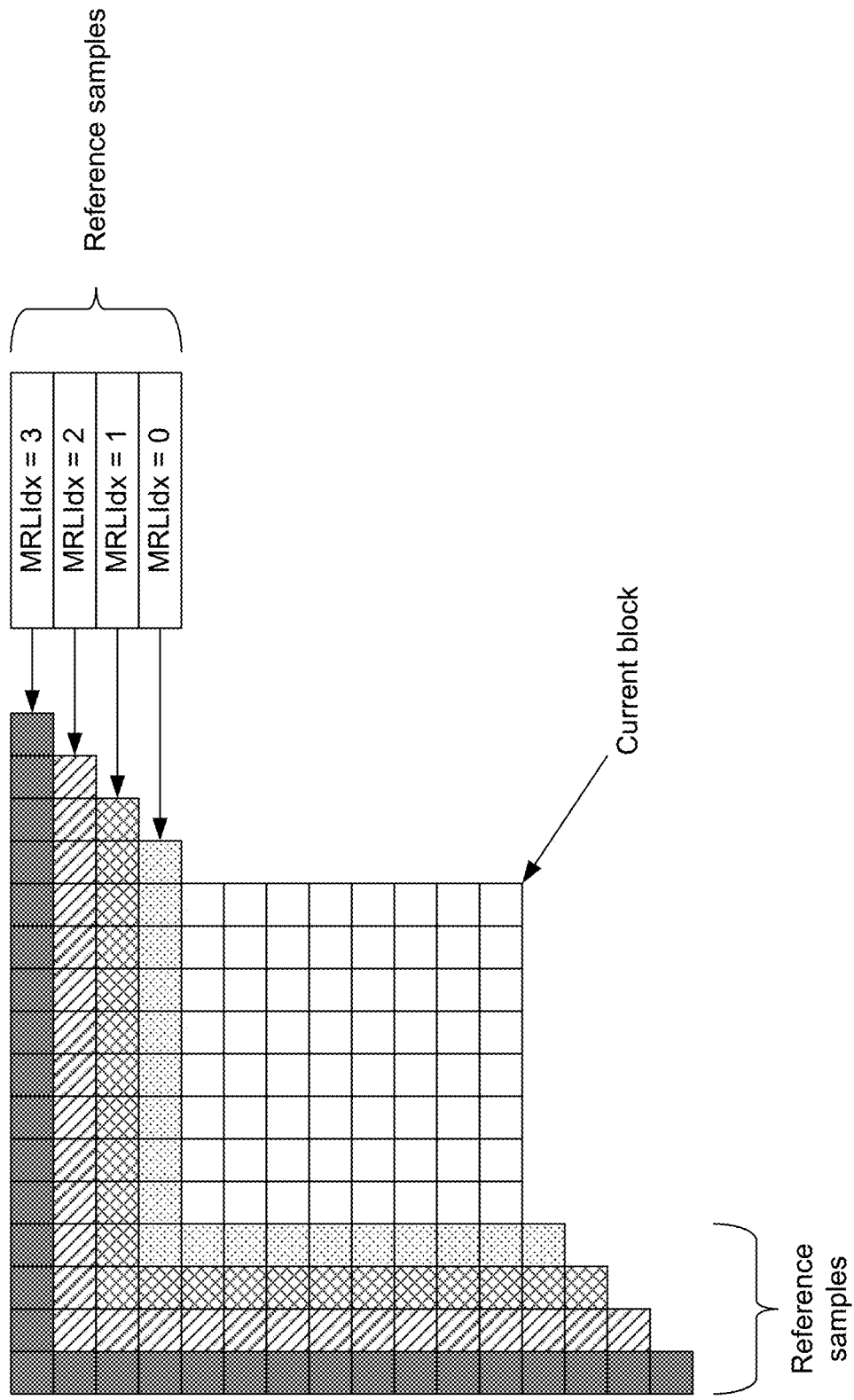
FIG. 12 is a conceptual diagram of illustrating reference samples from multiple reference lines that may be used for intra prediction of a coding block.

The variable NumIntraSubPartitions specifies the number of transform block subpartitions an intra luma coding block is divided into. NumIntraSubPartitions is derived as follows:
    If IntraSubPartitionsSplitType is equal to ISP_NO_SPLIT, NumIntraSubPartitions is set equal to 1.
    Otherwise, if one of the following conditions is true, NumIntraSubPartitions is set equal to 2:
        cbWidth is equal to 4 and cbHeight is equal to 8,
        cbWidth is equal to 8 and cbHeight is equal to 4.
    Otherwise, NumIntraSubPartitions is set equal to 4.</!>
The samples in the neighborhood of a coding block are used for intra prediction of the block. Typically, the reconstructed reference sample lines that are closest to the left and the top boundaries of the coding block are used as the reference samples for intra prediction. However, VVC Draft 4 also enables other samples in the neighborhood of the coding block to be used as reference samples. FIG. 12 illustrates the reference sample lines that may be used for intra prediction. For each coding block, an index is signaled that indicates the reference line that is used.

In VVC Draft 4, only reference lines with MRLIdx equal to 0, 1 and 3 can be used. In VVC Draft 4, the index to the reference line used for coding the block (values 0, 1 and 2 indicating lines with MRLIdx 0, 1 and 3, respectively) is coded with truncated unary codeword. In some versions of VVC, Planar and DC modes are not used when the reference line index is greater than 0 (i.e., when MRLIdx>0). In later versions of VVC, DC mode is allowed when reference lines that have MRLIdx>0 are used for intra prediction.

Block-based intra prediction is part of video standards such AVC, HEVC, VVC, etc. Typically, lines of reference samples from adjacent reconstructed blocks are used for predicting samples within the current block. One or multiple lines of samples may be used for prediction. The reference samples are employed by typical intra prediction modes such as DC, planar, and angular/directional modes.

Position Dependent Intra Prediction Combination (PDPC) was described in J. Pfaff et al., "CE3: Affine linear weighted intra prediction (CE3-4.1, CE3-4.2)", Joint Video Experts Team (JVET) of ITU-T ST 16 WP 3 and ISO/IEC JTC 1/SC 29/WG 11, 14$^{th}$ Meeting, Geneva, CH, 19-27, March 2019, document JVET-N0217 (hereinafter, "JVET-N0217") and further simplified in S. De Luxan Hernandez et al., "CE3: Intra Sub-Partitions Coding Mode," Joint Video Experts Team (JVET) of ITU-T ST 16 WP 3 and ISO/IEC JTC 1/SC 29/WG 11, 13th Meeting, Marrakech, Mass., 9-18, Jan. 2019, document JVET-M0102. In J. Chen et al., "Algorithm description for Versatile Video Coding and Test Model 3 (VTM3)", Joint Video Experts Team (JVET) of ITU-T ST 16 WP 3 and ISO/IEC JTC 1/SC 29/WG 11, 12$^{th}$ Meeting, Macao, Conn., 3-12, Oct. 2018, document JVET-L1002 (hereinafter, "JVET-L1002"), PDPC is applied to planar, DC, horizontal and vertical modes without signaling as summarized in the following. In F. Bossen et al., "Non-CE3: A unified luma intra mode list construction process", Joint Video Experts Team (JVET) of ITU-T ST 16 WP 3 and ISO/IEC JTC 1/SC 29/WG 11, 13$^{th}$ Meeting, Marrakech, Mass., 9-18, Jan. 2019, document JVET-M0528, PDPC was further extended to diagonal directional modes and modes adjacent to diagonal directional modes.

The prediction sample pred(x,y) located at (x, y) is predicted with an intra prediction mode (DC, planar, angular) and its value is modified using the PDPC expression for a single reference sample line:

$$\text{pred}(x,y) = (wL \times R_{-1,y} + wT \times R_{x,-1} - wTL \times R_{-1,-1} + (64 - wL - wT + wTL) \times \text{pred}(x,y) + 32) >> 6, \quad \text{(Eq. 1)}$$

where $R_{x,-1}$, $R_{-1,y}$ represent the reference samples located at the top and left of the current sample (x, y), respectively, and $R_{-1,-1}$ represents the reference sample located at the top-left corner of the current block. For the DC mode, the weights are calculated as follows for a block with dimensions width and height:

$$wT = 32 >> ((y << 1) >> \text{shift}), wL = 32 >> ((x << 1) >> \text{shift}),$$
$$wTL = (wL >> 4) + (wT >> 4),$$

with shift=$(\log_2(\text{width}) + \log_2(\text{height}) + 2) >> 2$,
while for planar mode wTL=0, for horizontal mode wTL=wT, and for vertical mode wTL=wL. The PDPC weights can be calculated with adds and shifts only. The value of pred(x,y) can be computed in a single step using Eq. 1, above.

FIG. 13 illustrates DC mode PDPC weights (wL, wT, wTL) for (0, 0) and (1, 0) positions inside one 4×4 block. If PDPC is applied to DC, planar, horizontal, and vertical intra modes, additional boundary filters are not applied, such as the DC mode boundary filter or horizontal/vertical mode edge filters.

Eq. 1 may be generalized to include additional reference sample lines. In this case, multiple reference samples are available in the neighborhoods of $R_{x,-1}$, $R_{-1,y}$, $R_{-1,-1}$ and each may have a weight assigned that can be optimized, for example, by training.

Figure 14:
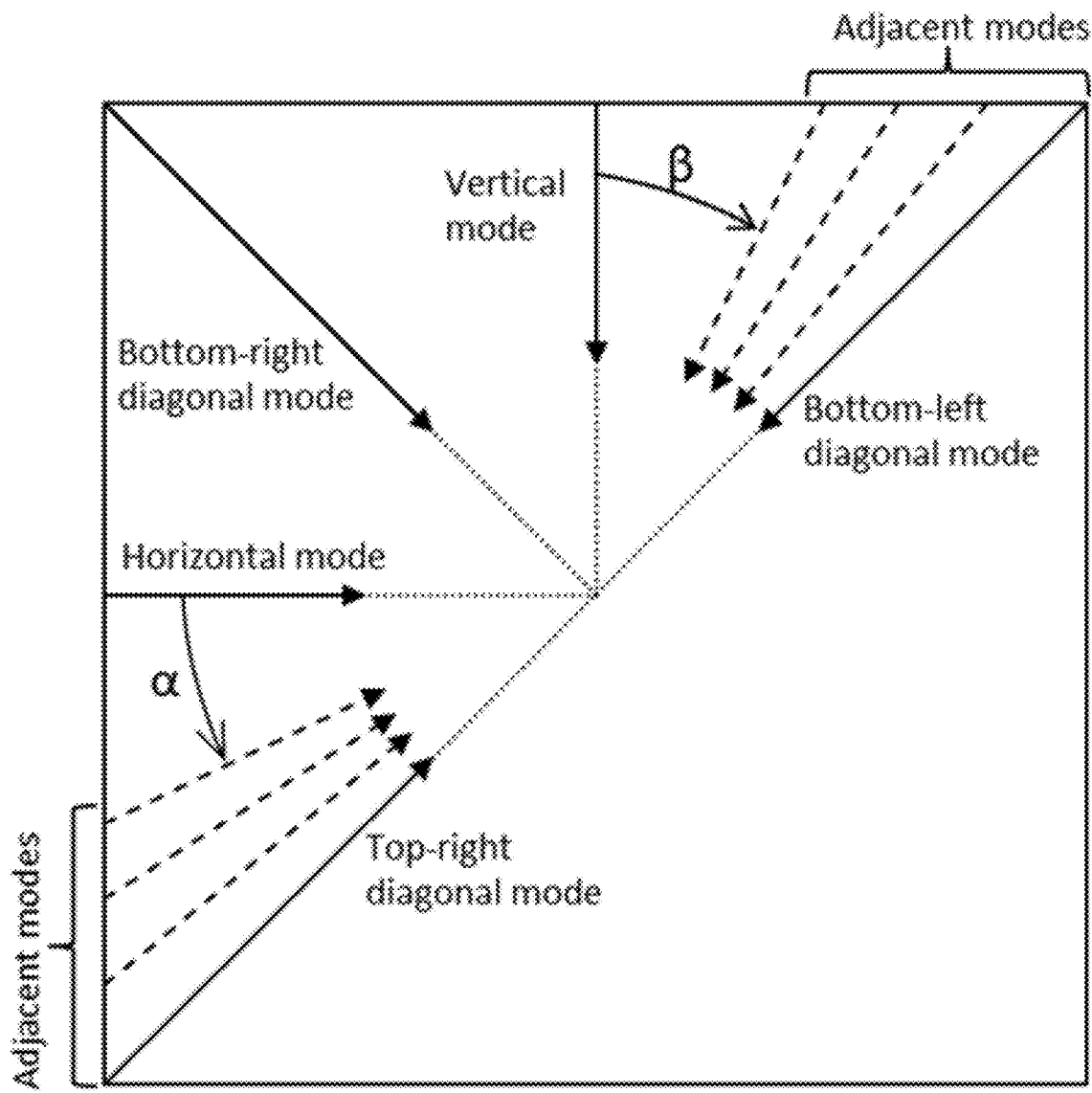
FIG. 14 is a conceptual diagram illustrating intra prediction angular modes

U.S. Patent Publication 2019/0306513, published Oct. 3, 2019, extends PDPC to the diagonal intra modes and to the angular modes that are adjacent to the diagonal modes. The intended diagonal intra modes are the modes that predict according to the bottom-left and top-right directions, as well as several adjacent angular modes, for example, N adjacent modes between the bottom-left diagonal mode and vertical mode, and N or M adjacent modes between the top-right diagonal mode and horizontal mode. FIG. 14 illustrates the identification of the angular modes. In general, the adjacent modes may be a selected subset of available angular modes. The spacing between angular modes may be nonuniform and some angular modes may be skipped.

FIGS. 15, 16, 17, and 18 provide a definition of samples used by PDPC extension to diagonal and adjacent angular intra modes. FIG. 15 illustrates the definition of reference samples $R_{x,-1}$, $R_{-1,y}$ and $R_{-1,-1}$ for the extension of PDPC to the top-right diagonal mode. The prediction sample pred(x', y') is located at (x', y') within the prediction block. The coordinate x of the reference sample $R_{x,-1}$ is given by: x=x'+y'+1, and the coordinate y of the reference sample $R_{-1,y}$ is similarly given by: y=x'+y'+1.

The PDPC weights for the top-right diagonal mode are, for example:

$$wT=16 >> ((y'<<1)>>\text{shift}), wL=16>>((x'<<1)>>\text{shift}), wTL=0.$$

Similarly, FIG. 16 illustrates the definition of reference samples $R_{x,-1}$, $R_{-1,y}$ and $R_{-1,-1}$ for the extension of PDPC to the bottom-left diagonal mode. The coordinate x of the reference sample $R_{x,-1}$ is given by:

x=x'+y'+1, and the coordinate y of the reference
sample $R_{-1,y}$ is: y=x'+y'+1.

The PDPC weights for the top-right diagonal mode are, for example:

$$wT=16>>((y'<<1)>>\text{shift}),wL=16>>((x'<<1)>>\text{shift}),wTL=0.$$

Figure 17:
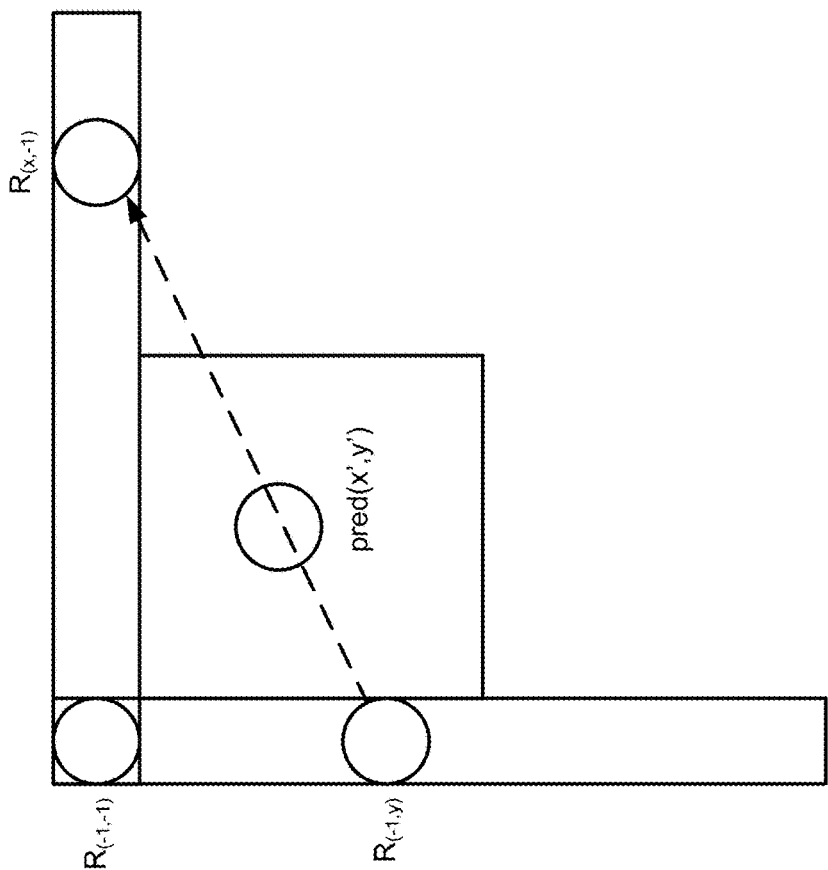
FIG. 17 is a conceptual diagram illustrating an adjacent diagonal top-right mode.

The case of an adjacent top-right diagonal mode is illustrated in FIG. 17. In general, for the angle α defined in FIG. 14, they coordinate of the reference sample $R_{-1,y}$ is determined as follows:

$$y=y'+\tan(\alpha)\times(x'+1),$$

and the x coordinate of $R_{x,-1}$ is given by:

$$x=x'+co\tan(\alpha)\times(y'+1),$$

with tan(α) and co tan(α) the tangent and cotangent of the angle α, respectively. The PDPC weights for an adjacent top-right diagonal mode are, for example:

$$wT=32>>((y'<<1)>>\text{shift}),wL=32>>((x'<<1)>>\text{shift}),wTL=0, \text{ or}$$

$$wT=32>>((y'<<1)>>\text{shift}),wL=0,wTL=0.$$

Figure 18:
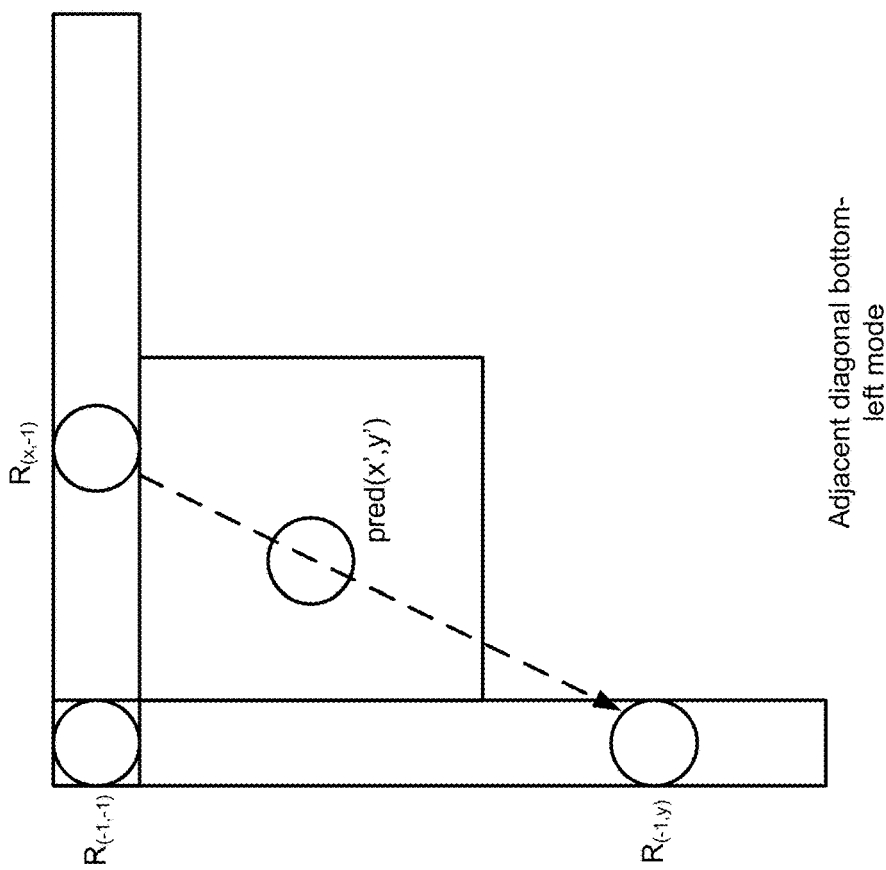
FIG. 18 is a conceptual diagram illustrating an adjacent diagonal bottom-left mode.

Similarly, the case of an adjacent bottom-left diagonal mode is illustrated in FIG. 18.

In general, for the angle β defined in FIG. 14, the x coordinate of the reference sample $R_{x,-1}$ is determined as follows:

$$x=x'+\tan(\beta)\times(y'+1),$$

and they coordinate of $R_{-1,y}$ is given by:

$$y=y'+co\tan(\beta)\times(x'+1),$$

with tan(β) and co tan(β) the tangent and cotangent of the angle β, respectively. The PDPC weights for an adjacent bottom-left diagonal mode are, for example:

$$wL=32>>((x'<<1)>>\text{shift}),wT=32>>((y'<<1)>>\text{shift}),wTL=0, \text{ or}$$

$$wL=32>>((x'<<1)>>\text{shift}),wT=0,wTL=0.$$

As is the case for DC, planar, horizontal and vertical mode PDPC, there is no additional boundary filtering, e.g., as specified in J. Yao et al, "Non-CE3: Intra prediction information coding", Joint Video Experts Team (WET) of ITU-T SG 16 WP 3 and ISO/IEC JTC 1/SC 29/WG 11, 13$^{th}$ Meeting: Marrakech, Mass., 9-18 Jan. 2019, document JVET-M0210 (hereinafter, "WET-M0210"), for diagonal and adjacent diagonal modes when PDPC is extended to these modes.

Affine linear weighted intra prediction (ALWIP), which is described in JVET-N0217, generates a prediction of a block from the neighboring reference samples using an affine linear weighted prediction model. The neighboring samples are first processed (e.g., in some cases, neighboring samples are down-sampled); the processed neighboring samples are then used to derive (e.g., using an affine model) a set of reduced samples which may resemble an intermediate down-sampled version of the predicted samples. The final prediction may be obtained by up-sampling (as necessary) the intermediate values. ALWIP may also be referred to as matrix intra prediction (MIP).

Figure 19:
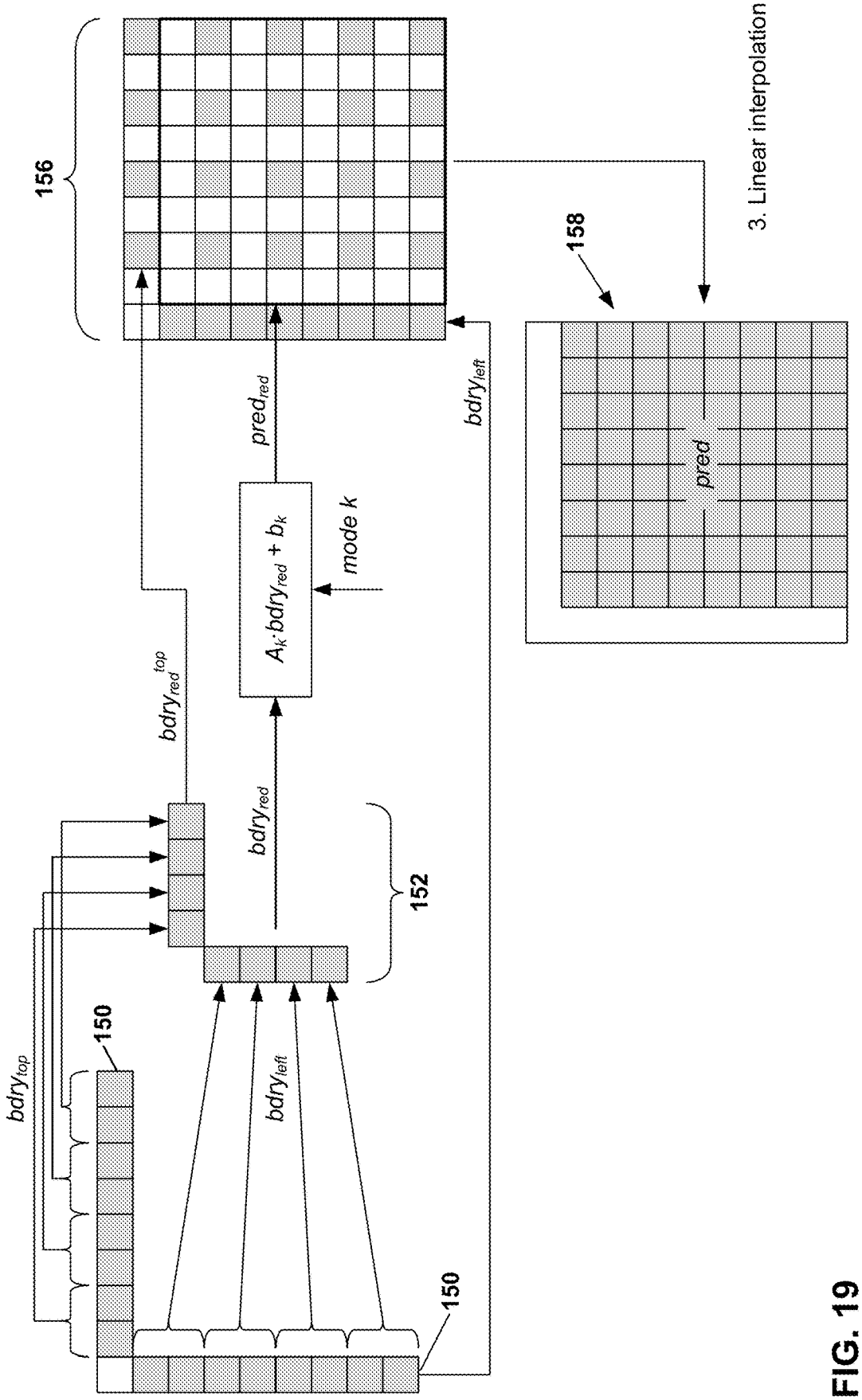
FIG. 19 is a conceptual diagram of an example of an Affine Weighted Linear Intra Prediction (ALWIP) process on an 8×8 block.

An illustration of the MIP process is given in FIG. 19. The reference samples 150 of a block (also referred to as boundary samples) are down-sampled to obtain reduced boundary samples 152. A vector representation of the boundary samples 154, $\text{bdry}_{red}$, is multiplied with a matrix $A_k$ and an offset/bias term $b_k$ is added to obtain a down-sampled version of prediction block 156, $\text{pred}_{red}$. A final prediction block 158 may be obtained by up-sampling the predicted samples $\text{pred}_{red}$ along with the boundary samples 150. The matrix $A_k$ and an offset/bias vector $b_k$ are chosen based on a mode value indicated for the block.

The derivation of intermediate predicted samples uses an affine linear weighted prediction model (i.e., a MIP model). Three types are defined, and the number of the intermediate samples derived differ for each type as follows:
1) 4×4 for block sizes of width and height both equal to 4.
2) 8×8 for block sizes of width and height both less than equal to 8 except when both width and height are equal to 4 (i.e., 4×8, 8×4 and 8×8 blocks).
3) 16×16 for blocks where at least one of width and height is greater than 8.

In each of these three types, different numbers of ALWIP modes are used: 35, 19, and 11, respectively.

The signaling of the ALWIP may include:
a) A flag (alwip_flag) to indicate that that the current block is coded with ALWIP
b) When the block is coded with ALWIP, another flag is signaled to indicate whether the current block is coded with an ALWIP-MPM mode or not.
   a. If ALWIP MPM, the MPM index is signaled.

b. Else, an index to the remaining mode value is signaled.

The alwip_flag is context coded with four contexts allowed:

If block width>2*height or height >2*width, context 3 is used.

Else context ctxId is used, where ctxId is derived as follows:
Initialized ctxId to 0
If left neighboring block is coded with ALWIP, ctxId++
If above neighboring block is coded with ALWIP, ctxId++

In other examples, different signaling may be used for ALWIP.

The derivation of the ALWIP MPM may involve the following steps:
1) LeftIntraMode and AboveIntraMode are initialized to −1
2) If the left neighboring block is intra coded
   a. If the left neighboring block is coded with ALWIP mode L
      i. If L is of the same ALWIP type as the current block, then LeftIntraMode is set equal to L.
   b. The intra mode of left neighboring block is mapped to an ALWIP mode of the same type as the current block, and assigned to LeftIntraMode.
3) If the above neighboring block is intra coded:
   a. If the above neighboring block is coded with ALWIP mode A.
      i. If A is of the same ALWIP type as the current block, then AboveIntraMode is set equal to A.
   b. The intra mode of above neighboring block is mapped to an ALWIP mode of the same type as the current block, and assigned to AboveIntraMode.
4) The MPMs are then derived based on LeftIntraMode and AboveIntraMode.

In other examples, the derivation of the ALWIP MPM may involve other steps or is not performed.

In the rest of the disclosure, blocks coded with ALWIP may be referred to as ALWIP-coded blocks, ALWIP blocks, MIP-coded blocks, or MIP blocks; other blocks (coded with regular intra prediction, intra sub-partitions, or multiple reference lines) may be referred to as non-ALWIP blocks or non-MIP blocks.

For a W×H block with max(W, H)≥8, the prediction signal arises from the reduced prediction signal $pred_{red}$ on $W_{red} \times H_{red}$ by linear interpolation. Depending on the block shape, linear interpolation is done in vertical, horizontal or both directions. If linear interpolation is to be applied in both directions, linear interpolation is first applied in a horizontal direction if W<H and linear interpolation is first applied in a vertical direction, else.

Consider without loss of generality a W×H block with max(W, H)≥8 and W≥H. Then, the one-dimensional linear interpolation may be performed as follows. Without loss of generality, it suffices to describe linear interpolation in the vertical direction. First, the reduced prediction signal is extended to the top by the boundary signal. Define the vertical up-sampling factor $U_{ver}=H/H_{red}$ and write $U_{ver}=2^{u_{ver}}>1$. Then, define the extended reduced prediction signal by:

$$pred_{red}[x][-1] = \begin{cases} bdry_{red}^{top}[x] & \text{for } W = 8 \\ bdry_{redII}^{top}[x] & \text{for } W > 8 \end{cases}.$$

Then, from this extended reduced prediction signal, the vertically linear interpolated prediction signal may be generated by $$pred_{red}^{ups,ver}[x][U_{ver} \cdot y + k] = \left((U_{ver} - k - 1) \cdot pred_{red}[x][y-1] + (k+1) \cdot pred_{red}[x][y] + \frac{U_{ver}}{2}\right) >> u_{ver}$$

for $0 \le x < W_{red}, 0 \le y < H_{red}$ and $0 \le k < U_{ver}$.

MIP uses several pre-defined parameters (matrices, offset vectors) to generate the predicted block using methods described above. An mpm_index or a mode index is signaled to determine the particular matrix to be used for a block. Both video encoder 200 and video decoder 300 have a pre-defined set of matrices to choose from. These matrices/parameters are often generated by training over several sequences. Ideally, the more matrices that are defined for MIP, the better would be the prediction. However, as the number of parameters increases, the signaling cost to specify the matrix that is to be used also increases. Moreover, the more parameters that are defined, the more memory is required to store these matrices in the read-only memory (ROM) of the device.

An optimal solution, such as a trade-off between prediction accuracy and memory/signaling costs may not be possible. However, different matrices may be beneficial for MIP for different content. Hence, it would be beneficial to allow more MIP matrices. A VVC encoder may have the computational resources to derive matrices that are tuned for particular content. Such a matrix may perform well for a particular content yet might not be generic enough to be useful for prediction for all other content. Having a fixed set of MIP matrices may be inefficient.

For ease of description, some terms are defined/clarified below; it is to be noted that the term "matrix" is used in the rest of the description to indicate a set of parameters that is used for MIP; this set of parameters may contain parameters for deriving the prediction of more than one sample and may be defined/derived as a collection of parameter subsets, each subset used to derive a sample. Thus, although the term matrix indicates a two-dimensional representation of parameters, no such representation may be available or even possible; in generic terms, the term matrix may just represent a collection of parameter subsets. Each parameter subset may be a list of parameters associated with:

1. MIP mode matrix: A MIP mode matrix is a matrix that contains the parameters used to perform the prediction associated with a MIP mode; for ease of explanation, this disclosure may refer to a MIP mode matrix as a matrix.
2. Default MIP mode (D-MIP mode): A D-MIP mode is a MIP mode that is pre-defined in the codec. Default MIP modes may be associated with some blocks based on one or more block characteristics or information derived from other syntax elements.
3. Explicit MIP mode (E-MIP mode): An E-MIP mode is a MIP mode that is derived from a matrix that is not included in the pre-defined MIP modes in the codec; this matrix may be signaled explicitly. Explicit MIP modes may be associated with some blocks based on one or more block characteristics or information derived from other syntax elements. Such association may also be signaled and derived/inferred at video decoder 300.

4. Reference sample location array (RSLA): An RSLA is a set of reference sample locations in the neighborhood of the current block that are used in MIP. Typically, the RSLA is associated with a MIP mode.
5. Predicted sample location array (PSLA): A PSLA is a set of sample locations in the current block that correspond to locations where a MIP mode directly generates predicted values. Typically, a prediction sample location array is associated with a particular MIP mode. In the context of FIG. 19, the shaded non-reference samples of prediction block 156 are a PSLA.
6. Explicit sample predictor parameter subset (ESPPS): An explicit sample predictor parameter subset is a subset of a matrix and contains the parameters that are used to predict a sample in a PSLA. Typically, an ESPPS is associated with a MIP mode and a predicted sample location. In some examples, a machine learning system is used to determine an ESPPS. Thus, in such examples, new MIP modes may be determined using a machine learning system.
7. MIP mode set: A MIP mode set is a collection of MIP modes. A MIP mode set may include D-MIP modes and E-MIP modes. Multiple MIP mode sets may be defined based on the signaling of E-MIP modes. MIP mode sets may be defined at the level of a codec, a sequence parameter set, a picture parameter set, a picture, a slice, a tile, or another level.
8. MIP mode list: A MIP mode list is a collection of MIP modes that may be a subset of the MIP mode set and that may be available for a particular picture.
9. Default MIP mode list: A default MIP mode list is a MIP mode list derived from a MIP mode set for the current picture using a default derivation method.
10. MIP mode list modification: MIP mode list modification is a process of modifying the default MIP mode list to generate a modified MIP mode list for the current picture. The MIP mode list modification process may include removing one or more MIP modes from the default MIP mode list and adding one or more MIP modes from the MIP mode set.

This disclosure describes techniques that may improve the efficiency of MIP. In accordance with the techniques of this disclosure, the following concepts may be defined.

1. Default MIP (D-MIP) mode set: A set of D-MIP modes form a D-MIP mode set. The set of D-MIP modes forming a D-MIP mode set may be specified in the codec and are available at video encoder 200 and video decoder 300. A matrix may be specified for each MIP mode. In some examples, the D-MIP mode set may contain all the MIP modes specified in the codec. In other examples, the D-MIP mode set or a particular block may contain only those D-MIP modes that are associated with the current block.
2. Explicit MIP (E-MIP) mode set: An explicit MIP mode set is specified as a set of MIP modes that is different from the D-MIP mode set in the codec. In some examples, E-MIP mode set contains E-MIP modes. E-MIP mode set may be conveyed to video decoder 300 by signaling or other means. Video encoder 200 may always choose a pre-defined set of additional mode for particular content. Video encoder 200 may convey these modes to video decoder 300 by one or more means disclosed in this document. In some examples, an E-MIP mode set may only contain E-MIP modes that are associated with the current block.
3. Total MIP (T-MIP) mode set: A total MIP mode set is a collection of D-MIP and E-MIP modes. In some examples, a T-MIP mode set may only contain D-MIP modes and E-MIP modes that are associated with the current block. A T-MIP mode set may be referred to simply as a MIP mode set for a picture or a set of pictures.

In some examples of this disclosure, MIP modes may be defined for a particular block or picture. For instance, in some such examples, a syntax element may be specified to indicate whether a D-MIP mode is used for the current block or an E-MIP mode is used for the current block. For example, a default MIP flag (e.g., default_mip_flag) may be signaled in the coding block syntax structure. In this example, a default_mip_flag equal to 1 specifies that a D-MIP mode is used and a default_mip_flag equal to 0 specifies that a D-MIP mode is not used, and an E-MIP mode is used instead.

A syntax element may be signaled to specify whether an E-MIP mode is specified with respect to an already specified mode (i.e., whether the E-MIP mode is a dependent E-MIP mode), or whether an E-MIP mode is specified independently (i.e., whether the E-MIP mode is an independent E-MIP mode). When an E-MIP mode is specified independently, video encoder 200 and video decoder 300 may derive the parameters of the E-MIP mode without using the parameters of another MIP mode. In other cases, video encoder 200 and video decoder 300 may derive the parameters of an E-MIP mode using the parameters of one or more MIP modes.

Signaling a matrix associated with a new MIP mode may include signaling a list of ESPPS's. Signaling an ESPPS may be conducted using independent ESPPS signaling or dependent ESPPS signaling.

When an ESPPS is signaled using independent ESPPS signaling, parameters of an ESPPS are signaled independent of other ESPPS's. A number of parameters in the ESPPS is derived at video decoder 300. The number of parameters in the ESPPS may be derived based on block characteristics or signaled in the bitstream.

In some examples, each parameter in an ESPPS is signaled using a specified coding scheme, such as fixed-length coding, exponential Golomb coding, or another type of coding. The parameters for coding these syntax elements may be derived from other syntax elements in the bitstream. For example, the number of bits used to signal the parameter may be dependent on a MIP category to which the E-MIP mode belongs. In some examples, the number of bits may be restricted to a certain range that may be pre-determined or signaled. In some examples, one or more parameters of an ESPPS may be delta-coded with a preceding parameter in the same ESPPS.

In dependent ESPPS signaling, parameters of an ESPPS may be signaled dependent on one or more ESPPS's (referred to as reference ESPPS's) of the same MIP mode. In some examples, one or more syntax elements may be signaled with an ESPPS specifying the reference ESPPS from which the ESPPS parameters are to be derived. For instance, in some examples, an index to the reference ESPPS may be specified, or a delta to the index to the reference ESPPS may be specified.

In some examples, an indication for the reference ESPPS may be associated with the position of a sample associated with the ESPPS. In the example of FIG. 19, shaded blocks in prediction block 156 are samples in a PSLA. If (x, y) specifies a relative position of a current sample in the PSLA, a reference index may be specified to be from the ESPPS of another sample in the PSLA. Or in other words, if (x1, y1) and (x2, y2) are two positions in the PSLA, the ESPSS of (x1, y1) may be derived from the ESPSS of (×2, y2); in this case, the reference index may specify the position of (×2, y2) based on position of (x1, y1) in relation to the block or (×2, y2) or both. In some examples, the x-coordinate of the (x, y) position of the current sample and the reference sample may be constrained to be the same. In some examples, the y-coordinate of the (x, y) of the current sample and the reference sample may be constrained to be the same.

In some examples, the reference samples may be constrained to be within a neighborhood of the (x, y) sample of the ESPPS. The neighborhood may be specified by one or more thresholds indicating x, y coordinate offsets or other means of specifying coordinates. For example, the reference sample may be constrained to the (x−1, y) or the (x, y−1) position in the PSLA.

In some examples, a constraint may be present to specify that the number of parameters in the ESPPS and its reference ESPPS shall be the same.

Furthermore, in some examples, only the number of parameters is signaled dependent on a reference ESPPS and the parameters are independently signaled. For instance, when the number of parameters in the ESPPS is different from the number of parameters in a reference ESPPS, a delta between the two number of parameters may be signaled.

In some examples, the first parameters of the ESPPS may be signaled dependent on one of the parameters (e.g., the first) of the reference ESPPS. In some examples, one or more parameters in the ESPPS may be signaled relative to a corresponding one or more parameters in a reference ESPPS. In some examples, a syntax element may indicate that an ESPPS may be obtained from the reference ESPPS through an operation (e.g., transpose, shifts, rotation, addition, subtraction, etc.).

In some examples, a syntax element may indicate that E-MIP parameters may be obtained from the reference MIP parameters through an operation (e.g., transpose, shifts, rotation, addition, subtraction, etc.). In some examples, a syntax element may indicate that an E-MIP parameter may be obtained from a reference MIP parameter based on a combination of two or more operations (e.g., shift and delta coding, default value initialization and delta coding, two or more shift operations, etc.).

In some examples, the reference ESPPS may belong to a different MIP mode. In such examples, one or more syntax elements may be specified to indicate the MIP mode of the reference ESPPS (e.g., a MIP mode index, or a MIP mode category followed by the MIP mode index, a delta of the index of the reference MIP mode and the current MIP mode). In some examples, an indication may also be signaled that specifies whether the reference ESPPS is a D-MIP mode or an E-MIP mode; this may be as simple as a syntax element, or may be derived from the reference MIP index specified (e.g., indices belonging to a certain range may be a D-MIP mode, and indices belonging to another range may be an E-MIP mode).

If fixed length codewords are used for an ESPPS, the number of bits used for the codewords may be pre-defined or signaled in the bitstream.

Collection of modes signaled—for a given picture, one or more E-MIP modes may be signaled. These E-MIP modes may be added to the E-MIP mode set.

Video encoder 200 and video decoder 300 may flush the E-MIP mode set at various points. Flushing the E-MIP mode set removes E-MIP modes from the set of MIP modes available for a picture. In some examples, the E-MIP mode set is flushed at the end of each picture. In some examples, the E-MIP mode set is flushed at the end of each access unit. An access unit may be a set of one or more picture units that belong to different layers and contain coded pictures associated with the same time for output from a decoded picture buffer. In some examples, the E-MIP mode set is flushed at the end of each coded layer video sequence or coded video sequence.

In some examples, video encoder 200 and video decoder 300 may perform parametric formulation of E-MIP modes. In some examples, a parametric form may be specified to define the matrices of E-MIP modes. In such cases, signaling an E-MIP mode may include signaling one or more of these parameters. For example, the matrix parameters associated with each mode may be specified as a set of piece-wise linear functions (where each piece may or may not be continuous); in such a case, only the slope and the intercept of the piecewise linear functions need to be signaled instead of all the parameters; the parameters can be derived from the piece-wise linear functions. Video decoder 300 may derive a MIP mode matrix of an E-MIP mode based on the parameter values. In some examples, a cubic expression may be used to describe the MIP mode matrix of the E-MIP mode, or a cubic expression may be used to describe an ESPPS of the E-MIP mode. The parameters of the parametric form may be signaled explicitly or delta-coded with respect to other parameters.

In some examples, video encoder 200 and video decoder 300 may implement a dynamic MIP mode set update process. The dynamic MIP mode set update process is a dynamic update process for MIP mode sets that may include one or more of the following steps:

1. Generate a default MIP mode set based on pre-defined MIP modes in the codec.
2. Update a sequence MIP mode set based on MIP modes specified in a sequence-level parameter set, e.g., a SPS. An operation to update the sequence MIP mode set may include adding one or more MIP modes to the MIP mode set or removing one or more modes from the MIP mode set. Video encoder 200 and video decoder 300 may derive the sequence MIP mode set from the default MIP mode set and MIP modes specified in the parameter sets.
3. Derive a picture MIP mode set from the sequence MIP mode set and any explicitly specified MIP modes for the current picture. The picture MIP mode set may have a temporary effect (i.e., the picture MIP mode set only affects the current picture) or the picture MIP mode set may be used to update the sequence MIP mode set. For instance, in one example, when the picture MIP mode set is used to update the sequence MIP mode set, one or more MIP mode sets in the sequence MIP mode set may be removed and one or more MIP mode sets specified for the current picture may be included in the sequence MIP mode set. In this example, the updated sequence MIP mode set may apply to one or more pictures that follow the current picture. Other factors may be used to determine whether the update for the MIP mode set is temporary or not. Factors that may be used to determine whether the picture MIP mode set is or is not temporary may include one or more of: whether the current picture is a reference picture, a temporal ID of the picture, a layer ID of the picture, a NAL unit type of the picture, a number of MIP modes available and/or signaled for the picture, and so on.
4. Determine a MIP mode list. Although one or more MIP modes may be available, only a subset of the MIP modes may be available for prediction for the current picture. This subset of the available MIP modes is represented in a MIP mode list for the current picture and may be derived based on syntax elements in the bitstream associated with MIP mode list generation or may be derived based on a pre-determined process.

5. Perform MIP mode list modification. One or more slices in a picture may use different MIP mode lists based on the characteristics of the picture. Video encoder 200 and video decoder 300 may generate such a MIP mode list based on modification instructions/signaling in the bitstream that takes a MIP mode list and modifies the contents by one or more the following operations: change the position of some of the MIP modes in the list, add one more modes from the picture MIP mode set, remove one or more modes from the picture MIP mode set, etc.

The signaling of the MIP mode index may be modified depending on the number of MIP modes that are present in the MIP mode list. For example, if there are k modes in the MIP mode list, then the number of bits that is needed to code the MIP mode index may be modified so as to efficiently code k MIP modes; a maximum value associated with signaling the MIP mode index may be set so as to efficiently code k MIP modes. When the number of MIP modes (k) is one, the MIP mode index may not be signaled, and the indication of MIP (i.e., an indication that a block is coded using MIP) may be associated with the MIP mode directly. When the number of MIP modes in the MIP mode list (k) is zero, restrictions may be placed on parameters of MIP signaling. For example, a syntax element specifying that a block is coded using MIP may be restricted to indicate that MIP is not enabled. Thus, in some examples, a MIP mode index may be signaled in the bitstream and signaling of the MIP mode index is dependent on a number of MIP modes in a MIP mode list. The MIP mode index indicates the MIP mode.

In some examples, a codec may impose constraints on other intra prediction modes. For instance, in some examples, a syntax element may be signaled in the bitstream to indicate that only MIP modes (E-MIP or D-MIP) may be used for the intra prediction for one or more pictures. In such cases, syntax elements associated with other intra prediction modes may not be signaled.

In some examples, an RSLA of a MIP mode may be specified to be aligned with the reference samples above and left of the current block that share the boundary with the current block or are immediately adjacent to the current block boundaries. In other examples, an RSLA may be specified to be a subset of the reference samples that are above and left of the current block. More generally, an RSLA may contain a subset of samples in the neighborhood of the current block.

When the RSLA samples of a MIP mode do not include all of the reference samples, a selection or derivation mechanism may be specified to derive the subset of samples that form the RSLA (e.g., down-sampling, random selection, etc.). For example, video encoder 200 may select and signal a derivation mechanism to derive the subset of samples that form the RSLA.

In some examples, a PSLA of a MIP mode may be specified to be a fixed set of sample locations. For example, a PSLA of a MIP mode may include all the sample locations of the predicted block. In other examples, a subset of the sample locations of the prediction block may be specified as the PSLA. When the PSLA of a MIP mode does not include all the sample locations of the prediction block, a process may be specified to derive the values at remaining/missing sample locations not covered by the PSLA (e.g., up-sampling). For instance, video encoder 200 may signal which process to use to derive the values at the remaining/missing sample locations not covered by the PSLA. Signaling the PSLA for specific MIP modes may increase the coding efficiency of those MIP modes. In the context of FIG. 19, the remaining/missing sample locations are indicated by white squares in prediction block 156.

In some examples, for each MIP mode, an RSLA and/or a PSLA may be specified. For example, an RSLA for a D-MIP mode may be specified to be all the reference samples that are above and left of the current block that are immediately adjacent to the current block boundary and a PSLA for the D-MIP mode may be specified as all the sample locations in the predicted block. In this example, an RSLA for an E-MIP mode may be a subsampled version of the reference samples and a PSLA for the E-MIP mode is a subsampled version of the sample locations in the prediction block. More generally, signaling/derivation mechanisms may be specified to identify an RSLA for a particular block (e.g., an index to a list of RSLA candidates) and a MIP mode. Similarly, signaling/derivation mechanisms may be specified to identify a PSLA for a particular block (e.g., an index to a list of PSLA candidates) and a MIP mode.

Thus, in some examples, a RSLA for a MIP mode is signaled in the bitstream. The RSLA for the MIP mode indicates a set of reference sample locations in a neighborhood of the current block that are used in the MIP mode. As part of using the MIP mode to generate the prediction block, a video coder (e.g., video encoder 200 or video decoder 300) may, for each sample location in a PSLA of the MIP mode, determine a prediction value by multiplying a reference sample at a reference sample location indicated by the RSLA for the MIP mode by a matrix coefficient of a matrix specified in the MPS associated with the MIP mode and adding an offset value specified in the MPS associated with the MIP mode. In some circumstances, signaling the RSLA for a MIP mode may increase coding efficiency.

There may be various relationships between MIP modes and other processes (filtering, PDPC, etc.). For example, one or more of the following processes may be associated with a MIP mode, or more particularly an E-MIP mode. In this example, the association may be derived based on pre-defined rules, or the association may be signaled as part of the E-MIP mode:

1. Reference sample filtering
2. Interpolation filter that is used (e.g., Gaussian, HEVC chroma interpolation filter, etc.)
3. PDPC
4. Boundary filtering One or more constraints specified above may be specified at a picture level. However, in other examples, one or more of the constraints specified above may be specified at levels other than the picture level. For example, an E-MIP mode associated with a picture may be associated with all the pictures in the access unit. In another example, the constraints described above on the other intra prediction modes may apply at an access unit level, a sequence level, etc.

In some examples, the number of bits used to signal the MIP parameters (e.g., matrices, offsets, etc.) may be fixed or the number of bits used to signal the MIP parameters may be signaled in the bitstream. In some examples, the MIP parameters may be signaled using codewords that do not explicitly have a specific number of bits (e.g., exponential Golomb coding).

As described above, using a MIP mode to generate a prediction block may include multiplying reference samples by matrix coefficients and adding offset values. The results of the multiplication and addition may be referred to as intermediate values and the bit depths of the intermediate values may be referred to as intermediate bit depths. In typical fixed point operations that include multiplication or addition/subtraction, there are instances where the precision (or number of bits) needed to store the result of the operation is larger than the precision of one or more operands. For example, when a n-bit number is multiplied with an m-bit number, the maximum precision of the output is likely to be n+m bits; similarly, when a n-bit number is added with an m-bit number, the maximum precision of the output is likely to be max(n,m)+1 bits. Although the precision of these intermediate values may be higher, the final result may have a smaller precision/bit depth (which is often achieved by rounding or shifting). The intermediate bit depths of the operations of prediction may be specified to be the same as that of the D-MIP modes. More generally, the intermediate bit-depths of the operations of prediction may also be specified for each E-MIP mode separately. For instance, the intermediate bit-depths for the operations of prediction may be determined/derived by a pre-defined process or signaled in the bitstream.

In some examples, the MIP parameters may be used to collectively indicate that all the parameters that are signaled along with MIP mode parameters. The coding of one or more syntax elements used for the parameters may be signaled using any method such as fixed length coding, Golomb coding, truncated binary coding, truncated unary coding, etc. One or more parameters associated with the coding (e.g., the number of bits use to signal the syntax element, binarization parameters such Rice parameters, maximum symbol value, etc.) may be dependent on one or more syntax elements signaled in the bitstream.

One or more constraints specified in the disclosure may be subject to further constraints or limitations based on the block shape, block width and height, aspect ratio, intra mode used or other syntax elements or characteristics of the variables derived thereof. For example, the decision to add additional modes may only be applied for certain aspect ratios such as not equal to 1 (i.e., non-square blocks), or that MIP parameter set update may only be applied for block sizes larger than a particular threshold (such as width or height larger than or equal to 8).

In some examples, one or more syntax elements may be signaled to indicate a set of available D-MIP modes. For instance, a D-MIP mode that is not considered available may not be used for MIP for blocks/pictures that refer to the parameter set or syntax structure indicating such availability. The signaling may include a loop or list of flags to indicate which D-MIP mode is to be considered as included in the MIP mode set or MIP mode list. Each flag in the loop or list of flags corresponds to a D-MIP mode. In this context, if there are KD-MIP modes, then K flags are signaled. In some examples, a flag having a value of 1 indicates that a D-MIP is included in the MIP mode set or MIP mode list; the flag having a value of 0 indicates that the D-MIP is not included in the MIP mode set of MIP mode list. Signaling of one or more syntax elements related to a MIP mode may also be modified based on the number of E-MIP modes and number of D-MIP modes that available. The availability of MIP modes may be derived at the sequence level or may be at the level of frame/picture, block, bitstream, tile, brick, or other level. The determination of where the availability of MIP modes is derived may be based on signaled syntax elements, a location of the associated syntax structure, or in another manner.

When MPS signaling is done at multiple levels (e.g., at the SPS, PPS, APS, etc.), one set of signaling may override or modify the MIP set or MIP list derived from another level. For example, MPS signaling at an APS or PPS level may modify the MIP set or list derived at the sequence level. Such modification may be temporary or permanent.

One or more of the examples disclosed above apply to MIP modes or may apply to MIP matrices. In some examples, one matrix or one set of methods may be used to derive more than one MIP mode. For example, a matrix may be associated with one parameter and its transpose may be associated with another parameter.

One or more techniques may be defined so as to derive one or more MIP modes from one set of parameters. For instance, in some examples, deriving one or more MIP modes from a set of MIP parameters may involve a regular or an irregular down-sampling of MIP parameters. The down-sampling of these MIP parameters may be associated with down-sampling filters. Thus, one set of MIP parameters (that are associated with an MIP mode) may be used to derive the MIP parameters that may be associated with another MIP mode. For example, MIP parameters that are applicable for an 8×8 block may be down-sampled by a factor of 2 to obtain MIP parameters for a 4×4 block. The choice of the filter (e.g., length of the filter, filter coefficients, etc.) and/or the down-sampling factor may be determined by one or more of the following parameters: MIP mode and/or category associated with the matrix, MIP mode and/or category associated with the MIP mode, block size, etc.

Although this disclosure describes the technique for signaling parameters of MIP, the techniques of this disclosure may be applicable to any prediction method where the parameters for prediction may be signaled in the bitstream. This may include other matrix-style prediction techniques, or more generally, any prediction method.

Figure 20:
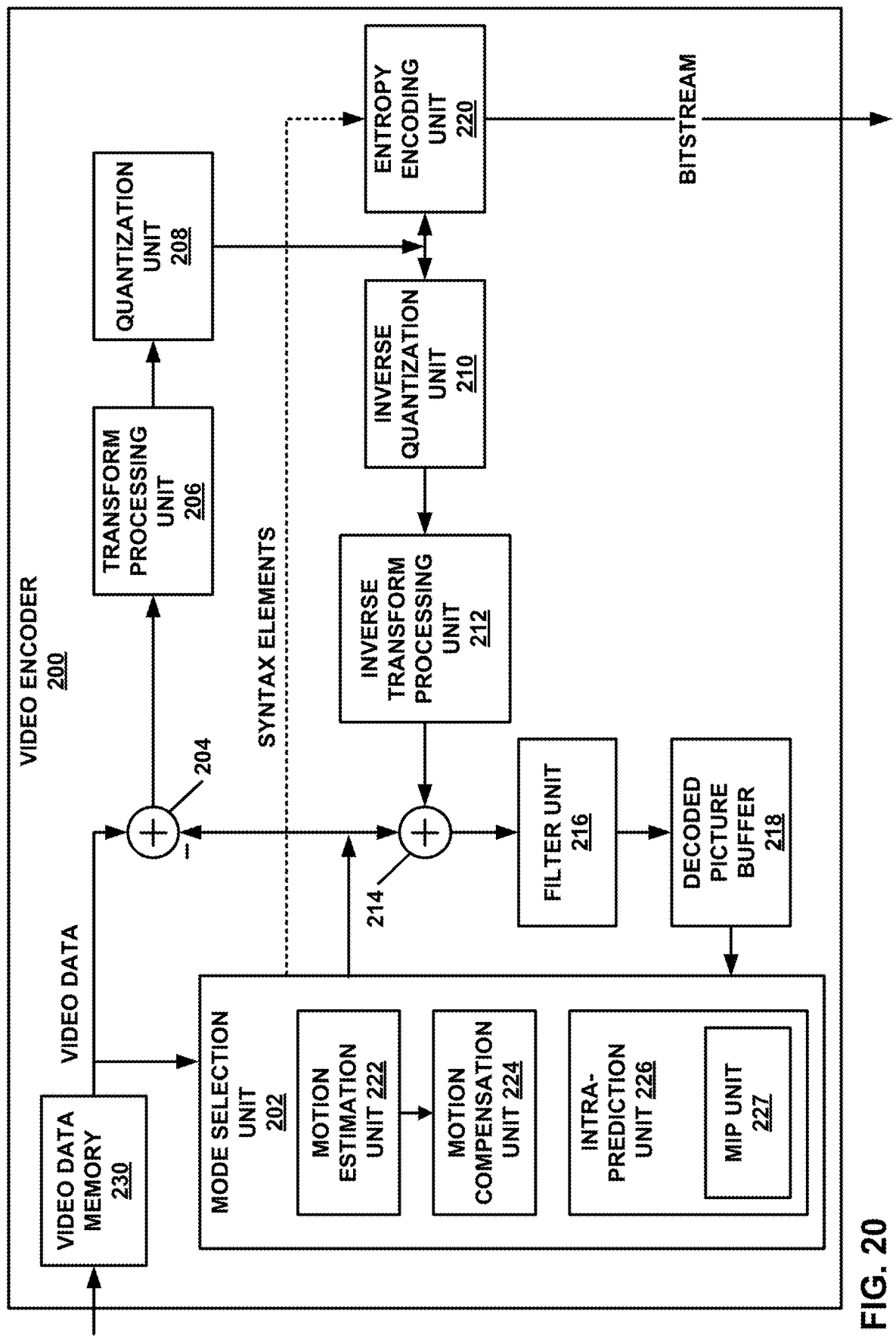
FIG. 20 is a block diagram illustrating an example video encoder that may perform the techniques of this disclosure.

FIG. 20 is a block diagram illustrating an example video encoder 200 that may perform the techniques of this disclosure. FIG. 20 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266/VVC video coding standard in development. However, the techniques of this disclosure are not limited to these video coding standards and are applicable generally to video encoding and decoding.

In the example of FIG. 20, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions. For instance, as shown in the example of FIG. 20, intra-prediction unit 226 may include a MIP unit 227.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 20 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that define the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

In the example of FIG. 20, MIP unit 227 may use a MIP mode to generate a prediction block for a current block of video data. For instance, MIP unit 227 may perform the process shown in the example of FIG. 19 to generate the prediction block. However, in accordance with one or more techniques of this disclosure, MIP unit 227 may determine a plurality of available Matrix Intra Prediction (MIP) parameter sets (MPS's) for a picture of the video data. The plurality of available MPS's is a union of (i) a subset of all default MPS's and (ii) a set of additional MPS's. Each of the default MPS's is associated with a predefined MIP mode in a codec (e.g., VVC or another video codec) each of the set of additional MPS's is associated with a new MIP mode. MIP unit 227 may use a MIP mode associated with an MPS in the plurality of available MPS's to generate a prediction block for a current block of the picture. Video encoder 200 may signal the set of additional MPS's in a bitstream that includes an encoded representation of the video data.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processors implemented in circuitry and configured to implement any of the techniques of this disclosure. For instance, in one example, video encoder 200 represents an example of a device configured to encode video data including a memory configured to store video data, and one or more processors implemented in circuitry and configured to determine a plurality of available MPS's for a picture of the video data. The plurality of available MPS's is a union of (i) a subset of all default MPS's and (ii) a set of additional MPS's. In this example, each of the default MPS's is associated with a predefined MIP mode in a codec, and each of the set of additional MPS's is associated with a new MIP mode. Furthermore, in this example, the one or more processors may be configured to use a MIP mode associated with an MPS in the plurality of available MPS's to generate a prediction block for a current block of the picture. The processors may signal the set of additional MPS's in a bitstream that comprises an encoded representation of the video data. The processors may be further configured to generate residual data for the current block based on the prediction block for the current block and samples of the current block.

Figure 21:
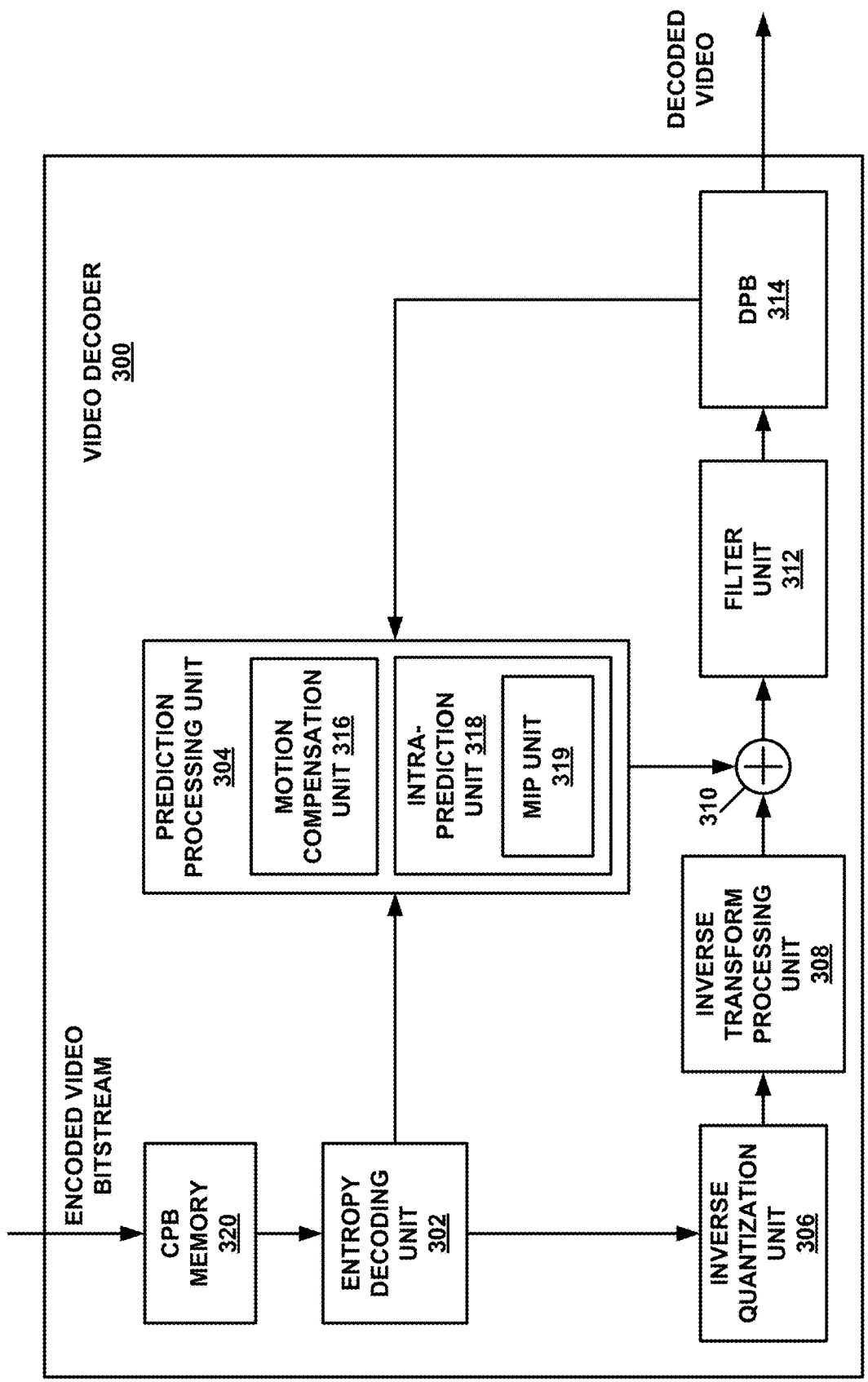
FIG. 21 is a block diagram illustrating an example video decoder that may perform the techniques of this disclosure.

FIG. 21 is a block diagram illustrating an example video decoder 300 that may perform the techniques of this disclosure. FIG. 21 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 21, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions. For instance, in the example of FIG. 21, intra-prediction unit 226 may include a MIP unit 227.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 21 are illustrated to assist with understanding the operations performed by video decoder 300. The units may be implemented as fixed-function circuits, programmable circuits, or a combination thereof. Similar to FIG. 20, fixed-function circuits refer to circuits that provide particular functionality, and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 20).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 20). Intra-prediction unit 318 may retrieve data of neighboring samples to the current block from DPB 314.

In accordance with a technique of this disclosure, MIP unit 227 of intra-prediction unit 318 may generate the prediction block. For instance, MIP unit 227 may determine a plurality of available MPS's for a picture of the video data. The plurality of available MPS's is a union of (i) a subset of all default MPS's and (ii) a set of additional MPS's that are signaled in the bitstream. Each of the default MPS's is associated with a predefined MIP mode in the codec. Each of the set of additional MPS's is associated with a new MIP mode in a set of new MIP modes. MIP unit 227 may use a MIP mode associated with an MPS in the plurality of available MPS's to generate a prediction block for a current block of the picture.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a video decoding device including a memory configured to store video data, and one or more processors implemented in circuitry and configured to implement any of the techniques of this disclosure. For instance, in one example, video decoder 300 may represent an example of a video decoding device including a memory configured to store video data, and one or more processors implemented in circuitry and configured to obtain a bitstream that includes an encoded representation of the video data that is encoded using a codec. The one or more processors may be further configured to determine a plurality of available MPS's for a picture of the video data. In this example, the plurality of available MPS's is a union of (i) a subset of all default MPS's and (ii) a set of additional MPS's that are signaled in the bitstream, each of the default MPS's is associated with a predefined MIP mode in the codec, and each of the set of additional MPS's is associated with a new MIP mode in a set of new MIP modes. Furthermore, the one or more processors may be configured to use a MIP mode associated with an MPS in the plurality of available MPS's to generate a prediction block for a current block of the picture. The one or more processors may further be configured to reconstruct the current block based on the prediction block for the current block and residual data for the current block.

The following text describes an example of how one or more techniques disclosed in this disclosure may be implemented. In accordance with a first example implementation, a set of $N_D$ D-MIP modes are specified, and a set of $N_E$ E-MIP modes are specified for a current picture. Each D-MIP mode pertains to an RSLA and a PSLA that covers the subsampled version of the predicted block. In this example, all E-MIP modes pertain to the same RSLA and PSLA. The ESPPS for each D-MIP mode is represented as a vector of parameters. numParamPSLA(nW, nH) and numParamRSLA(nW, nH) can be used to denote the number of parameters in the i-th ESPPS for a nW×nH size predicted block for the PSLA and RSLA, respectively.

$A_k$ for k=0 . . . $N_D$−1 can be used to denote the $N_D$ D-MIP matrices for a current block of size nW×nH, where $A_k$ is a nP×nR matrix, where nP=numParamPSLA(nW, nH) and nR=numParamRSLA(nW, nH). The matrices $A_k$ are predefined and are already available in video encoder 200 and video decoder 300.

The $N_E$ E-MIP modes are signaled as follows. This signaling may be in a coding unit syntax structure, a SPS, a PPS or any syntax structure in the bitstream. When signaled in a particular parameter set (e.g., an SPS, a PPS, or other type of parameters set), the $N_E$ E-MIP modes are specified for all the slices that refer to the particular parameter set. For example, if video encoder 200 determines that a set of E-MIP modes is beneficial for particular video content, video encoder 200 may signal these E-MIP modes in the SPS, thus making the set of E-MIP modes available for all the pictures that refer to the SPS. The following is an example syntax table that contains syntax elements for signaling E-MIP modes.

SYNTAX TABLE 3

|  | Descriptor |
|---|---|
| ... | |
| num_emip_modes | ue(v) |
| for( i = 0; i < num_emip_modes; i++ ) | |
|   emip_type_flag[ i ] | |
|   emip_associated_block_params( ) | |
|   emip_infer_num_psla_flag[ i ] | |
|   if( !emip_infer_num_psla_flag ) | |
|     emip_num_psl[ i ] | |
|   emip_infer_num_rsla_flag[ i ] | |
|   if( !emip_infer_num_rsla_flag[ i ] ) | |
|     emip_num_rsl[ i ] | |
|   for( m = 0; m < emip_num_psl[ i ]; m++ ) | |
|     emip_num_addn_params[ i ][ m ] | |
|     for( n = 0; n < emip_num_rsl[ i ] + | |
|     emip_num_addn_params[ i ][ m ]; n++ ) | |
|       emip_param[ i ][ m ][ n ] | |

In Syntax Table 3, num_emip_modes specifies the number of emip modes that are signaled immediately following this syntax element. The value of num_emip_modes may be in the range of 0 to 15, inclusive.

Furthermore, in Syntax Table 3, emip_type_flag[i] equal to 0 specifies that the parameters of the i-th E-MIP mode may be derived independent of parameters of other MIP modes. emip_type_flag[i] equal to 1 specifies that the parameters of the i-th E-MIP mode may be derived from parameters of one or more MIP modes. The MIP mode from which the parameters of the i-th E-MIP mode are derived is referred to as the reference MIP mode of the i-th E-MIP mode.

Thus, in some examples, a syntax element (e.g., emip_type_flag) in the bitstream indicates whether an MIP mode is specified with respect to an already-specified MIP mode or whether the MIP mode is specified independently. Based on the syntax element indicating that the MIP mode is specified with respect to the already-specified mode, video decoder 300 may derive parameters of the MIP mode using parameters of one or more MIP modes. Otherwise, based on the syntax element indicating that the E-MIP mode is specified independently, video decoder 300 may derive parameters of the MIP mode without using any parameter of any other MIP mode. Likewise, video encoder 200 may derive parameters of the MIP mode using parameters of one or more MIP modes and signal a syntax element (e.g., emip_type_flag=1) in the bitstream that indicates that the MIP mode is specified with respect to an already-specified MIP mode. Alternatively, video encoder 200 may derive parameters of the MIP mode without using any parameter of any other MIP mode and may signal a syntax element (e.g., emip_type_flag=0) in the bitstream that indicates that the MIP mode is specified with independently.

In Syntax Table 3, emip_num_rsl[ ] and emip_num_ps1[ ] may be used to specify the number of entries in the RSLA and PSLA, respectively, associated with the i-th E-MIP mode.

In Syntax Table 3 above, emip_infer_num_psla_flag[ ] (and similarly emip_infer_num_rsla_flag[ ]) may be used to specify the number of entries in PSLA that may be inferred from other MIP modes, or derived from other MIP modes.

In some examples, an additional syntax element emip_num_addn_params[ ] may be specified to indicate additional parameters needed to perform the MIP. For instance, an offset parameter may be defined in each ESPPS that is used in the prediction, in which case emip_num_addn_params[ ] may be set equal to 1.

emip_param[i][m][n] specifies the n-th E-MIP parameter associated with the m-th predicted sample location of the i-th E-MIP mode. When not present, one or more syntax elements specified in this disclosure (e.g., num_emip_modes, emip_type_flag, emip_num_rsl, emip_num_psl, emip_infer_num_psla_flag, emip_infer_num_rsla_flag, emip_num_addn_params, etc.) may be inferred to be a default value (e.g., zero). The n-th E-MIP parameter may be a matrix coefficient or an offset value.

In some examples, an additional syntax element may be signaled that specifies the index of the reference MIP mode of the i-th MIP mode.

In some examples, the emipparam value is signaled as such for the first parameter of the ESPSS, and subsequent E-MIP parameters are delta-coded with respect to the preceding E-MIP parameter. In other words, a subsequent E-MIP parameter is signaled using a syntax element that indicates a difference between the subsequent E-MIP parameter and a previous E-MIP parameter. The following syntax table shows an example syntax in which subsequent E-MIP parameters are delta-coded.

SYNTAX TABLE 4

```
...
    for( m = 0; m < emip_num_psl[ i ]; m++ )
        emip_num_addn_params[ i ][ m ]
        emip_param[ i ][ m ][ 0 ]
        for( n = 1; n < emip_num_rsl[ i ] +
emip_num_addn_params[ i ][ m ]; n++ )
            delta_emip_param[ i ][ m][ n ]
            emip_param[ i ][ m ][ n ] = emip_param[ i ][ m ][ n − 1 ] +
                delta_emip_param[ i ][ m ][ n ]
```

In Syntax Table 4, delta_emip_param[i][m][n] may be used to specify a delta value associated with a E-MIP parameter. The delta value may be used to derive the n-th E-MIP parameter associated with the m-th predicted sample location of the i-the E-MIP.

In some examples, a reference MIP index may be signaled for an E-MIP mode. The reference MIP index may point to a D-MIP mode or a previously signaled E-MIP mode. The emip_param[ ][ ][ ], emip_num_addn_params[ ][ ] and other related parameters may be delta-coded with respect to the corresponding values of the reference MIP.

In some examples, in addition to the above signaling, video encoder 200 may also signal the positions of a PSLA and an RSLA of an E-MIP mode. For example, the samples of the location arrays (i.e., the PSLA and the RSLA) of the E-MIP mode may be specified and signaled as set of (x, y) coordinates. In some examples, the samples of the location arrays of an E-MIP mode are specified as offsets from the block boundaries, picture boundaries, tile boundaries, brick boundaries, or boundary of any type of spatial region that may be defined and that contains the current block. In some examples, the samples of the location arrays of an E-MIP mode are specified as offsets in a scan order that traverses a region containing the current block. Example scan orders may include a raster scan order, a z-scan order, a diagonal scan order, a reverse scan order, or any other scan order that may be defined. A spatial region that may be used to specify the scan order may differ from the region of the block (e.g., the scan order may be at a CU level, whereas the block may be a TU block). The reference point of the coordinates (corresponding to coordinate (0,0)) may be chosen as the top-left sample of the block, CU, TU, tile, picture, brick, or any other location that has some relation to the current block. In some examples, the PSLA and the RSLA may not have different specification of signaling methods.

Thus, in some examples, as part of using a MIP mode to generate a prediction block for a current block, video encoder 200 and video decoder 300 may, for each sample location in the PSLA of the MIP mode, predict a sample for the sample location using parameters contained in the ESPPS corresponding to the sample location. Video encoder 200 and video decoder 300 may interpolate remaining samples of the prediction block based on the predicted samples for the sample locations of the PSLA of the MIP mode. In such examples, the ESPPS for the MIP mode may be signaled in the bitstream dependent on another ESPPS or independent of any other ESPPS. Furthermore, in some examples, the PSLA of the MIP mode may be signaled in the bitstream.

A second example implementation of the techniques of this disclosure implements a variation on the idea of signaling MIP parameters. In the second example implementation, it is assumed that the position of the reference and predicted samples are not modified. For example, different categories of MIP modes may be specified, and each category may have a specific definition of the RSLA and PSLA for the particular category and for the particular block size. For example, in JVET-N1008-v8, three categories of blocks are specified for particular block sizes:

| Category | Block sizes | Number of MIP modes | Number of parameters |
|---|---|---|---|
| 0 | 4 × 4 | 35 | 1440 |
| 1 | 4 × 8, 8 × 4, 8 × 8 | 19 | 1440 |
| 2 | Other block sizes | 11 | 3456 |

The location of the RSLA and PSLA are also defined in JVET-N1008-v8 (based on a subset of reference sample locations, which may be derived from a down-sampled grid of the reference samples, and a subset of the predicted block samples, which may be a down-sampled grid of reference samples).

In this example, the MIP modes that are defined are associated with the category of MIP modes that are defined. For each category of MIP modes defined, new MIP modes may be included in the category. In addition, some existing MIP modes (i.e., D-MIP modes) may also be considered to be unavailable.

The following definitions may apply with respect to the second example implementation:
MIP parameter set (MPS): a set of parameters that are associated with a MIP mode which is used to predict a block coded with the MIP mode. The MPS collectively refers to all the parameters that are associated with a MIP mode (e.g., matrix coefficients, offset vectors, etc.).
MPS subset: a subset of parameters of an MPS that is used to predict one sample in the predicted block. Under the current MIP design, this sample may belong to a down-sampled grid in the predicted block. An MPS subset may refer to one row of the matrix used by a MIP mode and one entry of its offset vector.
Default MIP parameter set (DMPS): an MPS that is associated with a pre-defined MIP mode (i.e., a D-MIP mode) in the codec.
Additional MIP parameter set (AMPS): an MPS that is signaled in the bitstream and is associated with a new MIP mode (i.e., an E-MIP mode). An AMPS may be signaled independently or signaled dependent on one or more MPS's. An AMPS may be signaled in a sequence parameter set or other type of parameter set.
Available MIP parameter set (Available MPS): a MIP parameter set that is available for a particular block. In some examples, the available MIP parameter set is the same for all the blocks of pictures in a sequence, such as a coded video sequence. The available MIP parameter set is a union of all AMPS's signaled in the SPS (or other type of parameter set) and a subset of all the DMPS's.

The MPS A associated with a MIP mode may be defined as a vector of parameters. Let $N_{MPS}(A)$ be the number of parameters associated with the MIP mode. The parameters in A may be used to define a matrix and an offset vector.

Furthermore, $N_{DMPS}[i]$ can be the number of DMPS's belonging to the i-th category specified in the codec. When an AMPS is specified to be dependent on a previously defined MPS (i.e., a reference DMPS), an index to the reference DMPS is signaled and the parameters are signaled as delta values from the parameters of the reference DMPS.

In some examples, video encoder 200 and video decoder 300 are allowed to predict an AMPS from other AMPS's specified in the bitstream, such as those AMPS's that are signaled before the AMPS. In other words, an AMPS with index i may be allowed to refer to an AMPS with index j where j<i.

Furthermore, in the second example implementation, available MPS's for each picture are determined by indications in the bitstream. In addition to the AMPS's signaled in the SPS, the signaling may also indicate which pre-defined DMPS's are not to be considered for (i.e., not available in) the sequence. The determination of available MPS's may be performed once every sequence and does not change within a sequence.

In some examples where the available_mps syntax structure or a subset of the available_mps may be signaled in other parameters sets (e.g., APS, PPS, VPS, DPS, etc.) or other parts of the bitstream (e.g., slice header), or defined for a granularity other than sequences (e.g., picture, frame, slice, tile, brick, block, tile group, etc.), the available MPS's may be determined/derived at the respective granularity, or at the granularity where the available MPS's may be different from previously derived available MPS's.

In some examples, when there is more than one category of blocks, a different set of DMPS's is specified for each category. Similarly, in some examples, the set of AMPS's is specified for each category separately. Thus, in some examples, the available MPS's for a picture may include at least one MPS for each category in a plurality of categories. In some such examples, each category in the plurality of categories may correspond to a different set of block sizes or may be otherwise defined.

In accordance with the second example implementation, a syntax structure for an AMPS may be specified in a sequence parameter set as shown in Syntax Tables 5 and 6, below.

SYNTAX TABLE 5

| | Descriptor |
|---|---|
| sequence_parameter_set( ) | |
| ... | |
|   amps_present_flag | u(1) |
|   if( amps_present_flag ) | |
|     available_mps_syntax( ) | |
| ... | |

SYNTAX TABLE 6

| | Descriptor |
|---|---|
| available_mps_syntax( ) { | |
|   num_amps | ue(v) |
|   for( i = 0; i < num_amps; i++ ) { | |
|     amps_type_idc[ i ] | u(2) |
|     pred_amps_flag[ i ] | u(1) |
|     num_bits_for_amps_param_val[ i ] | ue(v) |
|     if( pred_amps_flag[ i ] ) | |
|       ref_mps_idx[ i ] | |
|     for( j = 0; j < NumPredSamples[ amps_type_idc[ i ] ]; j++ ) { | |
|       if( pred_amps_flag[ i ] ) | |
|         pred_amps_subset_flag[ i ][ j ] | u(1) |
|       for( k = 0; k < NumRefSamples[ amps_type_idc[ i ] ]; k++ ) | |
|         amps_param_val[ i ][ j ][ k ] | s(v) |
|     } | |
|   } | |
|   modify_available_dmps_flag | u(1) |
|   if( modify_available_dmps_flag ) | |
|     for( m = 0; m <= 2; m++ ) | |
|       for( n = 0; n < $N_{DMPS}$[ m ]; n++ ) | |
|         dmps_included_flag[ m ][ n ] | u(1) |
| } | |

In some examples, the amps_type_idc[ ] is not be signaled, and an AMPS may be signaled in a different loop for each MIP category separately. In the syntax structure shown in Syntax Table 7, below, the number of AMPS's for each category is signaled separately. The signaling and definition of the other syntax elements are also modified accordingly. In some alternatives, one modify_available_dmps_flag is signaled for removing a whole group.

SYNTAX TABLE 7

|  | Descriptor |
|---|---|
| available_mps_syntax( ) { |  |
|   for( m = 0; m <= 2; m++ ) |  |
|     num_anips[ i ] | ue(v) |
|   for( i = 0; i < num_amps[ i ]; i++ ) { |  |
|     pred_amps_flag[ m ][ i ] | u(1) |
| ... |  |

In some examples, the binarization and coding of the syntax elements above (e.g., num_amps, pred_amps_flag, and/or other syntax elements including syntax element described elsewhere in this disclosure) is only one example, and that other codewords and binarization schemes may also be used for one or more syntax elements. For example, the syntax elements may be coded using exponential Golomb coding, Golomb coding, Rice coding, fixed-length coding, unary coding, truncated unary coding, truncated binary coding, etc., or a combination thereof.

In some examples, the modify_available_dmps_flag syntax element may be signaled for each category separately. In other examples, other ways of signaling a set of available DMPS's may be employed, e.g., a list of indices corresponding to the DMPS's that are included, a list of indices corresponding to DMPS's that are not included, and so on.

In Syntax Table 6, above, the variables NumPredSamples [ ] and NumRefSamples[ ] are dependent on the block size category. Furthermore, the following semantics may be specified for syntax elements in Syntax Tables 5-7, above.

available_mps_present_flag equal to 1 specifies that the available_mps_syntax( )syntax structure is signaled in the SPS. available_mps_present_flag equal to 0 specifies that the available_mps_syntax( ) structure is not signaled in the SPS.

num_amps specifies the number of additional MPS's signaled in the amps_syntax( )structure. The value of num_amps shall be in the range of 0 to 15, inclusive.

amps_type_idc[i] specifies the MIP size ID associated with the i-th AMPS. The value of amps_type_idc[i] shall be in the range of 0 to 2, inclusive.

In some examples, the AMPS signaling may be allowed to define matrices for new categories of MIP modes. A category may be defined specific to one or more of the following parameters: block size, width, height, RSLA, PLSA, or other identifiers, including but not limited to prediction mode, characteristics of neighboring blocks, etc. In some cases, such categories may be defined in the specification of a codec. In other cases, signaling associated with defining such categories (e.g., signaling one or more parameters defining a category) are also included in the bitstream. For instance, a set of categories of MIP modes may be signaled and defined in addition to some categories already defined in the matrices (the categories are pre-defined and signaled types may be included in different lists or may be included in the same list), and each AMPS may specify an index (indices, e.g., syntax element to specify pre-defined or signaled, and index to the particular category) to the category. In this example, three pre-defined categories are specified and no signaled categories are included.

In some examples where the number of categories is other than 2, the signaling may be modified to reflect that, e.g., there are five categories and so the value range shall be 0 to 4, inclusive. Similarly, the number of categories may be derived/signaled, in which case the value range will vary accordingly. The binarization or coding of one or more syntax elements may also vary accordingly.

pred_amps_flag[i] equal to 1 specifies that an i-th AMPS is dependent on another MPS specified by ref_mps_idx[i]. pred_amps_flag[i] equal to 0 specifies that the i-th AMPS is signaled independent of other MPS.

num_bits_for_amps_param_val_minus1[i] plus 1 specifies the number of bits used to signal the syntax element amps_param_val[i][j][k]. The value of num_bits_for_amps_param_val_minus1[i] shall be in the range of 0 to 5, inclusive.

In some examples, other constraints may apply on the number of bits for num_bits_for_amps_param_val_minus1. For example, the number of bits may be restricted to be less than a particular threshold, and the threshold may be signaled in the bitstream (e.g., in any parameter set or other part of bitstream).

In some examples, the number of bits used to specify the syntax element MPS parameter may be dependent on the MPS category, or other syntax elements. In some examples, the number of bits may be derived from the syntax element num_bits_for_ampsparam_val_minus1[ ].

In other examples, the number of bits may be different for different MPS parameters. For each MPS parameter, or subsets of MPS parameters, the number of bits may be explicitly signaled, or inferred by the video coder (e.g., video encoder 200 or video decoder 300). In other examples, the number of bits may be specified to be constrained by a threshold that is signaled.

ref_mps_idx[i] specifies the index of the MPS used to derive the parameters of the i-th MPS. The value of ref_mps_idx[i] shall be in the range of 0 to $N_{DMPS}[i]-1$, inclusive. The MPS indicated by ref_mps_idx[i] is referred to as the reference MPS for the i-th AMPS.

In some examples, when pred_amps_flag[i] is equal to 1, it is a requirement of bitstream conformance that the value of MipSizeId[ ][ ] associated with the reference MPS of the i-th AMPS shall be equal to amps_type_idc[i].

The number of bits used to signal ref_mps_idx[ ] may be dependent on a number of DPMS's available. For example, the number of bits used to represent ref_mps_idx[i] may be set equal to $Ceil(Log 2(N_{DMPS}[i]-1))$. In other examples, the number of bits may be dependent on a number of MPS's or a number of available MPS's. In other examples, the number of bits may be dependent on a number MPS derived by a sum of the number of DMP S's and a sum of the number of AMPS's already signaled.

pred_amps_subset_flag[i][j] equal to 1 specifies that the j-th subset of the i-th MPS is predicted from the j-th subset of the reference MPS. pred_amps_subset_flag[i][j] equal to 0 specifies that the j-th subset of the i-th MPS is not predicted from the reference MPS. When pred_amps_flag[i] is equal to 1, the value of pred_amps_subset_flag[i][j] is inferred to be equal to 0 for all j in the range of 0 to NumPredSamples[amps_type_idc[i]]−1, inclusive. When pred_amps_flag[i] is equal to 1, the value of pred_amps_subset_flag[i][j] shall be equal to 1 for at least one value of j in the range of 0 to NumPredSamples[amps_type_idc [i] ]−1, inclusive.

In some examples, when pred_amps_flag[i] is equal to 1, and the value of pred_amps_subset_flag[i][j] is equal to 0 for j in the range of 0 to NumPredSamples[amps_type_idc[i] ]−2, inclusive, the syntax element pred_amps_subset_flag[i][j] for j=NumPredSamples[amps_type_idc[i] ]−1 may not be signaled and may be inferred to be equal to 1.

In some examples, other methods of indicating that the MPS or the MPS subset is derived dependent on another MPS or MPS subset may be specified. The techniques disclosed here apply to any such referencing method. The idea is to indicate one MPS or MPS subset to be the reference from which the parameters of the current MPS or MPS subset are derived. For example, one or more MPS subsets of one MPS may have reference MPS subsets that belong to different MPS's. In other examples, the MPS subsets may be restricted to refer to the subsets of the same MPS. Moreover, in some examples, the MPS or MPS subsets may also refer to any MPS or any MPS subset for reference; in some such cases, additional signaling to indicate the reference MPS of an MPS subset may be needed.

In some examples, the syntax elements may be signaled to specify that an AMPS subset of an MPS may be derived from another AMPS subset from the same MPS. In some examples, one or more parameters of an AMPS subset may be derived from other parameters of the same AMPS subset.

In some cases, even when the number of entries in the AMPS subset is different from a reference AMPS subset, a subset of the parameters of the AMPS subset may be derived from another AMPS subset. In some examples, one or more syntax elements may be signaled to indicate the MIP parameters that are predicted from other MIP parameters. Further syntax elements may be signaled to specify the reference parameter(s) used for derivation.

amps_param_val[i][j][k] is used to derive the k-th parameter of the j-th subset of the i-th AMPS. The number of bits used to signal amps_param_val[i][j][k] is equal to num_bits_for_ampsparam_val_minus1[i]+1. DmpsParamVal[i][j][k] can specify the k-th parameter of the j-th subset of the i-th DMPS, for i in the range of 0 to $N_{DMPS}$[i]−1, inclusive. AmpsParamVal[i][j][k] can specify the k-th parameter of the j-th subset of the i-th AMPS, for i in the range of 0 to $N_{AMPS}$−1, inclusive. The variable AmpsParamVal[i][j][k] is derived as follows:

```
if( pred_amps_subset_flag[ i ][ j ] )
   AmpsParamVal[ i ][ j ][ k ] = DmpsParamVal[ ref_mps_idx[ i ][ j ] ][ k ] +
       amps_param_val[ i ][ j ][ k ]
else
   AmpsParamVal[ i ][ j ][ k ] = amps_param_val[ i ][ j ][ k ]
``` modify_available_dmps_flag equal to 1 specifies that the syntax element dmps_included_flag[ ][ ] is signaled. modify_available_dmps_flag equal to 0 specifies that the syntax element dmps_included_flag[ ][ ] is not signaled and all the DMPS are considered available for pictures that refer to the SPS.

In some examples, the modify_available_dmps_flag may be signaled for each MIP category. In some examples, a syntax element may be signaled that specifies that one or more MIP modes are unavailable or not to be used for prediction. In other examples, a syntax element may be signaled that specifies the one or more MIP modes in a MIP category are unavailable or not to be used for prediction. A syntax element may also indicate whether an entire category of MIP modes is to be considered unavailable or not used for prediction. Although the semantics of one or more syntax elements in this disclosure may specify a particular decision (e.g., available mode), it must be understood that the disclosed methods may also apply to other interpretations of the syntax element (e.g., modify_available_dmps_flag may be signaled as modify_unavailable_dmps_flag).

dmps_included_flag[m][n] equal to 1 specifies that the n-th DMPS corresponding to the m-th category of MPS may be used for prediction by pictures that refer to the SPS. dmps_included_flag[m][n] equal to 0 specifies that the n-th DMPS corresponding to the n-th category of MPS shall not be used for prediction by pictures that refer to the SPS. In some examples, when not signaled, the value of dmps_included_flag[m][n] is inferred to be equal to 1. Thus, in some examples, video encoder 200 may include, in an SPS of the bitstream, a syntax element (e.g., dmps_included_flag) that indicates whether a particular DMPS of the DMPS's is available to be used for prediction by pictures of the video data that refer to the SPS. In other words, the syntax element indicates whether the particular DMPS is included in a subset of default MPS's that are included in the available MPS's for a picture. Similarly, video decoder 300 may determine, based on a syntax element (e.g., dmps_included_flag) signaled in an SPS of the bitstream, that a particular default MPS of the default MPS's is available to be used for prediction by pictures of the video data that refer to the SPS.

In other examples, a number of DMPS that are signaled as unavailable may be specified and a list of indices may be signaled specifying the unavailable DMPS.

The available MPS for the pictures that refer to the SPS is derived as follows:

```
for( m = 0; m < 2; m++ ) {
   NumAvailableMps[ m ] = 0
   mpsCtr[ m ] = 0
   for( n = 0; n < Nbmps[ m ]; n++ )
      if( dmps_included_flag[ m ][ n ] )
         AvailableMpsIdx[ m ][ mpsCtr[ m ] ++ ] = n
   NumAvailableDmps[ m ] = mpsCtr[ m ]
}
for( i = 0; i < num_amps; i++ ) {
   mpsCtr[ amps_type_idc[ i ]]++
   AvailableMpsIdx[ m ][ mpsCtr[ m ]] = i
}
NumAvailableMps[ m ] = mpsCtr[ m ]
```

In other examples, the DMPS and the AMPS may all be put in one list of MPS's. In one example, only the available DMPS and the AMPS may be put in a list. It is to be understood that multiple ways of describing collection of DMPS and AMPS may be possible, and the methods disclosed here cover one or all of them. The idea here is to define a set of available MPS (including subset of DMPS and subset of AMPS) and restrict indication of MIP modes to only those in the available MPS. This may also modify the signaling of the MIP mode index accordingly.

In some examples, the mapping of modes from MIP mode to regular intra modes and vice versa is absent. All MIP modes defined by AMPS may be treated as Planar modes in the derivation of a non-MIP MPM. If the non-trivial mapping from MIP to regular intra modes and vice versa are used, additional syntax elements may need to be included in the signaling to indicate the mapping associated with the AMPS. Some alternatives may not consider the inclusion of AMPS in the MIP MPM if the MIP MPM derivation is used.

The signaling of a MIP mode index may be modified to be dependent on the variable NumAvailableMps[m], e.g., the maximum value of MPS in category m may now be NumAvailableMps[m] instead of $N_{DMPS}$[m]. If an mpsIdx is specified for indicating an MIP mode for category m, when mpsIdx<NumAvailableDmps[m], the DMPS with an index equal to AvailableMpsIdx[m][mpsIdx] is chosen. Otherwise, the AMPS with index equal to AvailableMpsIdx[m][mpsIdx] is chosen.

In some examples, constraints may be specified on the value of NumAvailableDmps[ ] so that the NumAvailableDmps[ ] is greater than a threshold that is pre-determined or signaled. In other examples, constraints may be specified on the value of NumAvailableMps[ ] so that the NumAvailableMps[ ] is greater than a threshold that is pre-determined or signaled. In some examples, the signaling of one or more MPS parameters may be modified based on constraints imposed on the NumAvailableDmps or NumAvailableMPS.

In some examples, constraints may be specified on the value of NumAvailableDmps[ ] so that the NumAvailableDmps[ ] is smaller than a threshold that is pre-determined or signaled. In other examples, constraints may be specified on the value of NumAvailableMps[ ] so that the NumAvailableMps[ ] is greater than a threshold that is pre-determined or signaled. In some examples, the signaling of one or more MPS parameters signaled may be modified based on constraints imposed on the NumAvailableDmps or NumAvailableMPS.

In some examples, the variables NumAvailableDmps, NumAvailableMps or the number of signaled new modes (num_amps) may be constrained based on a maximum number of MPS's (which may be dependent or specific for each MIP category) or one or more considerations of the maximum memory/maximum number of parameters used by one or more of total MPS, DMPS, AMPS or available MPSs. For example, the MIP mode may be coded as a truncated binary codeword and a maximum value of the codeword which is a parameter of the coding may be set to NumAvailableMps[m] for a particular category m.

In some examples, where the MPS parameters are signaled at multiple parameter sets and slice headers, AMPS may also be specified as unavailable.

The proposed signaling techniques of this disclosure may have at least two major benefits: (1) an ability to define or add new MIP modes and (2) marking one or more pre-defined MIP modes as unavailable. This mechanism supports multiple use cases, some of which are listed below:

1) Encoders (e.g., video encoder 200) that have the capability to train MIP mode parameters for particular content would now have the flexibility to signal their newly trained parameters. The signaled parameters would be defined as a new mode which could be used to more efficiently compress the content. For example, video encoder 200 may have several test sequences and use training (machine learning or other methods) to derive the matrix parameters that give the least error in the reconstructed data for these sequences. The sample values in the sequences may be partitioned into smaller regions, and prediction may be performed by different compressed versions of these training sequences. The least error may be least mean square error of the reconstructed and original value. In some cases, the training may also include a rate component (i.e., rate-distortion optimization) by estimating the number of bits that may be used to signal the MIP mode.

2) For some content, some of the pre-defined matrices may not be used at all or may not provide sufficient performance. The pre-defined modes, however, are currently included and negatively affect the signaling cost of the MIP mode. If the modes that are not used are specified in the bitstream, video encoder 200 would be able to specify the MIP mode more efficiently and video decoder 300 would be able to identify the right mode. For example, Salehifar et al., "CE3 Related: Low Memory and Computational Complexity Matrix Based Intra Prediction (MIP), Joint Video Experts Team (JVET) of ITU-T SG 16 WP 3 and ISO/IEC JTC 1/SC 29/WG 11 15th Meeting: Gothenburg, SE, 3-12 Jul. 2019, document JVET-O0139, submitted Jun. 21, 2019, shows that several pre-defined matrices in the VVC may not be useful for the VVC common test conditions (CTC). Instead of completely removing these matrices, a robust solution may be to indicate that some matrices are not used for a particular bitstream. This would keep the pre-defined matrices for non-CTC content (where it may be beneficial) but also allow for more efficient/less complex MIP mode signaling for some cases (e.g., CTC).

3) Some encoders (e.g., video encoder 200) may not have the resources to train entirely new matrices but may have the capability to re-tune/modify existing mode parameters; if these modified parameters do not vary significantly from the pre-defined parameters, the parameter prediction of available_mps_syntax( ) using the pred_amps_flag and ref_mps_idx could be used to signal the modified mode parameters. This allows some flexibility in adding new modes, while not incurring the cost of signaling parameters of an independent new mode.

Figure 22:
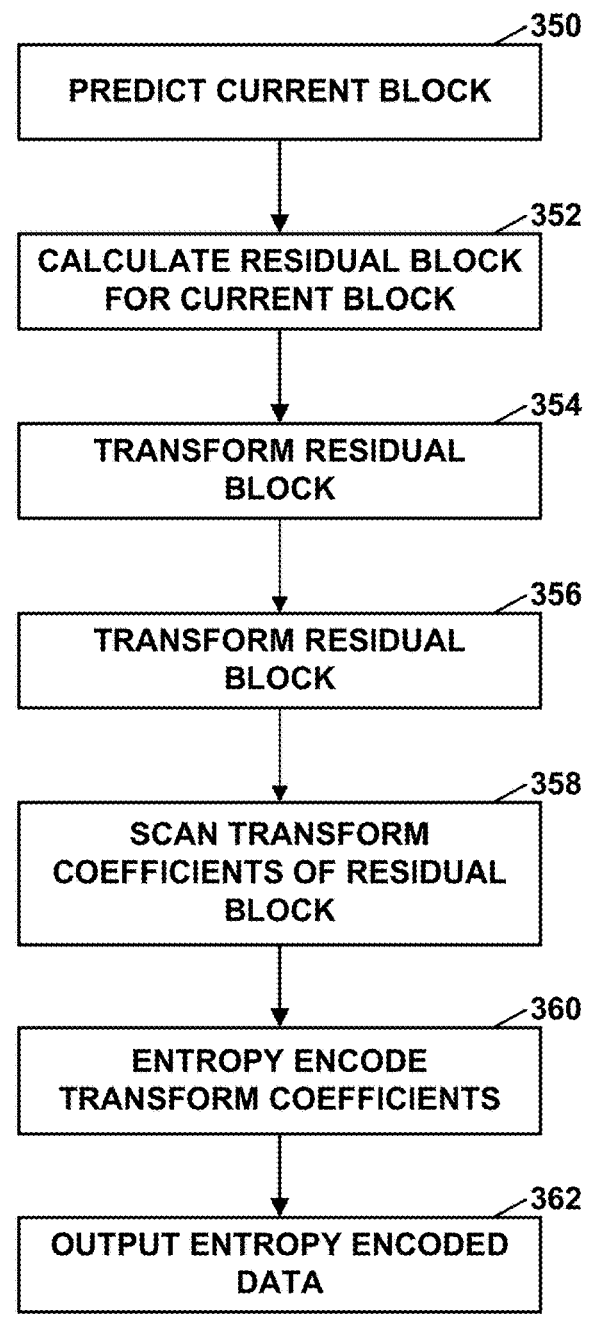
FIG. 22 is a flowchart illustrating an example method for encoding a current block, in accordance with one or more techniques of this disclosure.

FIG. 22 is a flowchart illustrating an example method for encoding a current block, in accordance with one or more techniques of this disclosure. The current block may be a current CU. Although described with respect to video encoder 200 (FIGS. 1 and 20), it should be understood that other devices may be configured to perform a method similar to that of FIG. 22.

In this example, video encoder 200 initially predicts the current block (350). For example, video encoder 200 may form a prediction block for the current block. Video encoder 200 (e.g., MIP unit 227 (FIG. 20) of video encoder 200) may use a MIP mode, such as an E-MIP mode to form the prediction block. Video encoder 200 may signal the E-MIP mode in accordance with any of the examples provided in this disclosure.

Video encoder 200 may then calculate a residual block for the current block (352). To calculate the residual block, video encoder 200 may calculate a difference between the original, unencoded block and the prediction block for the current block.

Video encoder 200 may then transform the residual block to generate a block of transform coefficients (354). Video encoder 200 may quantize the transform coefficients (356). Next, video encoder 200 may scan the quantized transform coefficients of the residual block (358). During the scan, or following the scan, video encoder 200 may entropy encode the transform coefficients (360). For example, video encoder 200 may encode the transform coefficients using CAVLC or CABAC. Video encoder 200 may then output the entropy encoded data of the block (362).

Figure 23:
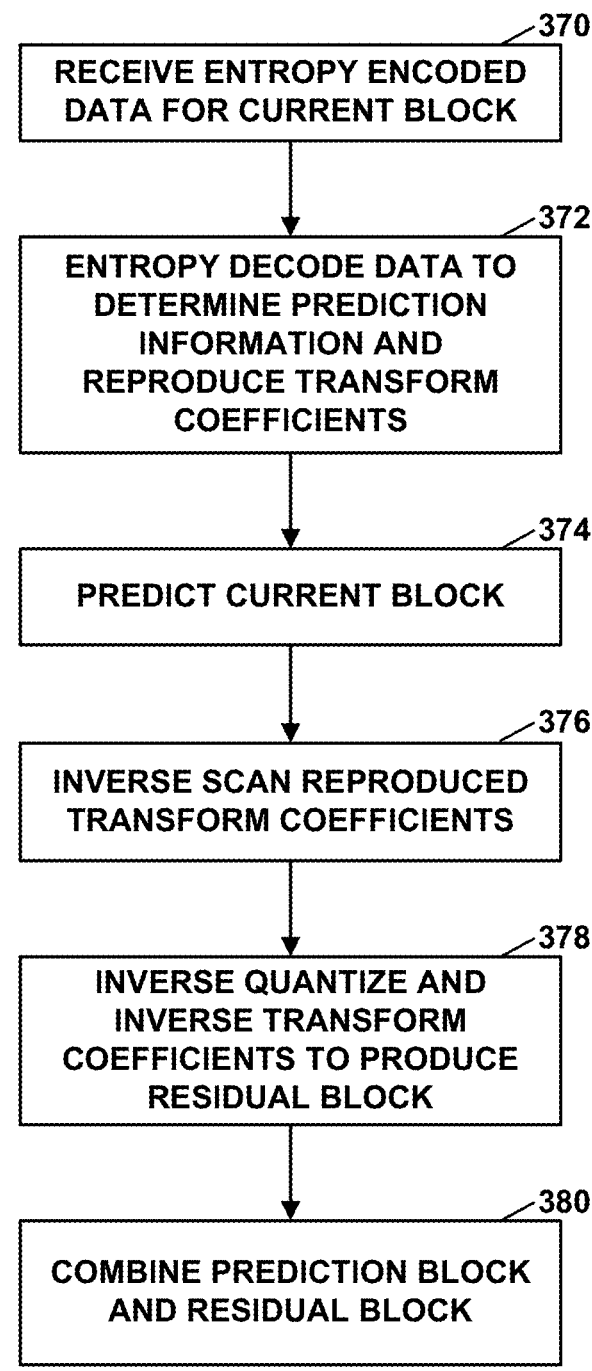
FIG. 23 is a flowchart illustrating an example method for decoding a current block of video data, in accordance with one or more techniques of this disclosure.

FIG. 23 is a flowchart illustrating an example method for decoding a current block of video data, in accordance with one or more techniques of this disclosure. The current block may be a current CU. Although described with respect to video decoder 300 (FIGS. 1 and 21), it should be understood that other devices may be configured to perform a method similar to that of FIG. 23.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372).

Video decoder 300 may predict the current block (374), e.g., using an intra- or inter-prediction mode as indicated by the prediction information for the current block, to calculate a prediction block for the current block. Video decoder 300 (e.g., MIP unit 319 (FIG. 21) of video decoder 300) may use a MIP mode, e.g., an E-MIP mode, to generate the prediction block for the current block. Video decoder 300 may determine the E-MIP mode in accordance with any of the examples provided in this disclosure.

Furthermore, in the example of FIG. 23, video decoder 300 may inverse scan the reproduced transform coefficients to create a block of quantized transform coefficients (376). Video decoder 300 may then inverse quantize and inverse transform the transform coefficients to produce a residual block (378). Video decoder 300 may decode the current block by combining the prediction block for the current block and the residual block (380).

Figure 24:
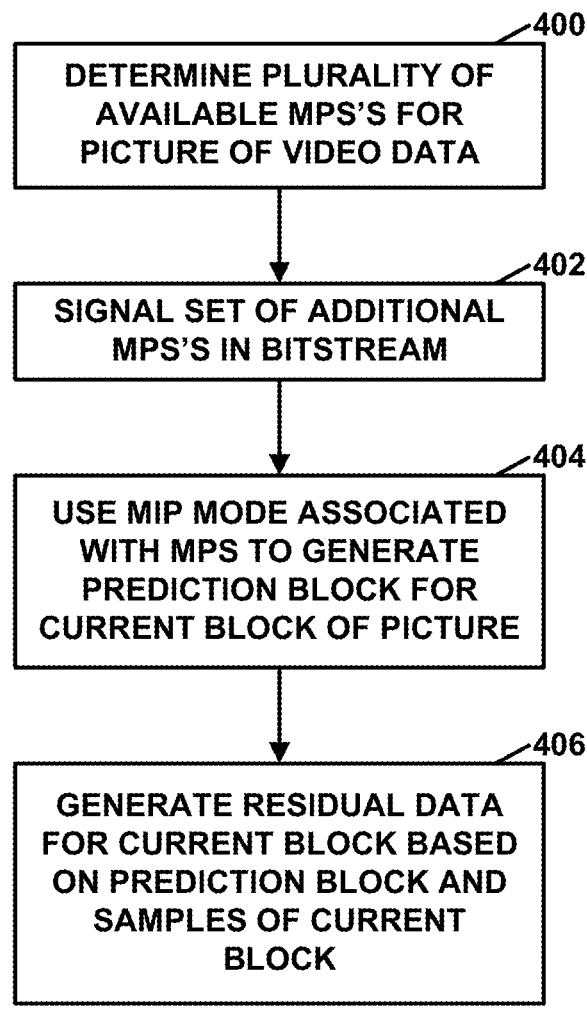
FIG. 24 is a flowchart illustrating an example operation of a video encoder to encode a block using a MIP mode, in accordance with one or more techniques of this disclosure.

FIG. 24 is a flowchart illustrating an example operation of video encoder 200 to encode a block using a MIP mode, in accordance with one or more techniques of this disclosure. In the example of FIG. 24, video encoder 200 (e.g., MIP unit 227 (FIG. 21) of video encoder 200) may determine a plurality of available MPS's for a picture of the video data (400). The plurality of available MPS's is a union of (i) a subset of all default MPS's and (ii) a set of additional MPS's that are signaled in the bitstream. In this example, each of the default MPS's is associated with a predefined MIP mode in a codec. Each of the set of additional MPS's is associated with a new MIP mode. In some examples, the plurality of available MPS's includes at least one MPS for each category in a plurality of categories. In some examples, each category in the plurality of categories may correspond to a different set of block sizes. The available MPS's for the picture may apply just to the picture, may apply to a sequence that includes the picture, or may be defined at another level.

Video encoder 200 may signal the set of additional MPS's in the bitstream (402). For example, video encoder 200 may signal the set of additional MPS's in the bitstream using the syntax elements shown in Syntax Table 3, Syntax Table 4, Syntax Table 5, Syntax Table 6, or other examples of this disclosure.

Furthermore, in the example of FIG. 24, video encoder 200 may use a MIP mode associated with an MPS in the plurality of available MPS's to generate a prediction block for a current block of the picture (404). For example, video encoder 200 may use a matrix and offset/bias terms of the MPS to determine samples values of prediction block 156 (FIG. 19). In some examples, video encoder 200 may use a PSLA of the MPS to determine locations of predicted samples in prediction block 156. Furthermore, in some examples, video encoder 200 may use a RSLA of the MPS to determine boundary samples 152 (FIG. 19).

In some examples where the MIP mode is in the set of new MIP modes and is an explicit MIP (E-MIP) mode, video encoder 200 may derive parameters of the MIP mode using parameters of one or more MIP modes. Furthermore, video encoder 200 may signal a syntax element in the bitstream that indicates that the MIP mode is specified with respect to an already-specified MIP mode. In other examples, video encoder 200 may derive parameters of the MIP mode without using any parameter of any other MIP mode. In such examples, video encoder 200 may signal a syntax element in the bitstream that indicates that the MIP mode is specified independently.

In some examples where the MIP mode is in the set of new MIP modes and is an explicit MIP (E-MIP) mode, video encoder 200 may signal a list of ESPPS's for the MIP mode in the bitstream. The MPS associated with the MIP mode includes the list of ESPPS's for the MIP mode. A PSLA of the MIP mode is a set of sample locations in the current block that correspond to locations where the MIP mode directly generates predicted values. Each of the ESPPS's corresponds to a sample location in the PSLA of the MIP mode. As part of using the MIP mode to generate the prediction block for the current block, video encoder 200 may, for each sample location in the PSLA of the MIP mode, predict a sample for the sample location using parameters contained in the ESPPS corresponding to the sample location. Additionally, video encoder 200 may interpolate remaining samples of the prediction block based on the predicted samples for the sample locations of the PSLA of the MIP mode. In some such examples, video encoder 200 may signal the ESPPS for the MIP mode in the bitstream dependent on another ESPPS. The other ESPPS may be another E-MIP mode or a particular predefined MIP mode in the codec. Furthermore, in some examples, video encoder 200 may signal the PSLA of the MIP mode in the bitstream.

Furthermore, in some examples, video encoder 200 may signal a MIP mode index that indicates the MIP mode. In this example, the signaling of the MIP mode index may be dependent on a number of MIP modes in a MIP mode list. For instance, different coding schemes, such as exponential-Golomb coding, Golomb coding, fixed length coding, or other coding types may be used to code the MIP mode index depending on the number of MIP modes in the MIP mode list.

In some examples, video encoder 200 may signal a RSLA for the MIP mode in the bitstream. The RSLA for the MIP mode indicates a set of reference sample locations in a neighborhood of the current block that are used in the MIP mode. As part of using the MIP mode to generate the prediction block, video encoder 200 may, for each sample location in a PSLA of the MIP mode, determine a prediction value by multiplying a reference sample at a reference sample location indicated by the RSLA for the MIP mode by a matrix coefficient of a matrix specified in the MPS associated with the MIP mode and adding an offset value specified in the MPS associated with the MIP mode.

In the example of FIG. 24, video encoder 200 may generate residual data for the current block based on the prediction block for the current block and samples of the current block (406). For instance, video encoder 200 (e.g., residual generation unit 204 (FIG. 20) of video encoder 200) may generate the residual data for the current block by subtracting samples of the prediction block from corresponding samples of the current block. In some examples, video encoder 200 may subsequently perform transformation, quantization, and entropy encoding operations as described elsewhere in this disclosure.

Figure 25:
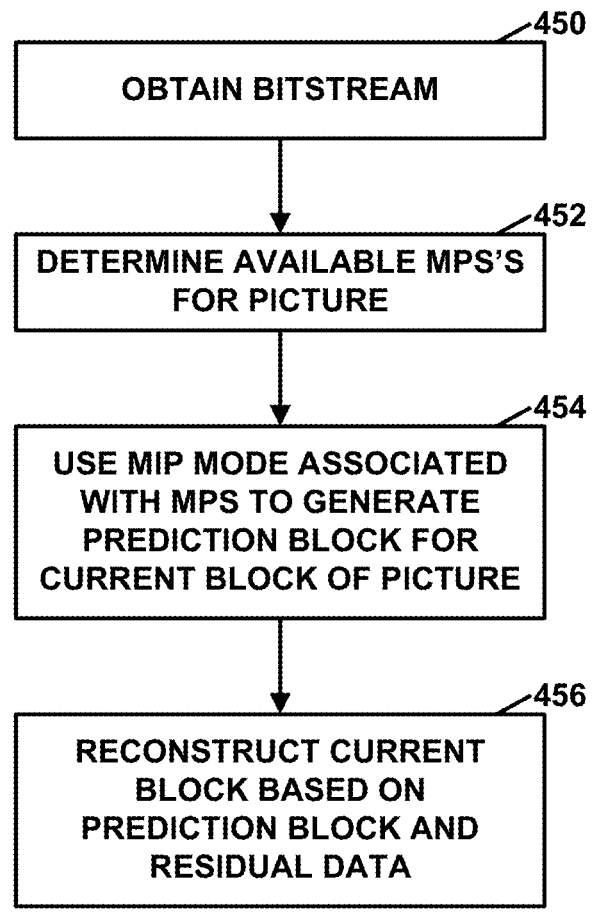
FIG. 25 is a flowchart illustrating an example operation of a video decoder to decode a block using a MIP mode, in accordance with one or more techniques of this disclosure.

FIG. 25 is a flowchart illustrating an example operation of video decoder 300 to decode a block using a MIP mode, in accordance with one or more techniques of this disclosure. In the example of FIG. 25, video decoder 300 may obtain a bitstream that includes an encoded representation of the video data that is encoded using a codec (450). For instance, video decoder 300 may obtain the bitstream from CPB memory 320 (FIG. 21) from an input interface, such as input interface 122 (FIG. 1).

Video decoder 300 may determine a plurality of available MPS's for a picture of the video data (452). The plurality of available MPS's may be a union of (i) a subset of all default MPS's and (ii) a set of additional MPS's that are signaled in the bitstream. Each of the default MPS's is associated with a predefined MIP mode in the codec. Each of the set of additional MPS's is associated with a new MIP mode in a set of new MIP modes. The available MPS's for the picture may apply just to the picture, may apply to a sequence that includes the picture, or may be defined at another level.

Video decoder 300 may determine the available MPS's in accordance with any of the examples provided in this disclosure. For instance, in some examples, video decoder 300 may determine the available MPS's such that the plurality of MPS's includes at least one MPS for each category in a plurality of categories. In some examples, each category of the plurality of categories corresponds to a different set of block sizes.

Furthermore, in some examples, the bitstream may include a syntax element that indicates whether an E-MIP mode is specified with respect to an already-specified MIP mode or whether the E-MIP mode is specified independently. The E-MIP mode is one of the new MIP modes. In this example, video decoder 300 may derive, based on the syntax element indicating that the E-MIP mode is specified with respect to the already-specified mode, parameters of the E-MIP mode using parameters of one or more MIP modes. Otherwise, based on the syntax element indicating that the E-MIP mode is specified independently, video decoder 300 may derive the parameters of the E-MIP mode without using parameters of any other MIP mode.

Video decoder 300 may use a MIP mode associated with an MPS in the plurality of available MPS's to generate a prediction block for a current block of the picture (454). For example, video decoder 300 may use a matrix and offset/bias terms of the MPS to determine samples values of prediction block 156 (FIG. 19). In some examples, video decoder 300 may use a PSLA of the MPS to determine locations of predicted samples in prediction block 156. Furthermore, in some examples, video decoder 300 may use a RSLA of the MPS to determine boundary samples 152 (FIG. 19). For instance, with respect to FIG. 19, video decoder 300 may use the reference samples of the RSLA of the MPS to determine boundary 152.

A MIP mode index may be signaled in the bitstream to indicate the MIP mode. In some examples of this disclosure, signaling of the MIP mode index is dependent on a number of MIP modes in a MIP mode list. For instance, different coding schemes, such as exponential-Golomb coding, Golomb coding, fixed length coding, or other coding types may be used to code the MIP mode index depending on the number of MIP modes in the MIP mode list. Each of the available MPS's may be associated with a different MIP mode in the MIP mode list.

In some examples, the MIP mode is in the set of new MIP modes and is an explicit MIP (E-MIP) mode. Furthermore, in some such examples, a syntax element (e.g., in the bitstream) indicates whether the MIP mode is specified with respect to an already-specified MIP mode or whether the MIP mode is specified independently. In this example, based on the syntax element indicating that the MIP mode is specified with respect to the already-specified mode, video decoder 300 may derive parameters of the MIP mode using parameters of one or more MIP modes. Otherwise, based on the syntax element indicating that the MIP mode is specified independently, video decoder 300 may derive the parameters of the MIP mode without reference to parameters of any other MIP mode.

In some examples, the MIP mode is in the set of new MIP modes and is an explicit MIP (E-MIP) mode. Furthermore, a PSLA of the MIP mode is a set of sample locations in the current block that correspond to locations where the MIP mode directly generates predicted values and the MPS associated with the MIP mode includes a list of ESPPS's for the MIP mode. In such examples, the list of ESPPS's for the MIP mode is signaled in the bitstream. Each of the ESPPS's corresponds to a sample location in the PSLA of the MIP mode. In this example, as part of using the MIP mode to generate the prediction block for the current block, video decoder 300 may, for each sample location in the PSLA of the MIP mode, predict a sample for the sample location using parameters contained in the ESPPS corresponding to the sample location. Video decoder 300 may interpolate remaining samples of the prediction block based on the predicted samples for the sample locations of the PSLA of the MIP mode. In some examples, the ESPPS for the MIP mode is signaled in the bitstream dependent on another ESPPS. The other ESPPS may be another E-MIP mode or a particular predefined MIP mode in the codec. In other examples, the ESPPS for the MIP mode is predetermined. Furthermore, in some examples, the PSLA of the MIP mode may be signaled in the bitstream. In other examples, the PLSA for the MIP mode is predetermined.

In some examples, a RSLA for the MIP mode is signaled in the bitstream. The RSLA for the MIP mode indicates a set of reference sample locations in a neighborhood of the current block that are used in the MIP mode. In such examples, as part of using the MIP mode to generate the prediction block, video decoder 300 may, for each sample location in a PSLA of the MIP mode, determine a prediction value by multiplying a reference sample at a reference sample location indicated by the RSLA for the MIP mode by a matrix coefficient of a matrix specified in the MPS associated with the MIP mode and adding an offset value specified in the MPS associated with the MIP mode.

Furthermore, in the example of FIG. 25, video decoder 300 may reconstruct the current block based on the prediction block for the current block and residual data for the current block (456). For example, video decoder 300 (e.g., reconstruction unit 310 (FIG. 23) of FIG. 25) may add samples of the prediction block for the current block to corresponding samples of the residual data to reconstruct the current block.

The following is a non-limiting list of examples that are in accordance with one or more techniques of this disclosure.

Example 1. A method of coding video data, the method including any of the techniques set forth in this disclosure.

Example 2. The method of example 1, wherein coding includes decoding.

Example 3. The method of any of examples 1-2, wherein coding includes encoding.

Example 4. The method of any of examples 1-3, wherein: a bitstream includes an encoded representation of the video data, a syntax element in the bitstream includes whether an explicit Matrix Intra Prediction (E-MIP) mode is specified with respect to an already-specified mode or whether the E-MIP mode is specified independently, and the method includes: based on the syntax element indicating that the E-MIP mode is specified with respect to the already-specified mode, deriving a parameter of the E-MIP mode using a parameter of one or more MIP modes; and using an affine linear weighted prediction model to generate, based on neighboring reference samples of a current block of the video data and the parameter of the E-MIP mode, a prediction block for the current block.

Example 5. The method of example 4, wherein the syntax element is a first syntax element and a second syntax element in the bitstream indicates that the parameter of the E-MIP mode is obtainable from a reference MIP parameter based on a combination of two or more operations.

Example 6. The method of any of examples 4-5, wherein: parameters of an explicit sample predictor parameters subset (ESPPS) is signaled dependent on a reference ESPPS of a same MIP mode, and the bitstream includes one or more syntax element signaled with the ESPPS that specify the reference ESPPS, an index to the reference ESPPS, or a delta to the index to the reference ESPPS.

Example 7. The method of any of examples 4-6, wherein: coding includes decoding, and the method further includes reconstructing the current block based on the prediction block for the current block.

Example 8. The method of any of examples 4-6, wherein: coding includes encoding, and the method further includes generating residual data based on the prediction block for the current block.

Example 9. A device for coding video data, the device including one or more means for performing the method of any of examples 1-8.

Example 10. The device of example 9, wherein the one or more means include one or more processors implemented in circuitry.

Example 11. The device of any of examples 9 and 10, further including a memory to store the video data.

Example 12. The device of any of examples 9-11, further including a display configured to display decoded video data.

Example 13. The device of any of examples 9-12, wherein the device includes one or more of a camera, a computer, a mobile device, a broadcast receiver device, or a set-top box.

Example 14. The device of any of examples 9-13, wherein the device includes a video decoder.

Example 15. The device of any of examples 9-14, wherein the device includes a video encoder.

Example 16. A computer-readable storage medium having stored thereon instructions that, when executed, cause one or more processors to perform the method of any of examples 1-8.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
obtaining a bitstream that includes an encoded representation of the video data that is encoded using a codec;

determining a plurality of available Matrix Intra Prediction (MIP) parameter sets (MPS's) for a picture of the video data, wherein:
the plurality of available MPS's is a union of (i) a subset of all default MPS's and (ii) a set of one or more additional MPS's that are signaled in the bitstream,
each of the default MPS's is associated with a predefined MIP mode in the codec, and
each of the set of one or more additional MPS's is associated with a new MIP mode in a set of one or more new MIP modes, wherein the new MIP modes are explicit MIP (E-MIP) modes that are derived from matrixes that are not included in the default MPS's;
using a MIP mode associated with an MPS in the plurality of available MPS's to generate a prediction block for a current block of the picture; and
reconstructing the current block based on the prediction block for the current block and residual data for the current block.

2. The method of claim 1, wherein:
the plurality of available MPS's includes at least one MPS for each category in a plurality of categories, and
each category in the plurality of categories corresponds to a different set of block sizes.

3. The method of claim 1, wherein:
the MIP mode is in the set of new MIP modes and is an explicit MIP (E-MIP) mode,
a syntax element in the bitstream indicates whether the MIP mode is specified with respect to an already-specified MIP mode or whether the MIP mode is specified independently, and
the method further comprises, based on the syntax element indicating that the MIP mode is specified with respect to the already-specified mode, deriving parameters of the MIP mode using parameters of one or more MIP modes.

4. The method of claim 1, wherein:
the MIP mode is in the set of new MIP modes and is an explicit MIP (E-MIP) mode,
a predicted sample location array (PSLA) of the MIP mode is a set of sample locations in the current block that correspond to locations where the MIP mode directly generates predicted values,
the MPS associated with the MIP mode includes a list of explicit sample predictor parameter subsets (ESPPS's) for the MIP mode,
the list of ESPPS's for the MIP mode is signaled in the bitstream,
each of the ESPPS's corresponds to a sample location in the PSLA of the MIP mode, and
using the MIP mode to generate the prediction block for the current block comprises:
for each sample location in the PSLA of the MIP mode, predicting a sample for the sample location using parameters contained in the ESPPS corresponding to the sample location; and
interpolating remaining samples of the prediction block based on the predicted samples for the sample locations of the PSLA of the MIP mode.

5. The method of claim 4, wherein the ESPPS's for the MIP mode are signaled in the bitstream dependent on another ESPPS.

6. The method of claim 5, wherein the other ESPPS is one of another E-MIP mode or a particular predefined MIP mode in the codec.

7. The method of claim 1, further comprising determining, based on a syntax element signaled in a sequence parameter set (SPS) of the bitstream, that a particular default MPS of the default MPS's is available to be used for prediction by pictures of the video data that refer to the SPS.

8. The method of claim 1, wherein:
the MIP mode is in the set of new MIP modes and is an explicit MIP (E-MIP) mode,
a syntax element in the bitstream indicates whether the MIP mode is specified with respect to an already-specified MIP mode or whether the MIP mode is specified independently, and
the method further comprises, based on the syntax element indicating that the E-MIP mode is specified independently, deriving parameters of the MIP mode without using any parameter of any other MIP mode.

9. The method of claim 1, wherein:
a MIP mode index is signaled in the bitstream and signaling of the MIP mode index is dependent on a number of MIP modes in a MIP mode list, and
the MIP mode index indicates the MIP mode.

10. The method of claim 1, wherein:
a reference sample location array (RSLA) for the MIP mode is signaled in the bitstream, the RSLA for the MIP mode indicating a set of reference sample locations in a neighborhood of the current block that are used in the MIP mode, and
using the MIP mode to generate the prediction block comprises:
for each sample location in a predicted sample location array (PSLA) of the MIP mode, determining a prediction value by multiplying a reference sample at a reference sample location indicated by the RSLA for the MIP mode by a matrix coefficient of a matrix specified in the MPS associated with the MIP mode and adding an offset value specified in the MPS associated with the MIP mode.

11. A method of encoding video data using a codec, the method comprising:
determining a plurality of available Matrix Intra Prediction (MIP) parameter sets (MPS's) for a picture of the video data, wherein:
the plurality of available MPS's is a union of (i) a subset of all default MPS's and (ii) a set of one or more additional MPS's that are signaled in the bitstream,
each of the default MPS's is associated with a predefined MIP mode in the codec, and
each of the set of one or more additional MPS's is associated with a new MIP mode in a set of one or more new MIP modes, wherein the new MIP modes are explicit MIP (E-MIP) modes that are derived from matrixes that are not included in the default MPS's;
signaling the set of one or more additional MPS's in a bitstream that comprises an encoded representation of the video data;
using a MIP mode associated with an MPS in the plurality of available MPS's to generate a prediction block for a current block of the picture; and
generating residual data for the current block based on the prediction block for the current block and samples of the current block.

12. The method of claim 11, wherein:
the plurality of available MPS's includes at least one MPS for each category in a plurality of categories, and each category in the plurality of categories correspond to a different set of block sizes.

13. The method of claim 11, wherein:
the MIP mode is in the set of new MIP modes and is an explicit MIP (E-MIP) mode, and the method further comprises:
deriving parameters of the MIP mode using parameters of one or more MIP modes; and
signaling a syntax element in the bitstream indicates that the MIP mode is specified with respect to an already-specified MIP mode.

14. The method of claim 11, wherein:
the MIP mode is in the set of new MIP modes and is an explicit MIP (E-MIP) mode,
a predicted sample location array (PSLA) of the MIP mode is a set of sample locations in the current block that correspond to locations where the MIP mode directly generates predicted values,
the MPS associated with the MIP mode includes a list of explicit sample predictor parameter subsets (ESPPS's) for the MIP mode,
the method further comprises signaling the list of ESPPS's for the MIP mode in the bitstream,
each of the ESPPS's corresponds to a sample location in the PSLA of the MIP mode, and
using the MIP mode to generate the prediction block for the current block comprises:
for each sample location in the PSLA of the MIP mode, predicting a sample for the sample location using parameters contained in the ESPPS corresponding to the sample location; and
interpolating remaining samples of the prediction block based on the predicted samples for the sample locations of the PSLA of the MIP mode.

15. The method of claim 14, wherein the method further comprises signaling the ESPPS's for the MIP mode in the bitstream dependent on another ESPPS.

16. The method of claim 15, wherein the other ESPPS is one of another E-MIP mode or a particular predefined MIP mode in the codec.

17. The method of claim 11, further comprising including, in a sequence parameter set (SPS) of the bitstream, a syntax element that indicates whether a particular default MPS of the default MPS's is available to be used for prediction by pictures of the video data that refer to the SPS.

18. The method of claim 11, wherein:
the MIP mode is in the set of new MIP modes and is an explicit MIP (E-MIP) mode, the method further comprises:
deriving parameters of the MIP mode without using any parameter of any other MIP mode; and
signaling a syntax element in the bitstream that indicates that the MIP mode is specified with independently.

19. The method of claim 11, wherein the method further comprises signaling a MIP mode index that indicates the MIP mode, wherein signaling of the MIP mode index is dependent on a number of MIP modes in a MIP mode list.

20. The method of claim 11, wherein:
the method further comprises signaling a reference sample location array (RSLA) for the MIP mode in the bitstream, the RSLA for the MIP mode indicating a set of reference sample locations in a neighborhood of the current block that are used in the MIP mode, and using the MIP mode to generate the prediction block comprises:
for each sample location in a predicted sample location array (PSLA) of the MIP mode, determining a prediction value by multiplying a reference sample at a reference sample location indicated by the RSLA for the MIP mode by a matrix coefficient of a matrix specified in the MPS associated with the MIP mode and adding an offset value specified in the MPS associated with the MIP mode.

21. A device for decoding video data, the device comprising:
a memory to store the video data; and
one or more processors implemented in circuitry, the one or more processors configured to:
obtain a bitstream that includes an encoded representation of the video data that is encoded using a codec;
determine a plurality of available Matrix Intra Prediction (MIP) parameter sets (MPS's) for a picture of the video data, wherein:
the plurality of available MPS's is a union of (i) a subset of all default MPS's and (ii) a set of one or more additional MPS's that are signaled in the bitstream,
each of the default MPS's is associated with a predefined MIP mode in the codec, and
each of the set of one or more additional MPS's is associated with a new MIP mode in a set of one or more new MIP modes, wherein the new MIP modes are explicit MIP (E-MIP) modes that are derived from matrixes that are not included in the default MPS's;
use a MIP mode associated with an MPS in the plurality of available MPS's to generate a prediction block for a current block of the picture; and
reconstruct the current block based on the prediction block for the current block and residual data for the current block.

22. The device of claim 21, wherein:
the plurality of available MPS's includes at least one MPS for each category in a plurality of categories, and
each category in the plurality of categories correspond to a different set of block sizes.

23. The device of claim 21, wherein:
the MIP mode is in the set of new MIP modes and is an explicit MIP (E-MIP) mode,
a syntax element in the bitstream indicates whether the MIP mode is specified with respect to an already-specified MIP mode or whether the MIP mode is specified independently, and
the one or more processors are further configured to derive, based on the syntax element indicating that the MIP mode is specified with respect to the already-specified mode, parameters of the MIP mode using parameters of one or more MIP modes.

24. The device of claim 21, wherein:
the MIP mode is in the set of new MIP modes and is an explicit MIP (E-MIP) mode,
a predicted sample location array (PSLA) of the MIP mode is a set of sample locations in the current block that correspond to locations where the MIP mode directly generates predicted values,
the MPS associated with the MIP mode includes a list of explicit sample predictor parameter subsets (ESPPS's) for the MIP mode,
the list of ESPPS's for the MIP mode is signaled in the bitstream,
each of the ESPPS's corresponds to a sample location in the PSLA of the MIP mode, and the one or more processors are configured such that, as part of using the MIP mode to generate the prediction block for the current block, the one or more processors:
for each sample location in the PSLA of the MIP mode, predict a sample for the sample location using parameters contained in the ESPPS corresponding to the sample location; and
interpolate remaining samples of the prediction block based on the predicted samples for the sample locations of the PSLA of the MIP mode.

25. The device of claim 24, wherein the ESPPS's for the MIP mode are signaled in the bitstream dependent on another ESPPS.

26. The device of claim 25, wherein the other ESPPS is one of another E-MIP mode or a particular predefined MIP mode in the codec.

27. The device of claim 21, wherein the one or more processors are further configured to determine, based on a syntax element signaled in a sequence parameter set (SPS) of the bitstream, that a particular default MPS of the default MPS's is available to be used for prediction by pictures of the video data that refer to the SPS.

28. The device of claim 21, wherein:
the MIP mode is in the set of new MIP modes and is an explicit MIP (E-MIP) mode,
a syntax element in the bitstream indicates whether the MIP mode is specified with respect to an already-specified MIP mode or whether the MIP mode is specified independently, and
the one or more processors are further configured to derive, based on the syntax element indicating that the MIP mode is specified independently, parameters of the MIP mode without using any parameter of any other MIP mode.

29. The device of claim 21, wherein:
a MIP mode index is signaled in the bitstream and signaling of the MIP mode index is dependent on a number of MIP modes in a MIP mode list, and
the MIP mode index indicates the MIP mode.

30. The device of claim 21, wherein:
a reference sample location array (RSLA) for the MIP mode is signaled in the bitstream, the RSLA for the MIP mode indicating a set of reference sample locations in a neighborhood of the current block that are used in the MIP mode, and
the one or more processors are configured such that, as part of using the MIP mode to generate the prediction block, the one or more processors:
for each sample location in a predicted sample location array (PSLA) of the MIP mode, determine a prediction value by multiplying a reference sample at a reference sample location indicated by the RSLA for the MIP mode by a matrix coefficient of a matrix specified in the MPS associated with the MIP mode and adding an offset value specified in the MPS associated with the MIP mode.

31. The device of claim 21, further comprising a display configured to display decoded video data.

32. The device of claim 21, wherein the device comprises one or more of a camera, a computer, a mobile device, a broadcast receiver device, or a set-top box.

33. A device for encoding video data using a codec, the device comprising:
a memory to store the video data; and
one or more processors implemented in circuitry, the one or more processors configured to:
determine a plurality of available Matrix Intra Prediction (MIP) parameter sets (MPS's) for a picture of the video data, wherein:
the plurality of available MPS's is a union of (i) a subset of all default MPS's and (ii) a set of one or more additional MPS's that are signaled in the bitstream,
each of the default MPS's is associated with a predefined MIP mode in the codec, and
each of the set of one or more additional MPS's is associated with a new MIP mode in a set of one or more new MIP modes, wherein the new MIP modes are explicit MIP (E-MIP) modes that are derived from matrixes that are not included in the default MPS's;
signaling the set of one or more additional MPS's in a bitstream that comprises an encoded representation of the video data;
use a MIP mode associated with an MPS in the plurality of available MPS's to generate a prediction block for a current block of the picture; and
generate residual data for the current block based on the prediction block for the current block and samples of the current block.

34. The device of claim 33, wherein:
the plurality of available MPS's includes at least one MPS for each category in a plurality of categories, and
each category in the plurality of categories correspond to a different set of block sizes.

35. The device of claim 33, wherein:
the MIP mode is in the set of new MIP modes and is an explicit MIP (E-MIP) mode, and the one or more processors are further configured to:
derive parameters of the MIP mode using parameters of one or more MIP modes; and
signal a syntax element in the bitstream indicates that the MIP mode is specified with respect to an already-specified MIP mode.

36. The device of claim 33, wherein:
the MIP mode is in the set of new MIP modes and is an explicit MIP (E-MIP) mode,
a predicted sample location array (PSLA) of the MIP mode is a set of sample locations in the current block that correspond to locations where the MIP mode directly generates predicted values,
the MPS associated with the MIP mode includes a list of explicit sample predictor parameter subsets (ESPPS's) for the MIP mode,
the one or more processors are further configured to signal the list of ESPPS's for the MIP mode in the bitstream,
each of the ESPPS's corresponds to a sample location in the PSLA of the MIP mode, and
the one or more processors are configured such that, as part of using the MIP mode to generate the prediction block for the current block, the one or more processors:
for each sample location in the PSLA of the MIP mode, predict a sample for the sample location using parameters contained in the ESPPS corresponding to the sample location; and
interpolate remaining samples of the prediction block based on the predicted samples for the sample locations of the PSLA of the MIP mode.

37. The device of claim 36, wherein the one or more processors are further configured to signal the ESPPS's for the MIP mode in the bitstream dependent on another ESPPS.

38. The device of claim 37, wherein the other ESPPS is one of another E-MIP mode or a particular predefined MIP mode in the codec.

39. The device of claim 33, wherein the one or more processors are further configured to include, in a sequence parameter set (SPS) of the bitstream, a syntax element that indicates whether a particular default MPS of the default MPS's is available to be used for prediction by pictures of the video data that refer to the SPS.

40. The device of claim 33, wherein:
the MIP mode is in the set of new MIP modes and is an explicit MIP (E-MIP) mode,
the one or more processors are further configured to:
derive parameters of the MIP mode without using any parameter of any other MIP mode; and
signal a syntax element in the bitstream that indicates that the MIP mode is specified with independently.

41. The device of claim 33, wherein the one or more processors are further configured to signal a MIP mode index that indicates the MIP mode, wherein signaling of the MIP mode index is dependent on a number of MIP modes in a MIP mode list.

42. The device of claim 33, wherein:
the one or more processors are further configured to signal a reference sample location array (RSLA) for the MIP mode in the bitstream, the RSLA for the MIP mode indicating a set of one or more reference sample locations in a neighborhood of the current block that are used in the MIP mode, and
the one or more processors are configured such that, as part of using the MIP mode to generate the prediction block, the one or more processors:
for each sample location in a predicted sample location array (PSLA) of the MIP mode, determine a prediction value by multiplying a reference sample at a reference sample location indicated by the RSLA for the MIP mode by a matrix coefficient of a matrix specified in the MPS associated with the MIP mode and adding an offset value specified in the MPS associated with the MIP mode.

43. The device of claim 33, wherein the device comprises one or more of a camera, a computer, a mobile device, a broadcast receiver device, or a set-top box.

* * * * *